US009311497B2

(12) United States Patent
Nakata

(10) Patent No.: US 9,311,497 B2
(45) Date of Patent: Apr. 12, 2016

(54) COMPUTER-READABLE STORAGE MEDIUM HAVING STORED INFORMATION PROCESSING PROGRAM THEREIN, INFORMATION PROCESSING APPARATUS, INFORMATION PROCESSING METHOD, AND INFORMATION PROCESSING SYSTEM

(75) Inventor: Tetsuya Nakata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 308 days.

(21) Appl. No.: 13/005,125

(22) Filed: Jan. 12, 2011

(65) Prior Publication Data
US 2012/0102246 A1 Apr. 26, 2012

(30) Foreign Application Priority Data

Oct. 26, 2010 (JP) .................................. 2010-240056

(51) Int. Cl.
*G06F 15/16* (2006.01)
*G06F 21/60* (2013.01)
*G06F 21/62* (2013.01)

(52) U.S. Cl.
CPC .......... *G06F 21/606* (2013.01); *G06F 21/6209* (2013.01); *G06F 2221/2109* (2013.01)

(58) Field of Classification Search
CPC .............. G06F 21/606; G06F 21/6209; G06F 2221/2109
USPC .................................. 709/204, 205, 246, 248
See application file for complete search history.

(56) References Cited

U.S. PATENT DOCUMENTS

| 7,970,827 | B1* | 6/2011 | Cumberbatch | ........ G06Q 40/00 709/204 |
| 8,438,224 | B1* | 5/2013 | Chirita | ............... G06Q 30/0231 709/203 |
| 2008/0220878 | A1* | 9/2008 | Michaelis | ....................... 463/42 |
| 2008/0318525 | A1 | 12/2008 | Tanabe | |
| 2009/0285166 | A1* | 11/2009 | Huber et al. | ................... 370/329 |
| 2010/0105484 | A1* | 4/2010 | Horneff et al. | ................... 463/43 |
| 2010/0153394 | A1* | 6/2010 | Wood | ............................ 707/737 |
| 2010/0241507 | A1* | 9/2010 | Quinn | .................... G06Q 30/02 705/14.42 |
| 2011/0302123 | A1* | 12/2011 | Nista | ................. G06F 17/30867 706/52 |
| 2012/0030293 | A1* | 2/2012 | Bobotek | ....................... 709/206 |
| 2012/0042263 | A1* | 2/2012 | Rapaport | ...................... 715/753 |

(Continued)

FOREIGN PATENT DOCUMENTS

| JP | 2002-335288 | 11/2002 |
| JP | 2004-310389 A | 11/2004 |
| JP | 2009-3552 A | 1/2009 |

(Continued)

*Primary Examiner* — Phuoc Nguyen
*Assistant Examiner* — Davoud Zand
(74) *Attorney, Agent, or Firm* — Nixon & Vanderhye P.C.

(57) ABSTRACT

An information processing apparatus, a computer-readable storage medium having stored an information processing program therein, an information processing method, and an information processing system, which can share, with another apparatus, information regarding data which should not be provided to a user, are provided. The number of times of reporting of data including a contents, which should not be provided to the user, from each game apparatus included in a system, is counted on the basis of information assigned to the data. When the counted value becomes equal to or higher than a predetermined threshold, the information is added and registered to identification information. The identification information is transmitted from a server of the system to each information processing apparatus, and used in each information processing apparatus.

16 Claims, 20 Drawing Sheets

(56) References Cited

U.S. PATENT DOCUMENTS

2012/0077432 A1* 3/2012 Rose et al. .................. 455/41.1
2012/0214413 A1* 8/2012 Rose et al. .................. 455/41.1

FOREIGN PATENT DOCUMENTS

| JP | 2010-86352 A | 4/2010 |
| WO | 2007/111196 A1 | 10/2007 |

* cited by examiner

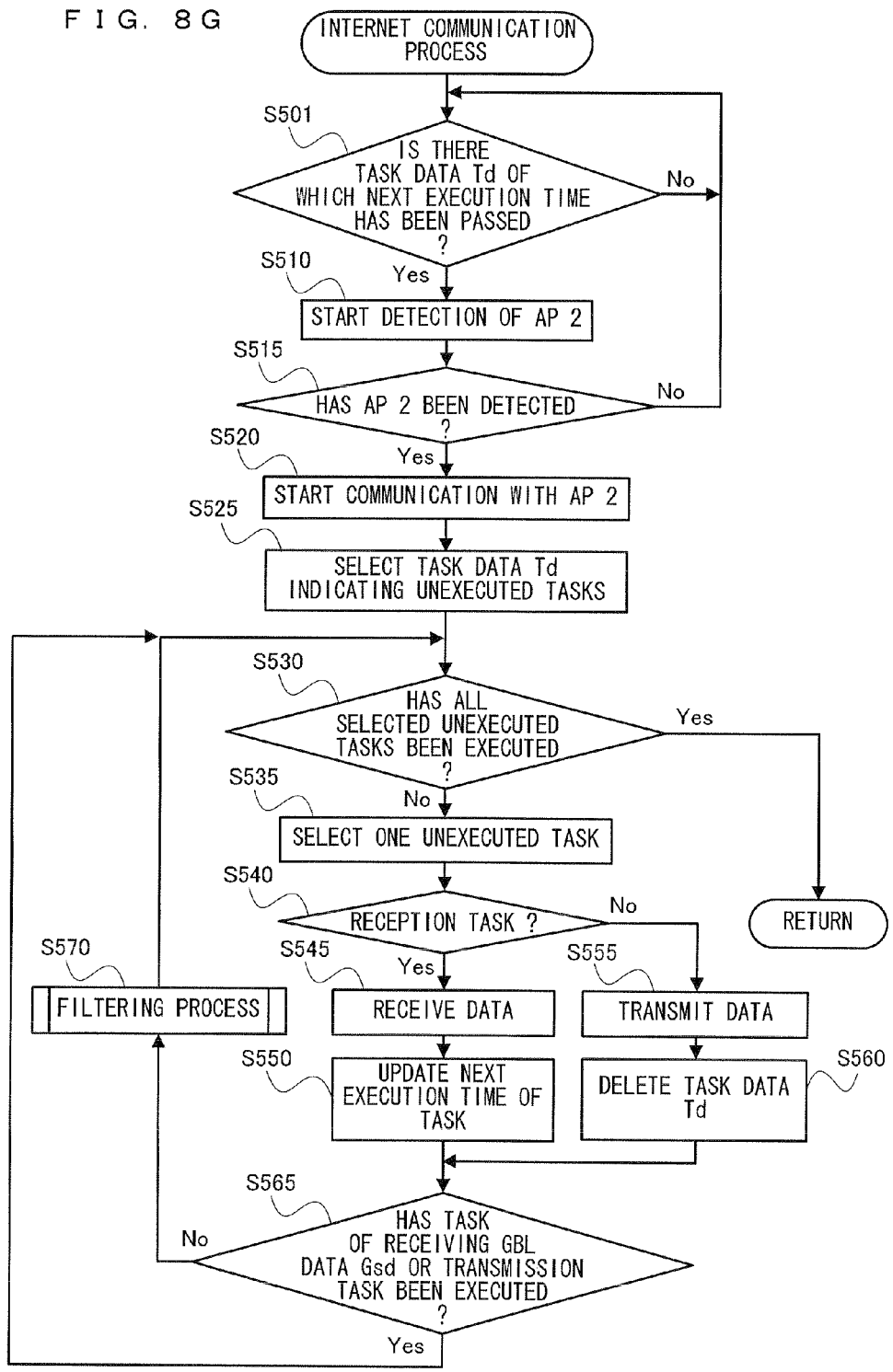

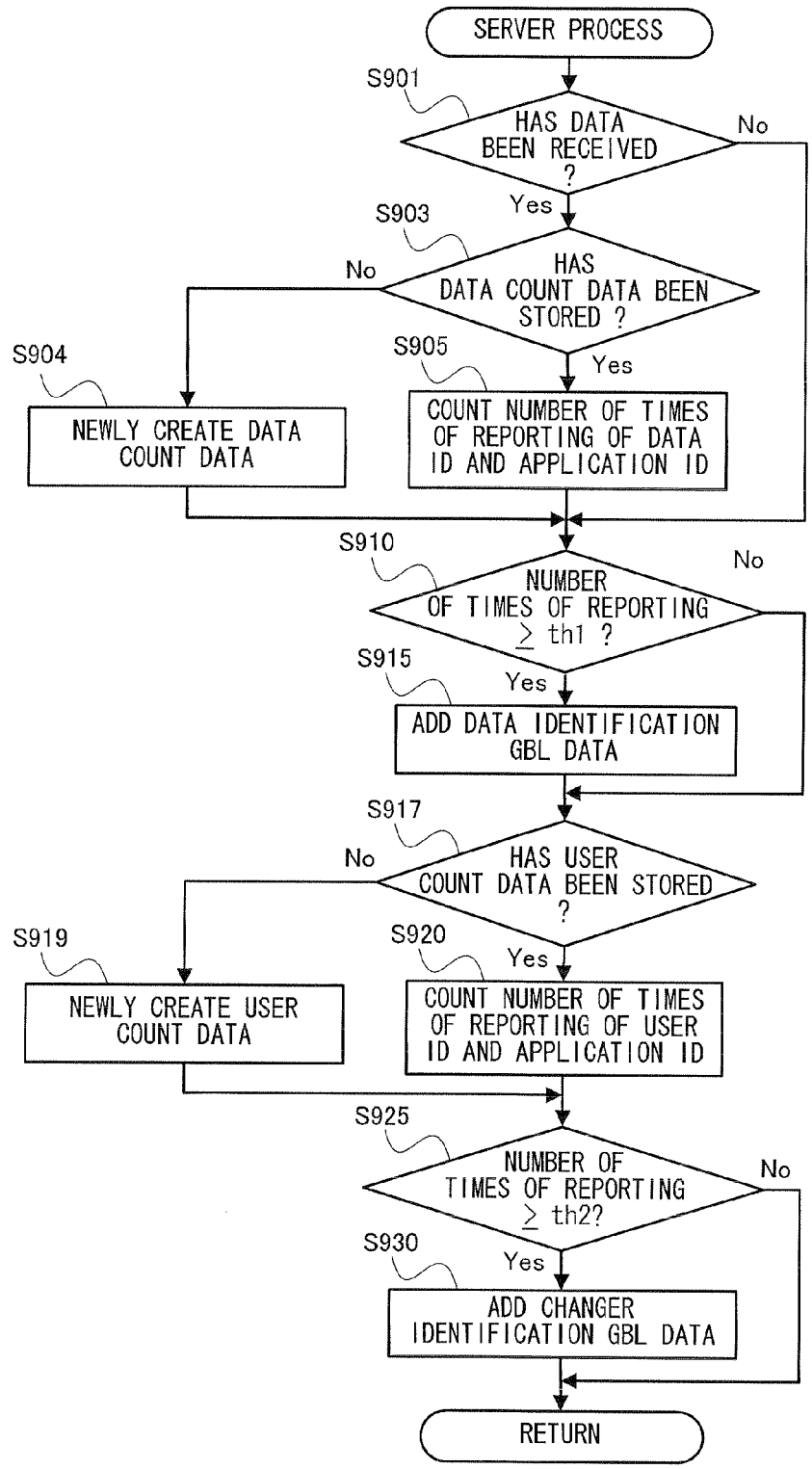

COMPUTER-READABLE STORAGE MEDIUM HAVING STORED INFORMATION PROCESSING PROGRAM THEREIN, INFORMATION PROCESSING APPARATUS, INFORMATION PROCESSING METHOD, AND INFORMATION PROCESSING SYSTEM

CROSS REFERENCE TO RELATED APPLICATION

The disclosure of Japanese Patent Application No. 2010-240056, filed on Oct. 26, 2010, is incorporated herein by reference.

BACKGROUND

1. Technical Field

The technology presented herein relates to a computer-readable storage medium having stored an information processing program therein, an information processing apparatus, an information processing method, and an information processing system, and, more particularly, to a computer-readable storage medium having stored an information processing program therein, an information processing apparatus, an information processing method, and an information processing system, which identify undesirable data from among data which is transmitted and received between apparatuses.

2. Description of the Background Art

Conventionally, a system which deletes unnecessary data and data which provides an unpleasant feeling, from among received data by using a black list, is disclosed, for example, in Japanese Laid-Open Patent Publication No. 2002-335288 (hereinafter, referred to as conventional art). The system disclosed in the above conventional art previously registers the source addresses of nuisance e-mails. Then, when an e-mail whose source address is a registered address is received, the system automatically deletes the e-mail.

However, in the system disclosed in the above conventional art, a database which has stored the mail addresses of the nuisance e-mails is not shared by another apparatus. Thus, in a system as disclosed in the above conventional art, a user cannot necessarily prevent viewing of inappropriate contents such as unnecessary data and data which provides an unpleasant feeling.

SUMMARY

Therefore, a feature of the present technology is to provide an information processing apparatus, a computer-readable storage medium having stored an information processing program therein, an information processing method, and an information processing system, which can share, with another apparatus, information regarding data which should not be provided to a user.

The present technology provides an information processing system which includes at least a plurality of information processing apparatuses each of which is capable of transmitting and receiving data including a content. The information processing system of the present technology includes at least an information processing apparatus which includes identification information reception means, identification information storage means, identification information transmission means, data transmission/reception means, and output means. The identification information reception means receives, as identification information, information for identifying a piece of the data of which output is limited. The identification information storage means stores the identification information received by the identification information reception means. The identification information transmission means transmits the identification information stored in the identification information storage means, to another information processing apparatus. The data transmission/reception means transmits and receives the data to and from another information processing apparatus. Among the data received by the data transmission/reception means, the output means does not output the piece of the data which is identified on the basis of the identification information stored in the identification information storage means, and outputs a piece of the data which is not identified on the basis of the identification information stored in the identification information storage means.

According to the above configuration example, data which should not be provided to a user can be identified by using the identification information received from another information processing apparatus. Thus, information regarding the data which should not be provided can be shared with the other information processing apparatus. In addition, the user can prevent inappropriate data from being provided. Moreover, since the identification information is transmitted to another information processing apparatus, if the own information processing apparatus holds the latest identification information, the latest identification information can be provided to another user, and thus inappropriate data can be prevented from being provided to the other user.

In another configuration example, each information processing apparatus may further include wireless communication means. The wireless communication means repeatedly searches for another information processing apparatus present within a communicable range to automatically and wirelessly connect to the other information processing apparatus, and automatically communicates with the other information processing apparatus. The identification information reception means may automatically receive the identification information by using the wireless communication means. The identification information storage means may store the identification information received by using the wireless communication means. The identification information transmission means may transmit the identification information stored in the identification information storage means, to another information processing apparatus by using the wireless communication means.

According to the above configuration example, the identification information can be automatically transmitted and received to and from another information processing apparatus without actively performing access for obtaining the identification information. Thus, the identification information can be shared without the user being aware of it, and inappropriate contents can be prevented from being outputted.

In another configuration example, each information processing apparatus may further include wireless communication means. The wireless communication means wirelessly connects to another information processing apparatus present within a communicable range by using near-field radio, and communicates with the other information processing apparatus. The identification information reception means may receive the identification information by using the wireless communication means. The identification information storage means may store the identification information received by the wireless communication means. The identification information transmission means may transmit the identification information stored in the identification information storage means, to another information processing apparatus by using the wireless communication means.

According to the above configuration example, even when unexpected data is received, since the identification information is also automatically received from another information processing apparatus, inappropriate data can be prevented from being provided.

In another configuration example, the information processing system may further include a server apparatus which transmits the identification information to each information processing apparatus. Each information processing apparatus may further include server information reception means and update means. The server information reception means receives the identification information transmitted from the server apparatus. The update means updates the identification information stored in the identification information storage means, with the identification information received by the server information reception means.

According to the above configuration example, the identification information shared by the multiple information processing apparatuses can be collectively and efficiently administered by the server apparatus. When transmission and reception are performed by using near-field radio, the identification information received from the server apparatus can be transmitted by using near-field radio. Thus, even when connection to the server apparatus is impossible, the identification information can be obtained through near-field radio.

In another configuration example, each information processing apparatus may further include acceptance means and transmission means. The acceptance means accepts, from a user, a selection of a piece of the data which is to be set so as not to be outputted, from among the data received by the data transmission/reception means. The transmission means transmits at least a part of: the piece of the data accepted by the acceptance means; or information related to the piece of the data, as report data to the server apparatus. The server apparatus may further include server side update means and server side identification information storage means. The server side update means updates the identification information which is to be transmitted to each information processing apparatus, on the basis of the report data transmitted from the transmission means of each information processing apparatus. The server side identification information storage means stores the identification information updated by the server side update means.

According to the above configuration example, on the basis of the reported data transmitted from the multiple information processing apparatuses included in the system, the server apparatus can administer the identification information in which the result of determination as being inappropriate by the user of each information processing apparatus has been reflected. Thus, the server apparatus can form identification information based on a collective opinion of multiple users.

In another configuration example, the server apparatus may include server information transmission means. The information transmission means transmits the identification information stored in the server side identification information storage means. The server information reception means may periodically receive the identification information from the server information transmission means.

According to the above configuration example, the server apparatus periodically transmits the identification information in which the result of determination as being inappropriate by each user has been reflected. Thus, each information processing apparatus included in the system can identify data which should not be provided, on the basis of the identification information in which the latest result has been reflected.

In another configuration example, the server side update means may update the identification information stored in the server side identification information storage means, when the number of times of transmission of the report data which is transmitted from the transmission means of each information processing apparatus becomes equal to or higher than a predetermined threshold.

According to the above configuration example, the number of times which data is determined as being inappropriate by the user of each information processing apparatus included in the system, can be reflected in the identification information.

In another configuration example, the data may include: a content created at least by a user; a user identifier indicating the user that has created the data; and a data identifier of the data. The transmission means may transmit at least the user identifier and the data identifier as the report data to the server apparatus. The server side update means: may update the identification information by adding, to the identification information, the data identifier of a piece of the report data of which the number of times of transmission from the transmission means is equal to or higher than a first threshold; and may update the identification information by adding, to the identification information, the user identifier of a piece of the report data of which the number of times of transmission is equal to or higher than a second threshold higher than the first threshold.

According to the above configuration example, when data is reported to the server apparatus the number of times which is equal to or higher than the first threshold which is a relatively small value, an identifier unique to the data is added as identification information. Thus, setting can be performed such that only the data is not to be provided. In other words, limitations which are relatively not strict are provided. In addition, when data is reported to the server apparatus the number of times which is equal to or higher than the second threshold which is a relatively large value, an identifier indicating a creator of the data is added as identification information. Thus, data which is set so as not to be provided is increased in number, and relatively strict limitations are provided. In this manner, depending on the number of times of reporting, limitations for setting data such that the data is not to be provided can be set stepwise.

In another configuration example, among the data received by the data transmission/reception means, the output means: may not output a piece of the data of which the data identifier agrees with the data identifier included in the identification information, and a piece of the data of which the user identifier agrees with the user identifier included in the identification information; and may output a piece of the data of which the data identifier and the user identifier do not agree with the data identifier and the user identifier, respectively, included in the identification information.

According to the above configuration example, data can be actually provided under the limitations which are set stepwise by using the first and second thresholds.

In another configuration example, the data may include: a content which are created using any one of a plurality of applications and at least by a user; a user identifier indicating the user that has created the data; and an application identifier indicating an application program used for crating the data. The server side update means: may update the identification information by adding, to the identification information, a combination of the user identifier and the application identifier of a piece of the report data of which the number of times of transmission from the transmission means is equal to or higher than a second threshold; and may update the identification information by adding, to the identification information, a combination of: the application identifier indicating all application programs; and the user identifier of a piece of the report data of which the number of times of transmission is equal to or higher than a third threshold higher than the second threshold.

According to the above configuration example, when data is reported to the server apparatus the number of times which is equal to or higher than the second threshold which is a relatively small value, a combination of: an identifier indicating a creator of the reported data; and an identifier of an application used for creating the reported data is added as identification information. Thus, data of which a creator and a used application agree with the creator and the application of the identifiers as the identification information can be set so as not to be provided. In other words, limitations which are relatively not strict are provided. In addition, when data is reported to the server apparatus the number of times which is equal to or higher than the third threshold which is a relatively large value, a combination of: an identifier indicating a creator of the reported data; and the identifier indicating all applications is added as identification information. Thus, any piece of data of which a creator agrees with the creator of the identifier in the combination as the identification information can be set so as not to be provided, regardless of the application. In other words, relatively strict limitations are provided. In this manner, depending on the number of times of reporting, limitations for setting data such that the data is not to be provided can be set stepwise.

In another configuration example, among the data received by the data transmission/reception means, the output means: may not output a piece of the data of which a combination of the application identifier and the user identifier agrees with a combination of the application identifier and the user identifier included in the identification information; and may output a piece of the data of which a combination of the application identifier and the user identifier does not agree with the combination of the application identifier and the user identifier included in the identification information.

According to the above configuration example, data can be actually provided under the limitations which are set stepwise by using the second and third thresholds.

In another configuration example, each information processing apparatus may further include acceptance means and transmission means. The acceptance means accepts, from a user, a selection of a piece of the data which is to be set so as not to be outputted, from among the data received by the data transmission/reception means. The transmission means transmits at least a part of: the piece of the data accepted by the acceptance means; or information related to the piece of the data, as report data to the server apparatus. The server apparatus may include notifying means, server side update means, and server side identification information storage means. The notifying means notifies that the piece of the data identified by using the report data is inappropriate data, on the basis of the report data transmitted from the transmission means of each information processing apparatus. The server side update means updates the identification information which is to be transmitted to each information processing apparatus, by an operation performed by a user of the server apparatus which is notified by the notifying means. The server side identification information storage means stores the identification information updated by the server side update means.

According to the above configuration example, on the basis of the report data transmitted from the multiple information processing apparatuses included in the system, the user of the server apparatus can receive a notification in which the result of determination as being inappropriate by the user of each information processing apparatus has been reflected. Thus, the user of the server apparatus can easily know what data is felt by many users as being inappropriate.

In another configuration example, the notifying means may notify that a piece of the data, which is identified by using a piece of the report data of which the number of times of transmission from the transmission means of each information processing apparatus is equal to or higher than a predetermined threshold, is inappropriate data.

According to the above configuration example, the user of the server apparatus can be notified of what the data, which is determined as being inappropriate by a definite number or more of the users of the information processing apparatuses included in the system, is.

In another configuration example, when the identification information received by the server information reception means is newer than the identification information already stored in the information processing apparatus, the update means may update the identification information by adding, to the already stored identification information, a difference between the received identification information and the already stored identification information, or by overwriting the already stored identification information with an entirety of the received identification information.

According to the above configuration example, when the identification information administered by the server apparatus is new, the identification information is updated in the information processing apparatus. Thus, the latest identification information can be efficiently maintained.

In another configuration example, the update means may update the identification information stored in the information processing apparatus, at a time when the identification information is received by the server information reception means.

According to the above configuration example, the identification information administered by the server apparatus is constantly regarded as the latest identification information and the identification information in the information processing apparatus is immediately updated. Thus, the latest identification information can be efficiently maintained.

In another configuration example, each information processing apparatus may further include wireless communication means. The wireless communication means repeatedly searches for another information processing apparatus present within a communicable range to automatically and wirelessly connect to the other information processing apparatus by using near-field radio, and automatically communicates with the other information processing apparatus. The data transmission/reception means may automatically transmit and receive the data by using the wireless communication means.

According to the above configuration example, unexpected data may be received since data is automatically transmitted and received to and from another information processing apparatus, but inappropriate data can be prevented from being outputted, since the identification information is received from another information processing apparatus.

In another configuration example, each information processing apparatus may further include data storage means. The data storage means stores the data which has been previously received by the data transmission/reception means. Among the data stored in the data storage means, the output means may not output the piece of the data which is identified by the identification information stored in the identification information storage means.

According to the above configuration example, by using the latest identification information, it can be determined whether or not it is possible to provide each of all pieces of data which have been previously received.

In another configuration example, each information processing apparatus may be portable.

According to the above configuration example, since each information processing apparatus is portable, even when transmission and reception of data are performed relatively many times, inappropriate data can be prevented from being provided to the user of each information processing apparatus.

Further, the example embodiments presented herein may be implemented in the form of a computer-readable storage medium having stored therein an information processing program including the above respective means, in the form of an information processing system including the above respective means, or in the form of an information processing method including actions performed by the above respective means.

According to the present embodiments, an information processing apparatus, a computer-readable storage medium having stored an information processing program therein, an information processing method, and an information processing system, which can share, with another apparatus, information regarding data which should not be provided to a user, can be provided.

These and other features, aspects and advantages of the present embodiments will become more apparent from the following detailed description of the present embodiments when taken in conjunction with the accompanying drawings.

BRIEF DESCRIPTION OF THE DRAWINGS

FIG. 8G is a flowchart showing an example of an Internet communication process performed by the game apparatus 10 in FIG. 1 executing an Internet communication process program;

FIG. 9 is a flowchart showing an example of a server process performed by the server 5 in FIG. 3 executing the server process program.

DESCRIPTION OF THE PREFERRED EMBODIMENTS

First Embodiment

With reference to the drawings, an information processing apparatus executing an information processing program according to a first embodiment of the present invention will be described. The information processing program of the present invention embodiment is usable by being executed in any computer system. Hereinafter, a hand-held game apparatus 10 will be described as an example of the information processing apparatus, and an information processing program executed in the game apparatus 10 will be described as an example of the information processing program of the present embodiment.

[External Configuration of Game Apparatus]

Figure 1:
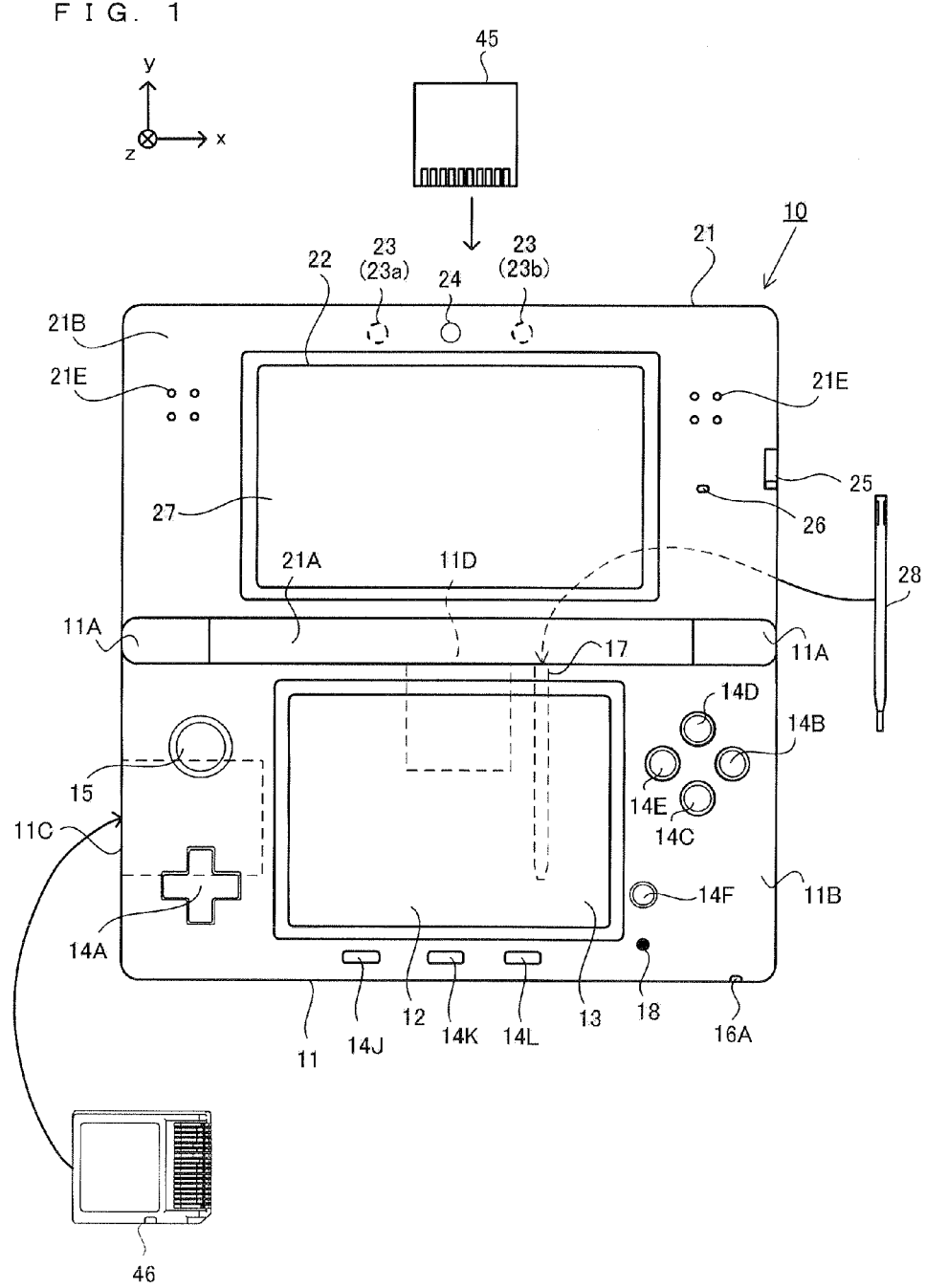
FIG. 1 is an external view of a game apparatus 10 which executes an information processing program according to an embodiment.

First, an external configuration of the game apparatus 10 will be described with reference to FIG. 1. FIG. 1 is a plan view illustrating an example of an appearance of the game apparatus 10. The game apparatus 10 is configured to be foldable. FIG. 1 is a front view of an example of the game apparatus 10 in an opened state.

The game apparatus 10 includes a lower housing 11 and an upper housing 21 as shown in FIG. 1. The lower housing 11 and the upper housing 21 are connected to each other so as to be openable and closable (foldable). In the example of FIG. 1, the lower housing 11 and the upper housing 21 are each formed in a horizontally long plate-like rectangular shape, and are connected to each other at long side portions thereof so as to be pivotable with respect to each other. Usually, a user uses the game apparatus 10 in the opened state. When not using the game apparatus 10, the user keeps the game apparatus 10 in a closed state. In addition to the closed state and the opened state, the game apparatus 10 is capable of maintaining any angle between the lower housing 11 and the upper housing 21, which angle ranges between the closed state and the opened state, by frictional force generated at a connection portion, and the like. In other words, the upper housing 21 can be caused to remain stationary at any angle with respect to the lower housing 11.

In the lower housing 11, a lower LCD (Liquid Crystal Display) 12, a touch panel 13, operation buttons 14A to 14L (FIGS. 1 and 3), an analog stick 15, LEDS 16A and 16B, an insertion opening 17, and a microphone hole 18 are provided. The following will describe these components.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening provided in the inner side surface of the lower housing 11. When the game apparatus 10 is not used, the game apparatus 10 is in the closed state, thereby preventing the screen of the lower LCD 12 from becoming unclean and damaged. Although an LCD is used as a display device in the present embodiment, any other display device such as a display device using EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted so as to cover the screen of the lower LCD 12. In the present embodiment, for example, a resistive film type touch panel is used as the touch panel 13. However, the touch panel 13 is not limited thereto, and any press-type touch panel such as electrostatic capacitance type may be used In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by a broken line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

The button 14B, the button 14C, the button 14D, and the button 14E, which are positioned so as to form a cross shape, are arranged in a position where a thumb of a right hand holding the lower housing 11 is naturally located. In addition, these four buttons and the analog stick 15 are positioned so as to be symmetrical about the lower LCD 12. Thus, depending on a game program, for example, a left-handed user can perform a direction instruction input by using these four buttons.

In FIG. 1, the operation buttons 14G to 14I are omitted. For example, the L button 14G is provided on the left end portion of the upper side surface of the lower housing 11, and the R button 14H is provided on the right end portion of the upper side surface of the lower housing 11. The L button 14G and the R button 14H are used, for example, for performing an imaging instruction operation (shutter operation) on the game apparatus 10. In addition, the volume button 14I is provided on the left side surface of the lower housing 11. The volume button 14I is used for adjusting a sound volume of a speaker of the game apparatus 10.

Further, the microphone hole 18 is provided on the inner side surface of the lower housing 11. Under the microphone hole 18, a microphone (see FIG. 2) is provided as a sound input device described below, and the microphone detects for a sound from the outside of the game apparatus 10.

Further, in the left side surface of the lower housing 11, a cover 11C is provided so as to be openable and closable. Inside the cover 11C, a connector (not shown) is provided for electrically connecting between the game apparatus 10 and an external data storage memory 46. The external data storage memory 46 is detachably connected to the connector. The external data storage memory 46 is used for, for example, recording (storing) data of an image taken by the game apparatus 10. The connector and the cover 11C may be provided on the right side surface of the lower housing 11.

Further, an insertion opening 11D through which an external memory 45 having stored a game program therein is inserted is provided on the upper side surface of the lower housing 11. A connector (not shown) for electrically connecting between the game apparatus 10 and the external memory 45 in a detachable manner is provided inside the insertion opening 11D. A predetermined game program is executed by connecting the external memory 45 to the game apparatus 10. The connector and the insertion opening 11D may be provided on another side surface (for example, the right side surface) of the lower housing 11.

As shown in FIG. 1, the first LED 16A for notifying a user of an ON/OFF state of a power supply of the game apparatus 10 is provided on the lower side surface of the lower housing 11. In addition, although not shown, the second LED 16B for notifying a user of an establishment state of a wireless communication of the game apparatus 10 is provided on the right side surface of the lower housing 11. The game apparatus 10 can perform wireless communication with other devices, and the second LED 16B is lit up when a wireless communication with another device is established. The game apparatus 10 has a function of connecting to a wireless LAN in a method conforming to, for example, IEEE802.11.b/g standard. A wireless switch 19 (not shown) for enabling/disabling the function of the wireless communication is also provided on the right side surface of the lower housing 11.

A rechargeable battery (not shown) acting as a power supply for the game apparatus 10 is accommodated in the lower housing 11, and the battery can be charged through a terminal provided on a side surface (for example, the upper side surface) of the lower housing 11.

In the upper housing 21, an upper LCD 22, two imaging sections (an outer left imaging section 23a and an outer right imaging section 23b), an inner imaging section 24, a 3D adjustment switch 25, and a 3D indicator 26 are provided. The following will describe theses components in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12, for example. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

The screen of the upper LCD 22 is provided on the inner side surface (main surface) 21B of the upper housing 21, and the screen of the upper LCD 22 is exposed at an opening provided in the inner side surface of the upper housing 21. Further, the inner side surface of the upper housing 21 is covered with a transparent screen cover 27 (not shown). The screen cover 27 protects the screen of the upper LCD 22, and integrates the upper LCD 22 and the inner side surface of the upper housing 21 with each other, thereby achieving unity. Although, in the present embodiment, the upper LCD 22 is an LCD, a display device using EL, or the like may be used. In addition, a display device having any resolution may be used as the upper LCD 22.

The upper LCD 22 is a display device capable of displaying a stereoscopically visible image by utilizing a lenticular lens method or a parallax barrier method. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

An outer imaging section 23 is a generic term of the two imaging sections (the outer left imaging section 23a and the outer right imaging section 23b) provided on an outer side surface 21D (not shown) of the upper housing 21 (the back surface opposite to the main surface of the upper housing 21 on which the upper LCD 22 is provided). The imaging directions of the outer left imaging section 23a and the outer right imaging section 23b agree with the outward normal direction of the outer side surface 21D, and are parallel to each other. In addition, the outer left imaging section 23a and the outer right imaging section 23b are positioned such that their imaging directions are 180 degrees opposite the normal direction of the display surface (inner surface) of the upper LCD 22. In other words, the imaging direction of the outer left imaging section 23a and the imaging direction of the outer right imaging section 23b are parallel to each other. The outer left imaging section 23a and the outer right imaging section 23b can be used as a stereo camera depending on a program executed by the game apparatus 10. Further, depending on a program, images taken by the two outer imaging sections (the outer left imaging section 23a and the outer right imaging section 23b) may be combined with each other or may compensate for each other, thereby enabling imaging using an extended imaging range. Further, depending on a program, when any one of the two outer imaging sections (the outer left imaging section 23a and the outer right imaging section 23b) is used alone, the outer imaging section 23 may be used as a non-stereo camera. In the present embodiment, the outer imaging section 23 is constituted of the two imaging sections, namely, the outer left imaging section 23a and the outer right imaging section 23b. Each of the outer left imaging section 23a and the outer right imaging section 23b includes an imaging device, such as a CCD image sensor or a CMOS image sensor, having a common predetermined resolution, and a lens. The lens may have a zooming mechanism.

Note that, in the present embodiment, the outer left imaging section 23a and the outer right imaging section 23b are fixed to the housing and thus the imaging directions thereof cannot be changed.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1, the inner imaging section 24 is positioned on the inner side surface of the upper housing 21 at a position reverse of the middle position between the outer left imaging section 23a and the outer right imaging section 23b. In such a configuration, the inner imaging section 24 takes an image in an opposite direction to the outer imaging section 23, and thus can take an image of the face of the user from the front thereof.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. The 3D adjustment switch 25 has a slider which is slidable to any position in a predetermined direction (along the longitudinal direction of the right side surface), and a display mode of the upper LCD 22 is determined in accordance with the position of the slider.

For example, when the slider of the 3D adjustment switch 25 is positioned at the lowermost position, the upper LCD 22 is set to the planar display mode, and a planar image is displayed on the screen of the upper LCD 22. On the other hand, when the slider is positioned above the lowermost position, the upper LCD 22 is set to the stereoscopic display mode. In this case, a stereoscopically visible image is displayed on the screen of the upper LCD 22. When the slider is positioned above the lowermost position, a manner in which the stereoscopic image is visible is adjusted in accordance with the position of the slider. Specifically, an amount of deviation in the horizontal direction between a position of an image for a right eye and a position of an image for a left eye is adjusted in accordance with the position of the slider.

The 3D indicator 26 indicates whether or not the upper LCD 22 is in the stereoscopic display mode. For example, the 3D indicator 26 is implemented by an LED, and is lit up when the stereoscopic display mode of the upper LCD 22 is enabled. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 44 described below.

[Internal Configuration of Game Apparatus]

Figure 2:
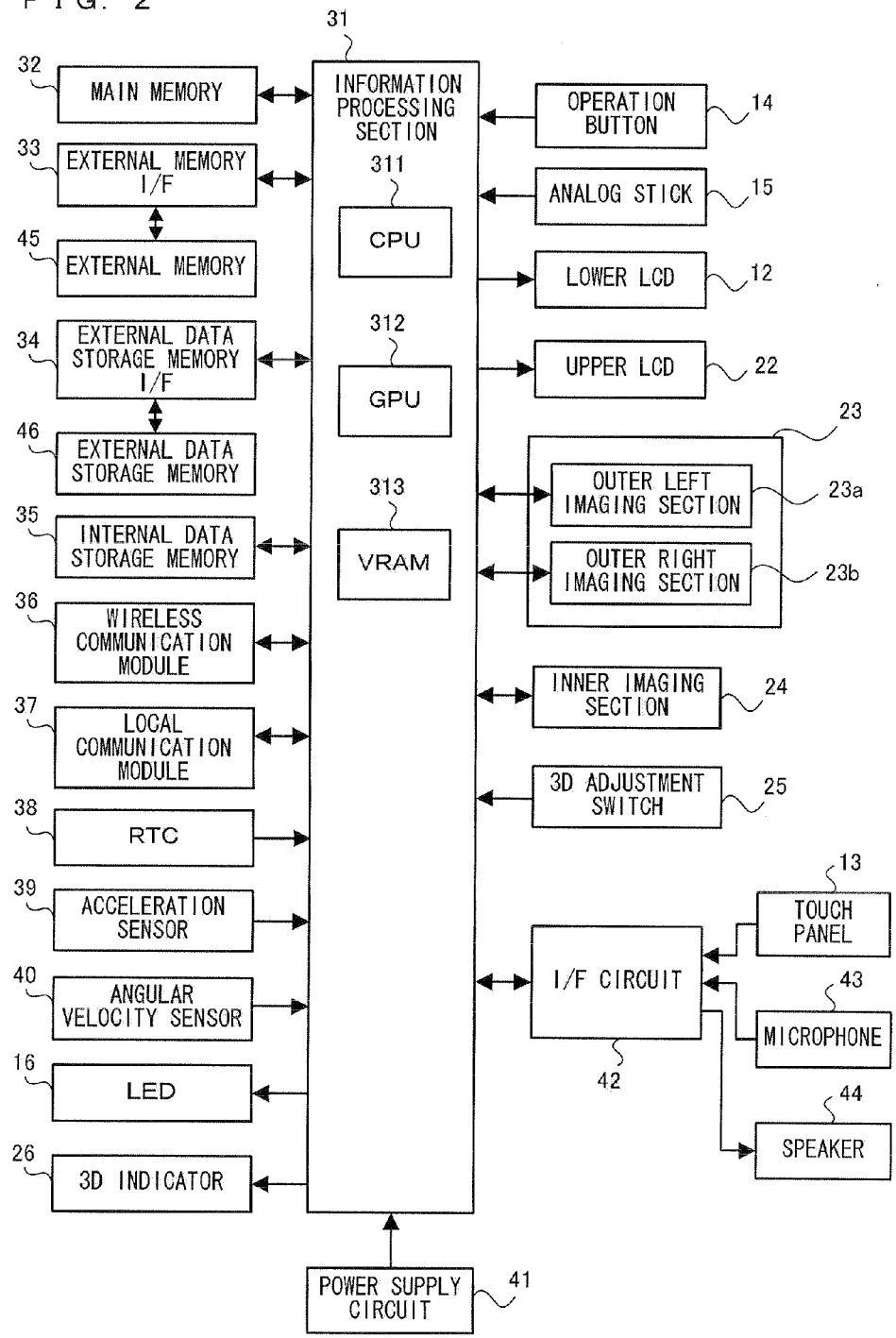
FIG. 2 is a block diagram illustrating an example of an internal configuration of the game apparatus 10 in FIG. 1.

Next, an internal configuration of the game apparatus 10 will be described with reference to FIG. 2. FIG. 2 is a block diagram illustrating an example of the internal configuration of the game apparatus 10.

As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40, a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 45 connected to the external memory I/F 33 or the internal data storage memory 35) inside the game apparatus 10. The CPU 311 of the information processing section 31 executes information processing described below, and the like, by executing the predetermined program. The program executed by the CPU 311 of the information processing section 31 may be acquired from another device through communication with the other device. The information processing section 31 includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for the information processing section 31 (the CPU 311). That is, the main memory 32 temporarily stores various types of data used for image processing or game processing, and temporarily stores a program acquired from the outside (the external memory 45, another device, or the like), for example. In the present embodiment, for example, a PSRAM (Pseudo-SRAM) is used as the main memory 32.

The external memory 45 is non-volatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed. The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication by using the wireless communication module 36 is stored in the internal data storage memory 35.

The wireless communication module 36 has a function of connecting to a wireless LAN by using a method conforming to, for example, IEEE 802.11.b/g standard. The local communication module 37 has a function of performing wireless communication with the same type of game apparatus in a predetermined communication method. The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The local communication module 37 functions to wirelessly communicate with a game apparatus of the same type by a predetermined communication method. Here, radio waves used by the local communication module 37 for this wireless communication are, for example, weak radio waves which are allowed to be used without a radio station license, and the local communication module 37 performs near-field wireless communication of which data transmission distance is, for example, within 10 m. Thus, when the game apparatus 10 is located within a communicable range of another game apparatus 10 (e.g., both apparatuses are within 10 m from each other), the information processing section 31 can transmit or receive data to or from the other game apparatus 10 by using the local communication module 37. The data transmission or reception may be automatically and repeatedly performed in predetermined cycles, depending on user's selection. In other words, the information processing section 31 detects another game apparatus 10 which is present within a range in which the above near-field wireless communication is possible, and automatically starts communication with the detected game apparatus 10 to transmit or receive data thereto or therefrom. Then, after the communication is completed, the information processing section 31 automatically cuts off the communication. In the present embodiment, the process from automatic start of the communication to completion of the communication is repeatedly performed in predetermined cycles. The communication is referred to as "passing communication", and a process for the passing communication is referred to as "passing communication process".

The passing communication process is constantly performed when a plurality of game apparatuses 10 performing communication have been turned on. In other words, the passing communication process is performed, not only when the plurality of game apparatuses 10 have been set to be in a sleep mode but also when applications are being executed. Note that the sleep mode is a power saving mode, and corresponds to a state where some functions in the game apparatus 10 (e.g., some of the functions of the information processing section 31, and some of the functions of the display) are stopped. For example, a state where the CPU 311 is stopped such that any application is not executed also corresponds to the sleep mode.

The acceleration sensor 39 is connected to the information processing section 31. The acceleration sensor 39 detects magnitudes of accelerations (linear accelerations) in the directions of the straight lines along the three axial directions (xyz axial directions in the present embodiment), respectively. The acceleration sensor 39 is provided, for example, inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting the magnitude of the linear acceleration in each axial direction of the game apparatus 10. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and calculate an orientation and a motion of the game apparatus 10.

The angular velocity sensor 40 is connected to the information processing section 31. The angular velocity sensor 40 detects angular velocities about three axes (X-axis, Y-axis, Z-axis in the present embodiment) of the game apparatus 10, and outputs data (angular velocity data) indicative of the detected angular velocities, to the information processing section 31. The angular velocity sensor 40 is provided, for example, inside the lower housing 11. The information processing section 31 receives the angular velocity data outputted from the angular velocity sensor 40, and calculates an orientation and a motion of the game apparatus 10.

The RTC 38 and the power supply circuit 41 are connected to the information processing section 31. The RTC 38 counts time, and outputs the time to the information processing section 31. The information processing section 31 calculates a current time (date) based on the time counted by the RTC 38. The power supply circuit 41 controls power from the power supply (the rechargeable battery accommodated in the lower housing 11 as described above) of the game apparatus 10, and supplies power to each component of the game apparatus 10.

The I/F circuit 42 is connected to the information processing section 31. The microphone 43, the speaker 44, and the touch panel 13 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies a sound signal outputted from the I/F circuit 42, and a sound is outputted from the speaker 44. The I/F circuit 42 includes a sound control circuit for controlling the microphone 43 and the speaker 44 (amplifier), and a touch panel control circuit for controlling the touch panel 13. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position (touch position), on an input surface of the touch panel 13, on which an input is made. The touch panel control circuit reads a signal outputted from the touch panel 13, and generates the touch position data every predetermined time. The information processing section 31 acquires the touch position data, to recognize a touch position on which an input is made on the touch panel 13.

An operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the present embodiment, the information processing section 31 causes the lower LCD 12 and/or the upper LCD 22 to display thereon contents such as a character included in later-described user created data. Further, the information processing section 31 also causes the upper LCD 22 to display thereon a stereoscopic image (stereoscopically visible image) by using an image for a right eye and an image for a left eye which are taken by the outer imaging section 23, causes the upper LCD 22 to display thereon a planar image taken by the inner imaging section 24, and causes the upper LCD 22 to display thereon a planar image by using an image for a right eye or an image for a left eye which are taken by the outer imaging section 23.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 (which are taken by the outer imaging section 23) are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13 or the operation button 14. When the information processing section 31 (the CPU 311) detects that the imaging section is selected, the information processing section 31 instructs one of the outer imaging section 23 or the inner imaging section 24 to take an image.

The 3D adjustment switch 25 is connected to the information processing section 31. The 3D adjustment switch 25 transmits, to the information processing section 31, an electrical signal in accordance with the position of the slider.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

[Network Configuration]

Figure 3:
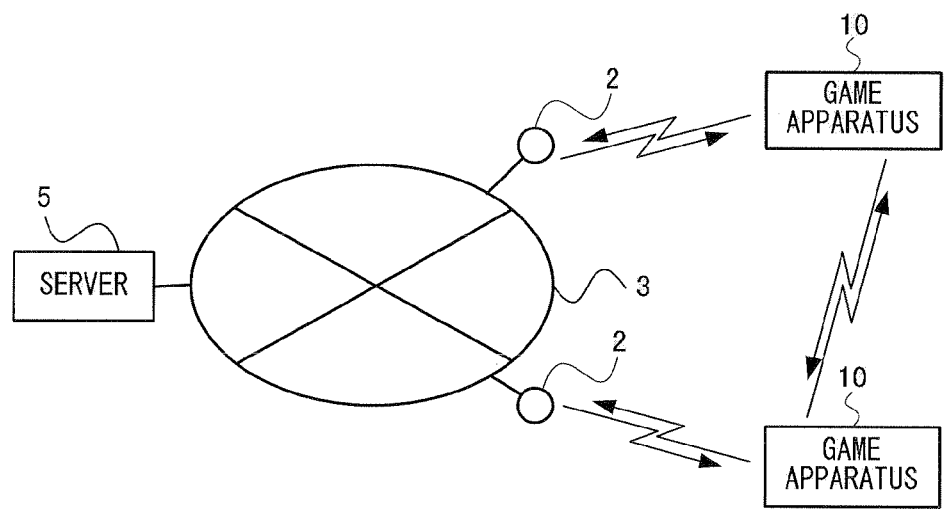
FIG. 3 is a diagram illustrating an exemplary configuration of an information processing system which includes a server 5 and the game apparatuses 10 shown in FIG. 1.

Next, a network configuration in the present embodiment will be described with reference to FIG. 3. FIG. 3 is a diagram illustrating the network configuration in the present embodiment.

In FIG. 3, a network in the present embodiment includes game apparatuses 10, access points (hereinafter, referred to as APs) 2, an Internet communication network 3, and a server 5. Specifically, the network in the present embodiment includes: the game apparatuses 10 which can perform near-field wireless communication with each other by using the local communication modules 37 as described above; the APs 2 with which these game apparatuses 10 are wirelessly communicable by using the wireless communication modules 36; and the server 5 which is communicable with each game apparatus 10 via an AP 2 and the Internet communication network 3.

The APs 2 are conventionally known access points. The APs 2 are connected to the Internet communication network 3. Each game apparatus 10 is communicable with various communication terminals connected to the Internet communication network 3, via an AP 2 located within the communication range of the wireless communication module 36. Each AP 2 in the present embodiment corresponds to, for example, an AP which is administered by the manufacturer of the game apparatuses 10, an AP which is set at user's home, or an AP which is set by a company other than the manufacturer of the game apparatuses 10.

Figure 4:
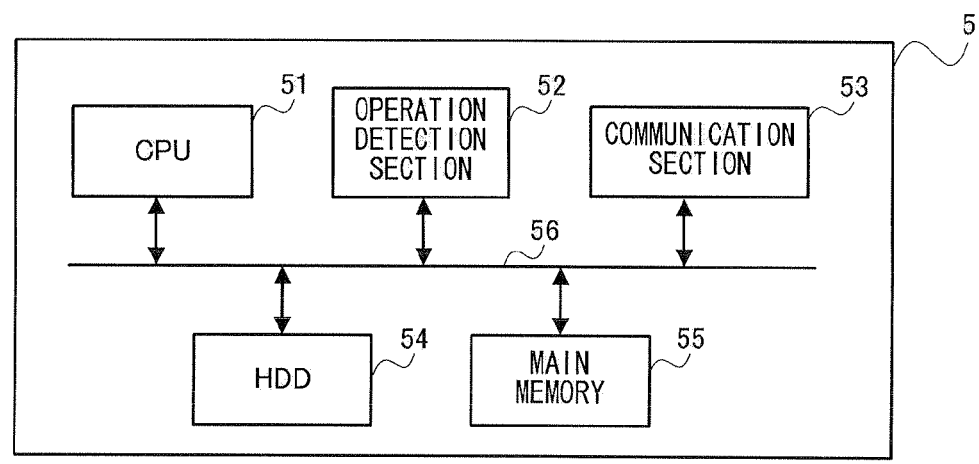
FIG. 4 is a block diagram illustrating an example of an internal configuration of the server 5 in FIG. 3.

The server 5 is connected to the Internet communication network 3, and communicable with each game apparatus 10 connected to the Internet communication network 3 via an AP 2. FIG. 4 is a diagram illustrating an example of an internal configuration of the server 5.

The server 5 includes a CPU 51, an operation detection section 52, a communication section 53, an HDD 54, and a main memory 55, and these components are communicably connected to each other via a communication bus 56.

The CPU 51 performs processing in accordance with various programs stored in the main memory 55. The operation detection section 52 detects an operation performed by a user (e.g., a server administrator) on an input device (e.g., a keyboard) of the server 5. The communication section 53 communicates with various communication apparatuses connected to the Internet communication network 3, via the Internet communication network 3. The HDD 54 is a conventionally known hard disk drive, and has stored therein various programs which are executed by the CPU 51. The main memory 55 stores various programs which are read out from the HDD 54 when the CPU 51 starts processing. Although details will be described later, a global black list (hereinafter, referred to as GBL) is stored in the main memory 55 and downloaded to each game apparatus 10 via the communication section 53 and the Internet communication network 3. Each game apparatus 10 performs processing on the basis of the GBL downloaded from the server 5. Further, the server 5 functions to accept data transmitted from a user to another user and temporarily store the data. Here, examples of the data accepted by the server 5 include later-described user created data indicating a character.

In the present invention, it is assumed that data freely created by any user using the game apparatus 10 (hereinafter, referred to as user created data) is transmitted and received between an unspecified number of game apparatuses 10. When the user created data is transmitted and received between the game apparatuses 10, depending on users' selection, transmission and reception may be immediately performed, or may be automatically performed at a timing when the passing communication or later-described Internet communication becomes possible. In the present invention, of data received from another game apparatus 10, user created data indicating a content which is inappropriate to be displayed is set as non-display data, so that the content is not to be displayed.

Figure 5:
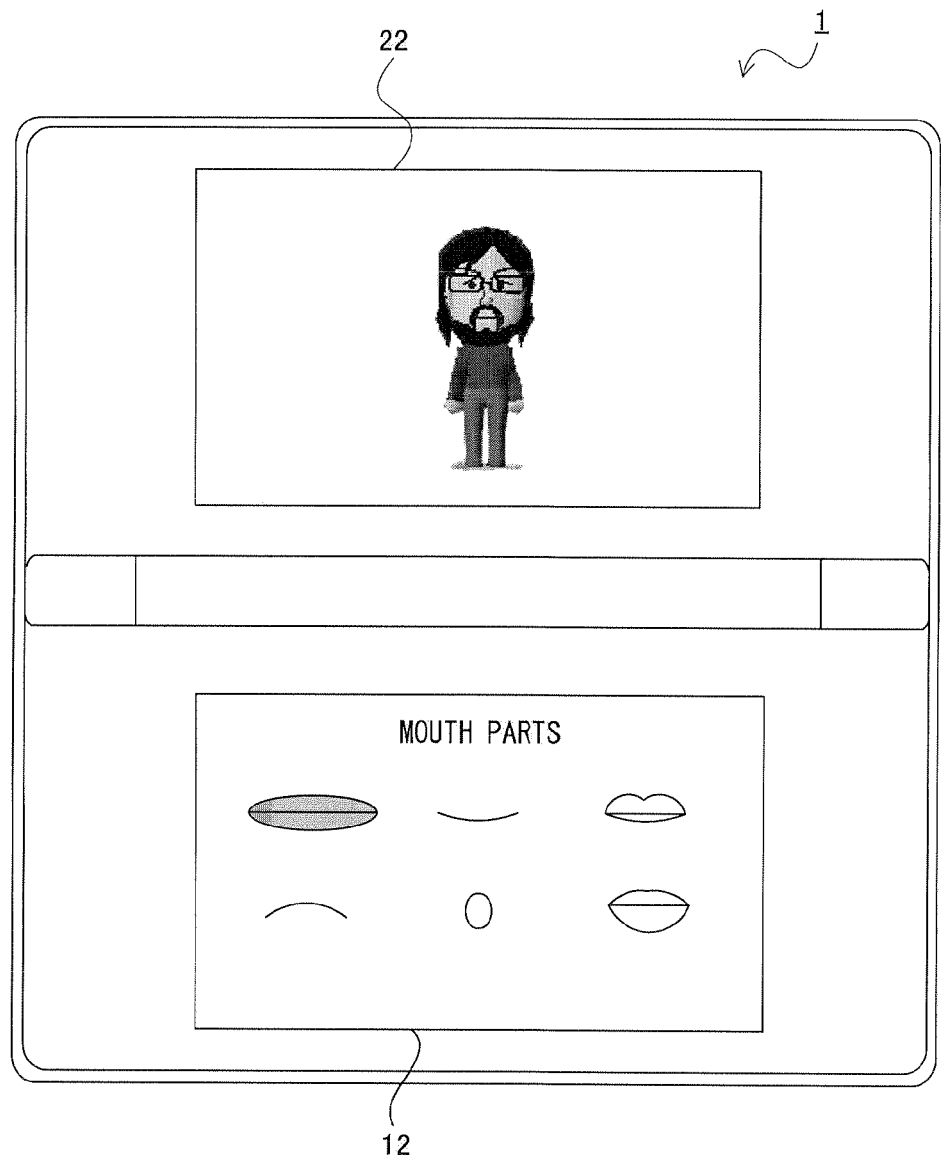
FIG. 5 is a diagram illustrating an example of a character part candidate selection screen in the present embodiment.

An example of the user created data is data indicating a character which is freely created by a user. FIG. 5 is a diagram illustrating an example of the game apparatus 10 in which a screen for creating a character is displayed during execution of an application handling a character (hereinafter, referred to as a character handling application). In FIG. 5, a screen for selecting a mouth part from among its candidates is displayed on the lower LCD 12 as a screen for selecting a part partially forming a character. Further, in FIG. 5, a character formed from each already selected part is displayed on the upper LCD 22. In the present embodiment, as shown as an example in FIG. 5, the user can create a character by selecting each part forming the character, from among its candidates by using the aforementioned input device of the game apparatus 10. Then, in the present embodiment, user created data indicating a character created by each user is transmitted and received between an unspecified number of game apparatuses 10.

As described above, the user can freely create a character. Thus, for example, the user can create, as user created data, data indicating a morally inappropriate content such as a character representing a previously-existing criminal. Then, such data indicating a morally inappropriate content is also transmitted and received between an unspecified number of game apparatuses 10. Regarding the received user created data, unless previously identified in the game apparatus 10 which has received the data, the content is displayed to the user.

Therefore, in the present invention, even when such user created data indicating a morally inappropriate content is received, the data is set as non-display data, so that the content is not to be displayed. In the present invention, in order to identify non-display data from among received data, the aforementioned GBL and a local black list (hereinafter, referred to as LBL) are used. The following will describe an outline of an information processing system according to the present invention.

Figure 6:
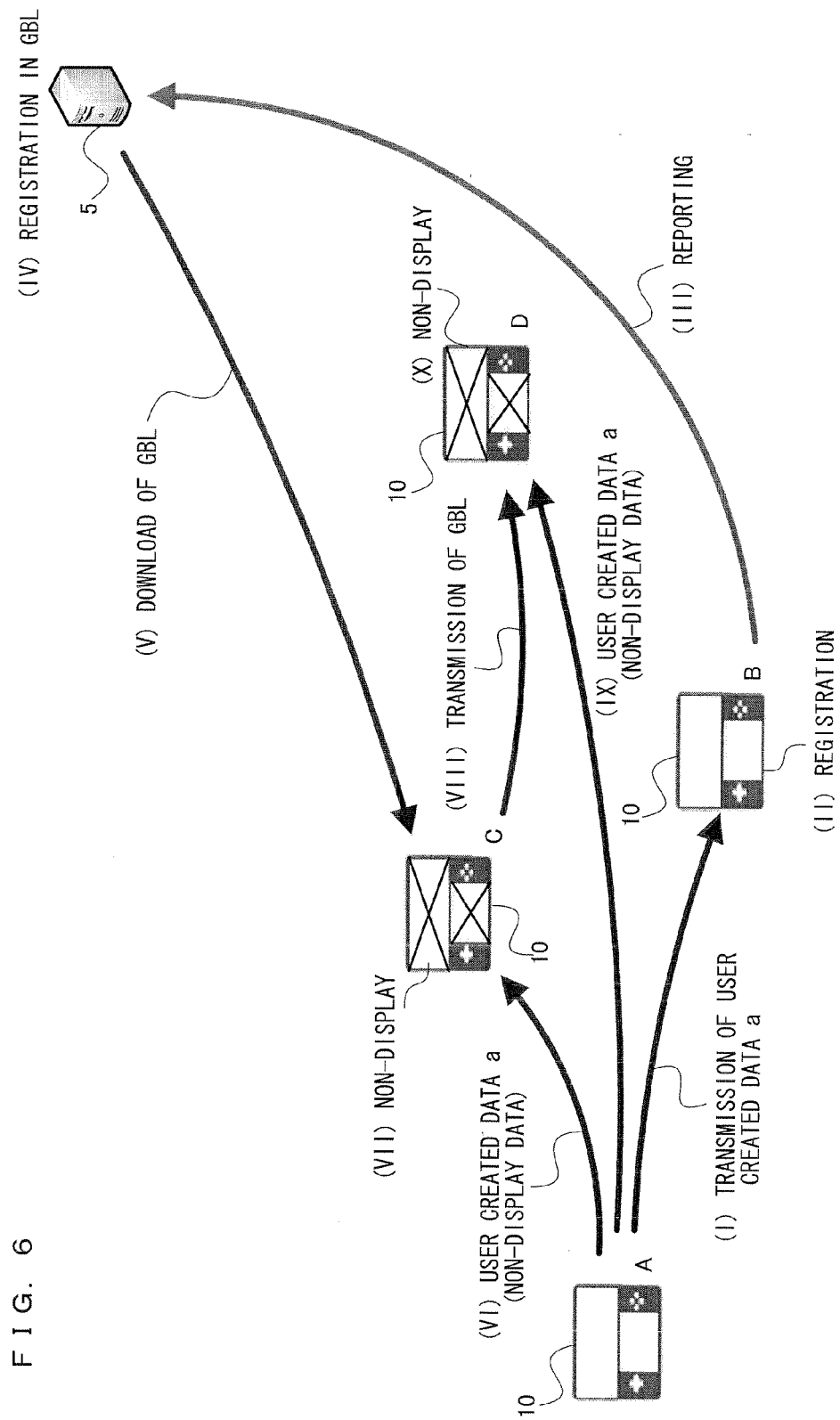
FIG. 6 is a diagram for schematically illustrating the information processing system according to the embodiment of the present embodiment.

FIG. 6 is a diagram for schematically illustrating the information processing system according to the present invention (hereinafter, referred to merely as present system). FIG. 6 shows four game apparatuses 10, which are game apparatuses A to D, and the server 5. Further, in FIG. 6, numerals (I) to (X) are assigned to actions in the present system in time-sequential order.

In FIG. 6, for example, the following assumption is made: a user of the game apparatus A creates user created data (hereinafter, referred to as user created data a); the user created data a is transmitted from the game apparatus A to the game apparatus B by the passing communication ((I) in FIG. 6); and a user of the game apparatus B feels that a character indicated by the received user created data a is morally inappropriate. In this case, in the present system, the user of the game apparatus B can register the user created data a in an LBL stored in the game apparatus B. An LBL is stored in each game apparatus 10, and each user can register any user created data therein ((II) in FIG. 6). A character indicated by user created data which is registered in the LBL is not displayed even when the same data is received after the registration. Note that, in the present system, as an example, the LBL is not transmitted and received between the game apparatuses 10.

Further, in the present system, the user of the game apparatus B can register information (ID) for identifying the user created data a, as non-display data in the LBL, and also can report the user created data a to the server 5. Here, it is assumed that the user of the game apparatus B registers the user created data a in the LBL and also reports the user created data a to the server 5 ((III) in FIG. 6). The server 5 administers the GBL as described above, and accepts reporting from an unspecified number of game apparatuses 10 via the Internet communication network 3. The server 5 registers, as non-display data, a piece of user created data which meets a predetermined condition, among reported user created data, in the GBL. Here, it is assumed that the user created data a reported by the user of the game apparatus B is registered in the GBL ((IV) in FIG. 6). Although details will be described later, when user created data is registered in the GBL, a user ID and a data ID, which are included in the user created data and transmitted when the user created data is reported as described above, are registered in the GBL. Each game apparatus 10 downloads the GBL administered by the server 5, in predetermined cycles, and updates a stored GBL therewith as necessary. Here, it is assumed that the game apparatus C downloads the GBL from the server 5 and updates the stored GBL therewith ((V) in FIG. 6). Thus, in the game apparatus C, the user created data a is identified as non-display data. Accordingly, even when the game apparatus C receives the user created data a, the character indicated by the user created data a is not displayed ((VII) in FIG. 6). As a result, a user of the game apparatus C is prevented from seeing the morally inappropriate character.

Further, unlike the LBL, the GBL is transmitted and received between the game apparatuses 10 by the passing communication, and the stored GBL is updated therewith as necessary. Here, it is assumed that the GBL stored in the game apparatus C is transmitted to the game apparatus D by the passing communication ((VIII) in FIG. 6). The game apparatus D updates the already stored GBL with the GBL received by the passing communication. In this manner, for example, even when the game apparatus D cannot connect to the Internet communication network 3 and cannot download the GBL from the server 5, the game apparatus D can receive the GBL from the game apparatus C and can update the stored GBL with the received GBL. Then, even when the game apparatus D receives the user created data a by the passing communication ((IX) in FIG. 6), the user created data a is identified as non-display data in the game apparatus D. Accordingly, the character indicated by the user created data a is not displayed in the game apparatus D ((X) in FIG. 6). In this manner, in the present system, even when the game apparatus D cannot communicate with the server 5, a user of the game apparatus D is prevented from seeing the morally inappropriate character.

As described above, in the present system, each game apparatus 10 stores the LBL, and each user can register any piece of data among the received user created data therein. In addition, as described above, each user can report to the server 5 any piece of the user created data which is felt by the user as being inappropriate. The server 5 administers the number of times of reporting from each user, registers user created data for which the number of times of reporting exceeds a threshold, as data which meets the predetermined condition, in the GBL, and updates the GBL. In addition, as described above, the GBL administered by the server 5 is downloaded by each game apparatus 10 in predetermined cycles. Then, each game apparatus 10 updates the stored GBL with the downloaded GBL as necessary. Thus, the GBL stored in each game apparatus 10 constantly becomes information indicating latest non-display data. Further, the GBL received by the game apparatus 10 can be exchanged by the passing communication. Thus, even a game apparatus 10 which cannot download the GBL from the server 5 can receive the GBL and updates the stored GBL therewith, if communicable with another game apparatus 10. Then, since the game apparatus 10 stores the GBL, even user created data which has not been received yet can be previously set so as not to be displayed, if identified as non-display data. This is the description of the outline of the present system.

[Description of Various Pieces of Data]

Figure 7A:
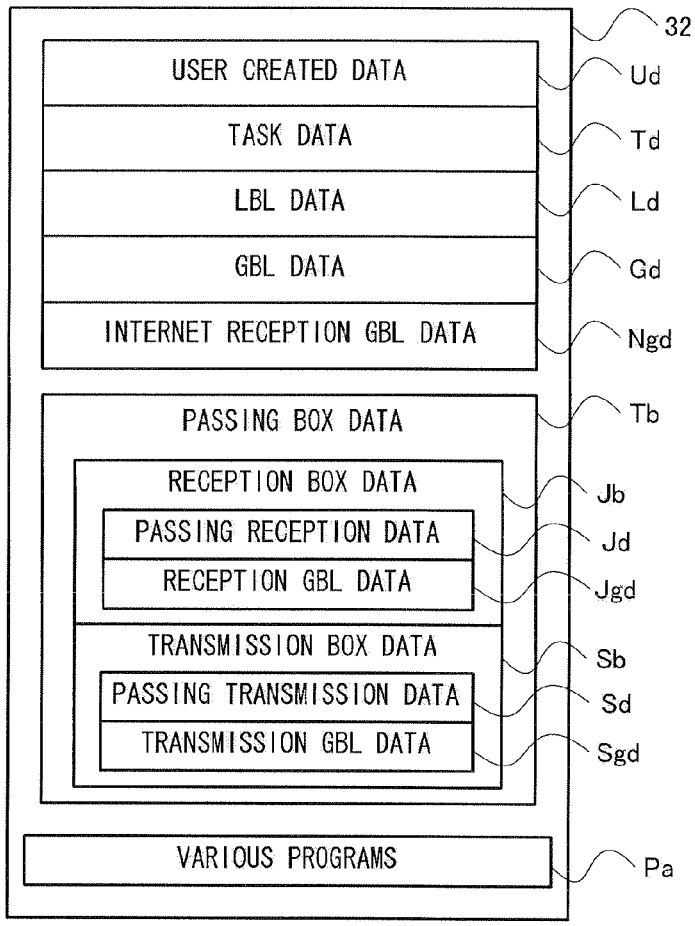
FIG. 7A is a diagram illustrating an example of various pieces of data stored in a main memory 32 in accordance with the information processing program being executed in the game apparatus 10 in FIG. 1.
Figure 7B:
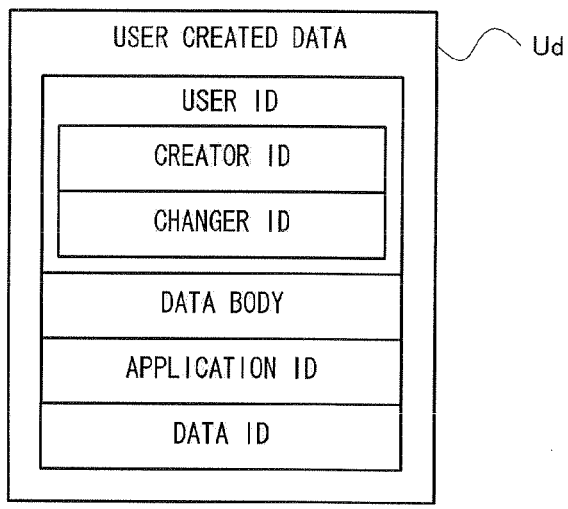
FIG. 7B is a diagram illustrating a more detailed data structure of user created data Ud in FIG. 7A.
Figure 7C:
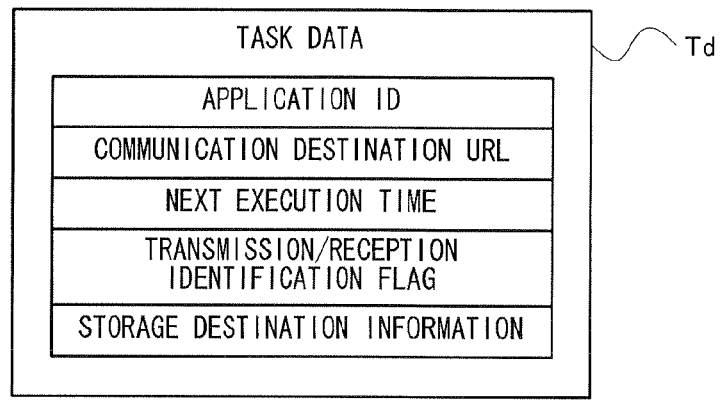
FIG. 7C is a diagram illustrating a more detailed data structure of task data Td in FIG. 7A.
Figure 7D:
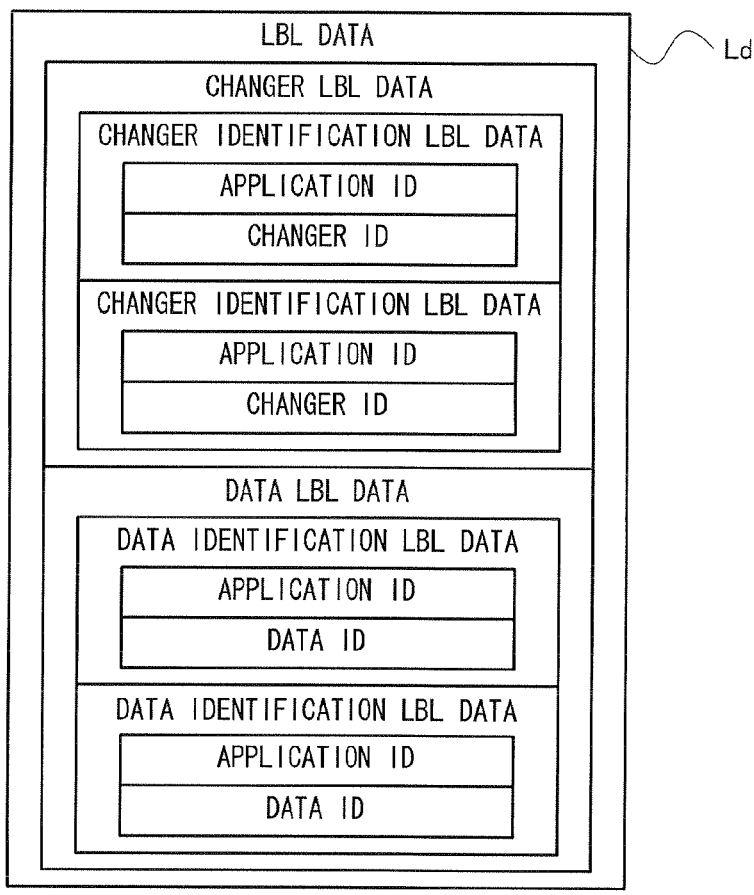
FIG. 7D is a diagram illustrating a more detailed data structure of LBL data Ld in FIG. 7A.
Figure 7E:
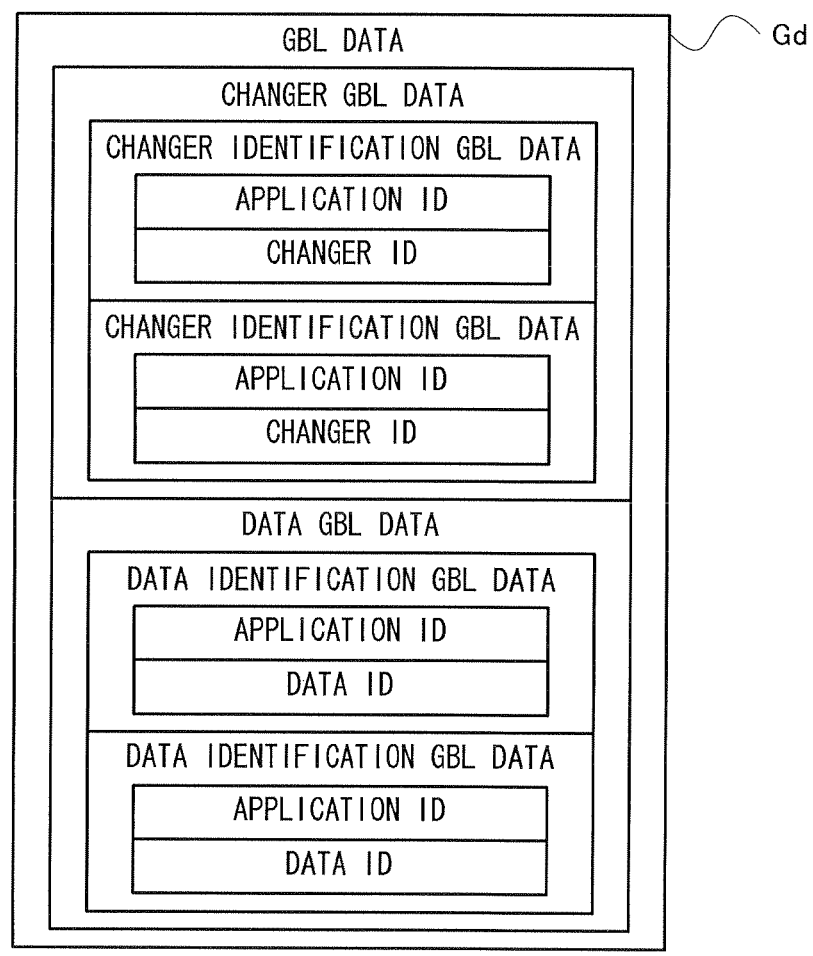
FIG. 7E is a diagram illustrating a more detailed data structure of GBL data Gd in FIG. 7A.
Figure 7F:
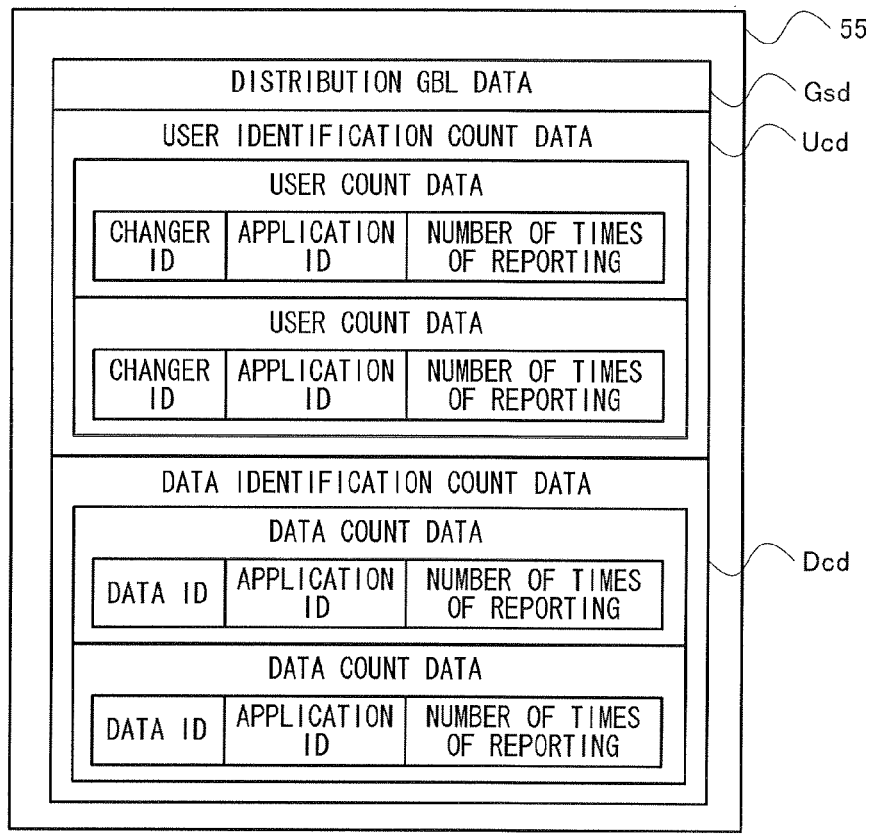
FIG. 7F is a diagram illustrating an example of various pieces of data stored in a main memory 55 in accordance with a server process program being executed in the server 5 in FIG. 4.

Next, prior to specific description of processes performed by each game apparatus 10 and the server 5, data used in each game apparatus 10 and the server 5 will be described with reference to FIGS. 7A to 7F. FIG. 7A illustrates data and various programs which are stored in the main memory 32 in accordance with the power of the game apparatus 10 being turned on. FIG. 7B illustrates a more detailed data structure of user created data Ud shown in FIG. 7A. FIG. 7C illustrates a more detailed data structure of task data Td shown in FIG. 7A. FIG. 7D illustrates a more detailed data structure of LBL data Ld shown in FIG. 7A. FIG. 7E illustrates a more detailed data structure of GBL data Gd shown in FIG. 7A. FIG. 7F illustrates data which is stored in the main memory 55 in accordance with the server 5 executing various programs.

[Data Stored in the Game Apparatus 10]

First, the data and various programs stored in the main memory 32 of the game apparatus 10 will be described with reference to FIGS. 7A to 7E. As shown in FIG. 7A, the user created data Ud, the task data Td, the LBL data Ld, the GBL data Gd, Internet reception GBL data Ngd, passing box data Tb, and various programs Pa, are stored in the main memory 32 of the game apparatus 10.

The user created data Ud is data which is created by the user using an optional application. In the present embodiment, an example of the optional application is the character handling application. Therefore, the user created data Ud in the present embodiment is data indicating a character which is handled in the character handling application. As shown in FIG. 7B, the user created data Ud includes a user ID, a data ID, an application ID, and data body. The following will each piece of the data included in the user created data Ud.

The user ID is data indicating: a user that has newly created a character indicated by the user created data Ud; and a user that has changed an existing character. Specifically, the user ID includes a creator ID and a changer ID. The creator ID is an ID indicating a user that has newly created a character. The creator ID may be any information, as long as it is information which can identify a user that has newly created a character, such as a unique identifier for identifying a game apparatus 10 which is used by the user for newly creating the character. Note that, since the creator ID indicates a user that has newly created a character, the creator ID is not updated.

The changer ID is an ID indicating a user that has changed an existing character. The changer ID may be any information, as long as it is information which can identify a user that has changed an existing character, such as a unique identifier for identifying a game apparatus 10 which is used by the user for changing the existing character. The changer ID is added each time an existing character is changed.

The data body is a content of data indicated by the user created data Ud. The user created data Ud is data created by using an optional application as described above. Then, when the user created data Ud indicates a character handled in the character handling application, the data body is data indicating the shape and color of each part forming the character. The character having the shape indicated by the data body is a character indicated by the user created data Ud including the data body.

The application ID is an ID for uniquely identifying an application handling the user created data Ud which includes the application ID. In other words, the application ID is an ID indicating an application which is used for creating or changing the user created data Ud. In the present embodiment, an ID indicating the character handling application is the application ID. Note that, if an application handling the user created data Ud is the same, the application ID is the same even when the user created data Ud is stored in different game apparatuses 10.

The data ID is an ID for uniquely identifying the aforementioned data body for each application. Thus, even if an application handling the user created data Ud is the same, the data ID is not the same when game apparatuses 10 storing the user created data Ud are different from each other. On the other hand, when the user created data Ud is stored in the same game apparatus 10, the data ID may be the same, even if applications handling the user created data Ud are different from each other.

This is the description of each piece of the data included in the user created data Ud. FIG. 7A illustrates an example of a piece of the user created data Ud stored in the main memory 32. However, by generating a new piece of the user created data Ud or reading an existing piece of the user created data Ud, two or more pieces of user created data Ud are stored in the main memory 32.

When the user newly creates a character by using the character handling application, a new piece of the user created data Ud is generated in the main memory 32. Each time the user newly creates a character, a new piece of the user created data Ud is added to the main memory 32. Then, when the user finishes creating the character and ends the character handling application, the piece of the user created data Ud generated in the main memory 32 is stored in the external data storage memory 46. When the user causes the game apparatus 10 to execute the character handling application, the existing user created data Ud stored in the external data storage memory 46 is read out and stored in the main memory 32. In this case, when one or more pieces of the user created data Ud are stored in the external data storage memory 46, the one or more pieces of the user created data Ud are stored in the main memory 32.

Next, the task data Td will be described. The task data Td is data indicating, as a task, reception or transmission of data using the Internet communication. A task is executed by the CPU 311, regardless of whether or not an application which has generated the task is being executed. The task in the present embodiment is a task executed at a time which is set by the CPU 311. Note that, in another embodiment, as a task executable in the game apparatus 10, there may be a task executed immediately in accordance with an instruction of the user, or a task whose execution priority or execution order is changeable in accordance with information indicating an administrator of an AP 2 which is a communication partner.

As shown as an example in FIG. 7C, the task data Td includes an application ID, a communication destination URL, a next execution time, a reception/transmission identification flag, and storage destination information.

The application ID is an ID for uniquely identifying an application which is used for generating the task data Td. The communication destination URL indicates a communication destination from or to which data is received or transmitted. The next execution time indicates a time at which the task indicated by the task data Td is to be executed. The reception/transmission identification flag is information indicating whether the task indicated by the task data Td including the flag is a task of reception or a task of transmission. The storage destination information is information indicating a storage destination of data which is handled by the task indicated by the task data Td. Specifically, when the task indicated by the task data Td is a transmission task, the storage destination information is information indicating a storage area, in the game apparatus 10, for to-be-transmitted data. On the other hand, when the task indicated by the task data Td is a reception task, the storage destination information is information indicating a storage area, in the game apparatus 10, for received data.

In the present embodiment, examples of the task indicated by the task data Td include a task of reporting a character, a task of receiving a character, a task of transmitting a character, and a task of receiving distribution GBL data Gsd.

First, a piece of the task data Td for reporting a character will be described. As will be described later, a piece of the task data Td for reporting a character is generated when reporting is selected by the user in an LBL registration process. The LBL registration process is performed in the character handling application. Thus, the piece of the task data Td for reporting a character includes an application ID for uniquely identifying the character handling application. In addition, since a reporting destination is previously determined as the server 5, the piece of the task data Td for reporting a character includes a URL of the server 5 as the communication destination URL. The piece of the task data Td for reporting a character also includes a next execution time which is set by the CPU 311. Further, since a piece of the user created data Ud indicating a character is transmitted when reporting, the piece of the task data Td for reporting a character includes a reception/transmission identification flag indicating transmission. Moreover, the piece of the task data Td for reporting a character includes, as storage destination information, a storage area, in the main memory 32, for the piece of the user created data Ud indicating the character.

Next, a piece of the task data Td for receiving a character will be described. As will be described later, a piece of the task data Td for receiving a character is generated when reception of a character via the Internet communication network 3 is selected by the user in a character handling process. In addition, a piece of the task data Td for receiving a character may be generated when a character handling process program is installed. Thus, the piece of the task data Td for receiving a character includes an application ID for uniquely identifying the character handling application. In addition, the piece of the task data Td for receiving a character includes, as a communication destination URL, the URL of the server 5 for temporarily storing a character transmitted from another user to the user itself. The piece of the task data Td for receiving a character also includes a next execution time which is set by the CPU 311. Further, since the piece of the task data Td for receiving a character indicates a task for receiving a character, the piece of the task data Td for receiving a character includes a reception/transmission identification flag indicating reception. Moreover, the piece of the task data Td for receiving a character includes, as storage destination information, a storage area, in the main memory 32, for a newly received piece of the user created data Ud indicating a character.

Next, a piece of the task data Td for transmitting a character to another user will be described. As will be described later, a piece of the task data Td for transmitting a character is generated when transmission of a character via the Internet communication network 3 is selected by the user in the character handling process. Thus, the piece of the task data Td for transmitting a character includes an application ID for uniquely identifying the character handling application. In addition, the piece of the task data Td for transmitting a character includes, as a communication destination URL, the URL of the server 5 for accepting a transmitted character. The piece of the task data Td for transmitting a character also includes a next execution time which is set by the CPU 311. Further, since the piece of the task data Td for transmitting a character indicates a task for transmitting a character, the piece of the task data Td for transmitting a character includes a reception/transmission identification flag indicating transmission. Moreover, the piece of the task data Td for transmitting a character includes, as storage destination information, a storage area, in the main memory 32, for a piece of the user created data Ud indicating a character which is selected by the user to be transmitted.

Next, a piece of the task data Td for receiving the distribution GBL data Gsd will be described. As will be described later, the game apparatus 10 periodically receives the distribution GBL data Gsd from the server 5 and updates the stored GBL therewith. In other words, the piece of the task data Td for receiving the distribution GBL data Gsd is not data generated during execution of any application such as the character handling application. Thus, the piece of the task data Td for receiving the distribution GBL data Gsd includes, exceptionally as an application ID, for example, an ID other than IDs considered as application IDs. For example, the piece of the task data Td for receiving the distribution GBL data Gsd includes an ID indicating the present system. In order to receive the distribution GBL data Gsd from the server 5, the piece of the task data Td for receiving the distribution GBL data Gsd also includes, as a communication destination URL, the URL of the server 5. The piece of the task data Td for receiving the distribution GBL data Gsd also includes a next execution time which is set by the CPU 311. Further, since the piece of the task data Td for receiving the distribution GBL data Gsd indicates a task for receiving the distribution GBL data Gsd, the piece of the task data Td for receiving the distribution GBL data Gsd includes a reception/transmission identification flag indicating reception. Moreover, the piece of the task data Td for receiving the distribution GBL data Gsd includes, as storage destination information, a storage area, in the main memory 32, for the Internet reception GBL data Ngd received via the Internet communication network 3.

FIG. 7A illustrates, as an example, the main memory 32 in which a piece of the task data Td is stored. However, the tasks in the present embodiment include various tasks as described above. A plurality of tasks may be set in accordance with user's selection. In addition, in a state where an unexecuted task remains, the same type of a task may be set. In such cases, two or more pieces of the task data Td which indicate the set tasks are stored in the main memory 32.

Further, the next execution time included in each of various pieces of the task data Td described above is a next execution time which is set by the CPU 311. The CPU 311 sets a next execution time when a piece of the task data Td is generated or when a task is executed and its next execution time is updated. When the CPU 311 generates a piece of the task data Td, a time having a predetermined time interval from the generated time is set as the next execution time. In addition, when the CPU 311 updates the next execution time, a time having a predetermined time interval from the time of the update is set as the next execution time. Note that, in another embodiment, the next execution time may be updated with a time which is set by the user.

This is the description of the task data Td. Next, the LBL data Ld will be described. The LBL data Ld is data indicating the aforementioned LBL. Specifically, the LBL data Ld is data indicating the LBL for the CPU 311 to identify non-display data among the user created data Ud received from other game apparatuses 10. The non-display data which is identified by the CPU 311 using the LBL data Ld is a piece of the user created data Ud indicating a character which is determined and registered by the user.

As shown in FIG. 7D, the LBL data Ld includes changer LBL data indicating a changer LBL, and data LBL data indicating a data LBL. The changer LBL data is an aggregate of changer identification LBL data which includes an application ID and a changer ID. The changer ID included in the changer identification LBL data is a final changer ID of a piece of the user created data Ud which is selected by the user to be registered as will be described later. Thus, the changer identification LBL data is data indicating a changer which has changed a piece of the user created data Ud last, as a user that creates a morally inappropriate character. Accordingly, the changer LBL is a list indicating changers each of which has changed a piece of the user created data Ud last, as users that create morally inappropriate characters. In another embodiment, an ID of an initial creator of each piece of the user created data may be registered.

Meanwhile, the data LBL data is an aggregate of data identification LBL data which includes an application ID and a data ID. The data ID included in the data identification LBL data is a data ID of a piece of the user created data Ud which is selected by the user to be registered as will be described later. Thus, the data identification LBL data is data indicating a character indicated by a piece of the user created data Ud, as a morally inappropriate character. Accordingly, the data LBL is a list indicating morally inappropriate characters.

FIG. 7D illustrates, as an example, the changer LBL data including two pieces of the changer identification LBL data. However, the changer LBL data can include the number of pieces of the changer identification LBL data which are optionally registered by the user. FIG. 7D illustrates, as an example, the data LBL data including two pieces of the data identification LBL data. However, the data LBL data can include the number of pieces of the data identification LBL data which are optionally registered by the user.

Next, the GBL data Gd will be described. The GBL data Gd is data indicating the aforementioned GBL. Specifically, the GBL data Gd is data indicating the GBL for the CPU 311 to identify non-display data from among the user created data Ud received from other game apparatuses 10. The GBL data Gd is data which is the distribution GBL data Gsd which is administered by the server 5 and received by the game apparatus 10. Although details will be described later, the server 5 determines whether or not to register a piece of the user created data Ud in the GBL, on the basis of the number of times of reporting performed by users. Thus, the non-display data which is identified by the CPU 311 using the GBL data Gd is a piece of the user created data Ud indicating a character which is determined by the server 5.

As shown in FIG. 7E, the GBL data Gd includes changer GBL data indicating a changer GBL, and data GBL data indicating a data GBL. The changer GBL data is an aggregate of changer identification GBL data which includes an application ID and a changer ID. The changer ID included in the changer identification GBL data is a changer ID which is determined by the server 5 as will be described later. Specifically, the server 5 determines whether or not a final changer of a reported piece of the user created data Ud is a user that creates a morally inappropriate character, on the basis of the number of times of reporting of the final changer ID in the piece of the user created data Ud. Reporting to the server 5 is performed in accordance with a selection made by each of the users of all the game apparatuses 10 included in the present system. Thus, the changer identification GBL data is data indicating the user that is determined by the server 5 on the basis of the selections made by the users of all the game apparatuses 10 included in the present system. Accordingly, the changer GBL is a list of users that are determined to create morally inappropriate characters, on the basis of the selections made by the users of all the game apparatuses 10 included in the present system. In another embodiment, the server 5 may determine a user that creates a morally inappropriate character, on the basis of the number of times of reporting of an ID of an initial creator in a piece of the user created data.

Note that the changer identification GBL data may include an application ID indicated by Null, and a changer ID. The application ID indicated by Null is an ID indicating all applications. Thus, a piece of the user created data Ud including the changer ID which is included in the changer identification GBL data together with the application ID indicated by Null is set as non-display data, regardless of an application handling the piece of the user created data Ud.

Meanwhile, the data GBL data is an aggregate of data identification GBL data including an application ID and a data ID. The data ID included in the data identification GBL data is a changer ID which is determined by the server 5 as will be described later. Specifically, the server 5 determines whether or not a character indicated by a reported piece of the user created data Ud is a morally inappropriate character, on the basis of the number of times of reporting of the data ID in the piece of the user created data Ud. Reporting to the server 5 is performed in accordance with a selection made by each of the users of all the game apparatuses 10 included in the present system, as described above. Thus, similarly to the changer identification GBL data, the data identification GBL data is data indicating a character which is determined by the server 5 on the basis of selections made by the users of all the game apparatuses 10 included in the present system. Accordingly, the data GBL is a list of morally inappropriate characters which are determined on the basis of selections made by the users of all the game apparatuses 10 included in the present system.

FIG. 7E illustrates, as an example, the changer GBL data including two pieces of the changer identification GBL data. However, the changer GBL data can include the number of pieces of the changer identification GBL data which are registered by the server 5. In addition, FIG. 7E illustrates, as an example, the data GBL data including two pieces of the data identification GBL data. However, the data GBL data can include the number of pieces of the data identification GBL data which are registered by the server 5.

Next, the Internet reception GBL data Ngd will be described. The Internet reception GBL data Ngd is data which is received by executing a task of receiving later-described transmission GBL data Sgd. Although details will be described later, when a version indicated by the Internet reception GBL data Ngd is new, the GBL data Gd stored in the main memory 32 is updated therewith.

Next, data included in the passing box data Tb will be described. The passing box data Tb includes data which is automatically transmitted and received in the passing communication. Specifically, the passing box data Tb includes reception box data Jb and transmission box data Sb.

The reception box data Jb includes data which is received automatically in the passing communication. In the passing communication in the present embodiment, passing reception data Jd and reception GBL data Jgd are automatically received.

The passing reception data Jd is the user created data Ud which is automatically transmitted from another game apparatus 10 in the passing communication. The reception GBL data Jgd is the transmission GBL data Sgd which is automatically transmitted from another game apparatus 10 in the passing communication. Thus, the reception GBL data Jgd includes the aforementioned exceptional application ID (not shown).

Meanwhile, the transmission box data Sb includes data which is automatically transmitted in the passing communication. In the passing communication in the present embodiment, passing transmission data Sd and transmission GBL data Sgd are automatically transmitted.

The passing transmission data Sd is the user created data Ud which is automatically transmitted to another game apparatus 10 which performs the passing communication. The transmission GBL data Sgd is the GBL data Gd which is automatically transmitted to another game apparatus 10 which performs the passing communication. Thus, the transmission GBL data Sgd also includes the aforementioned exceptional application ID (not shown).

This is the description of the data included in the passing box data Tb. FIG. 7A illustrates, as an example, the transmission box data Sb including only one piece of the passing transmission data Sd. However, as will be described later, the transmission box data Sb includes the number of pieces of the passing transmission data Sd which is equal to the number of characters which are selected to be transmitted in the passing communication. In another embodiment, data which is exchanged between the same applications by the passing communication may be collectively included in one piece of the passing transmission data Sd. In addition, FIG. 7A illustrates, as an example, the reception box data Jb including only one piece of the passing reception data Jd. However, as will be described later, the reception box data Jb includes the number of pieces of the passing reception data Jd which is equal to the number of pieces of the passing transmission data Sd which are transmitted from other game apparatuses 10 in the passing communication. In another embodiment, data which is exchanged between the same applications by the passing communication may be collectively included in one piece of the passing reception data Jd.

In the main memory 32, the various programs Pa are also included as shown in FIG. 7A, and details of the various programs Pa will be described later.

This is the description of the data and the programs which are stored in the main memory 32 of the game apparatus 10. Next, various pieces of data stored in the main memory 55 of the server 5 will be described with reference to FIG. 7F.

[Data Stored in the Server 5]

In the main memory 55 of the server 5, as shown in FIG. 7F, the distribution GBL data Gsd, user identification count data Ucd, and data identification count data Dcd are stored.

The distribution GBL data Gsd is data indicating the GBL administered by the server 5. The GBL administered by the server 5 is transmitted to each game apparatus 10 in accordance with each game apparatus 10 executing a task of receiving the distribution GBL data Gsd, as will be described later. Note that a data structure of the distribution GBL data Gsd administered by the server 5 is the same as the data structure of the GBL data Gd stored in the main memory 32 of the game apparatus 10. The distribution GBL data Gsd administered by the server 5 is updated so as to be constantly the latest data, on the basis of the number of reporting from users, as will be described later.

The user identification count data Ucd is data for counting the number of times of reporting of the user created data Ud for each final changer. Specifically, the user identification count data Ucd includes one or more pieces of user count data. Each piece of the user count data includes a changer ID, an application ID, and the number of times of reporting. The number of times of reporting included in a piece of the user count data indicates the number of times which a piece of the user created data Ud including the changer ID and the application ID, which are included in the piece of the user count data, is reported. In addition, the changer ID included in the piece of the user count data is a final changer ID included in the reported piece of the user created data Ud. Thus, each piece of the user count data indicates the number of times of reporting which is performed on the basis of a final changer indicated by a piece of the user created data Ud.

Note that, when no piece of the user count data including a final changer ID and an application ID, which are included in a reported piece of the user created data Ud, is included in the user identification count data Ucd, a new piece of the user count data including the changer ID and the application ID is generated. Thus, the number of pieces of the user count data included in the user identification count data Ucd is not limited to two as shown in FIG. 7F.

Further, the data identification count data Dcd is data for counting the number of times of reporting of the user created data Ud. Specifically, the data identification count data Dcd includes one or more pieces of data count data including a data ID, an application ID, and the number of times of reporting. The number of times of reports included in a piece of the data count data indicates the number of times which a piece of the user created data Ud including the data ID and the application ID, which are included in the piece of the data count data, is reported. Thus, each piece of the data count data is data indicating the number of times of reporting which is performed on the basis of the content of data indicated by a piece of the user created data Ud.

Note that, when no piece of the data count data including a data ID and an application ID, which are included in a reported piece of the user created data Ud, is included in the data identification count data Dcd, a new piece of the data count data including the data ID and the application ID is generated. Thus, the number of pieces of the data count data included in the data identification count data Dcd is not limited to two as shown in FIG. 7F.

[Description of Processes by Various Programs]

Figure 8A:
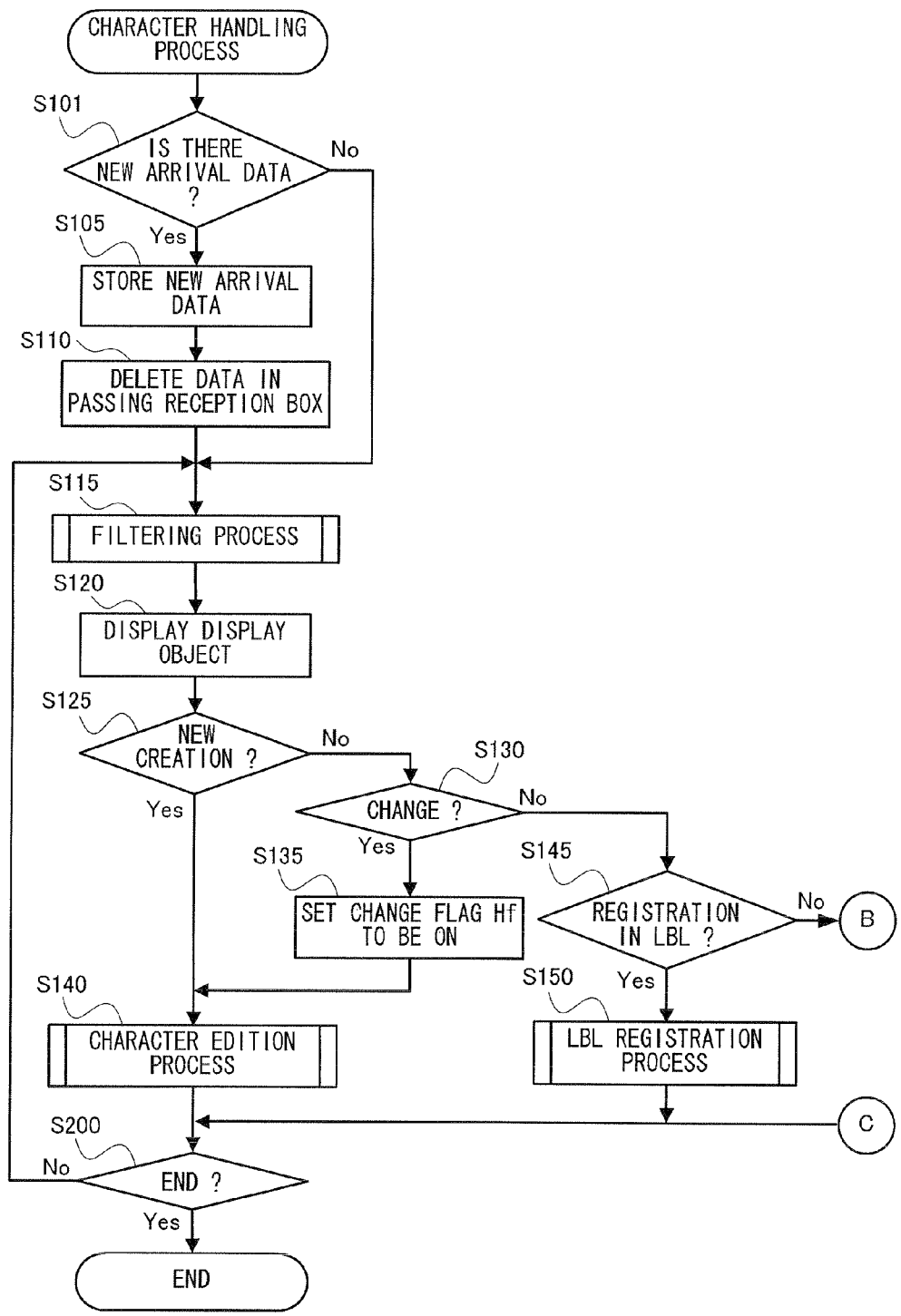
FIG. 8A is a flowchart showing an example of a character handling process performed by the game apparatus 10 in FIG. 1 executing a character handling process program.
Figure 8B:
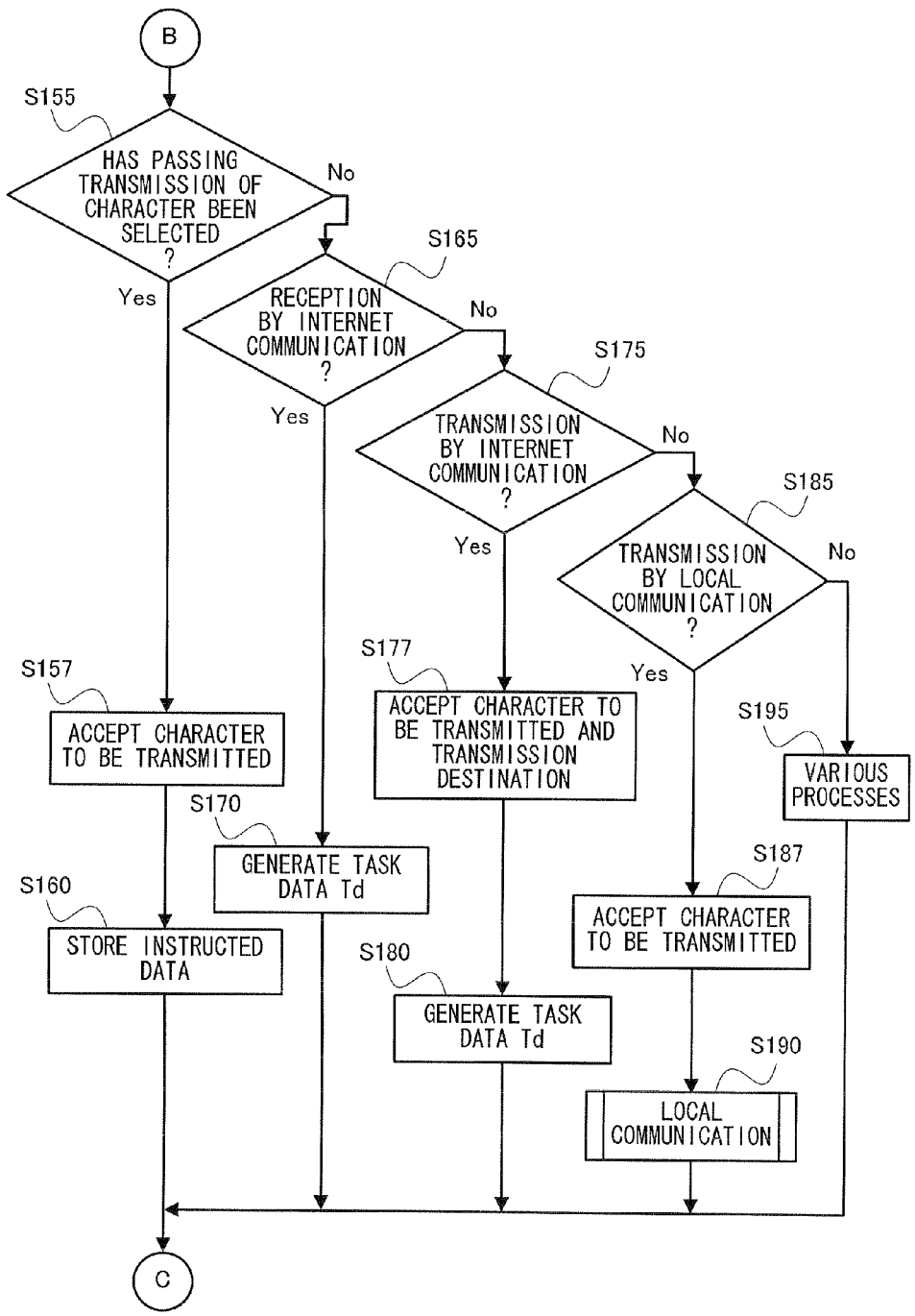
FIG. 8B is another flowchart showing an example of the character handling process performed by the game apparatus 10 in FIG. 1 executing the character handling process program.
Figure 8C:
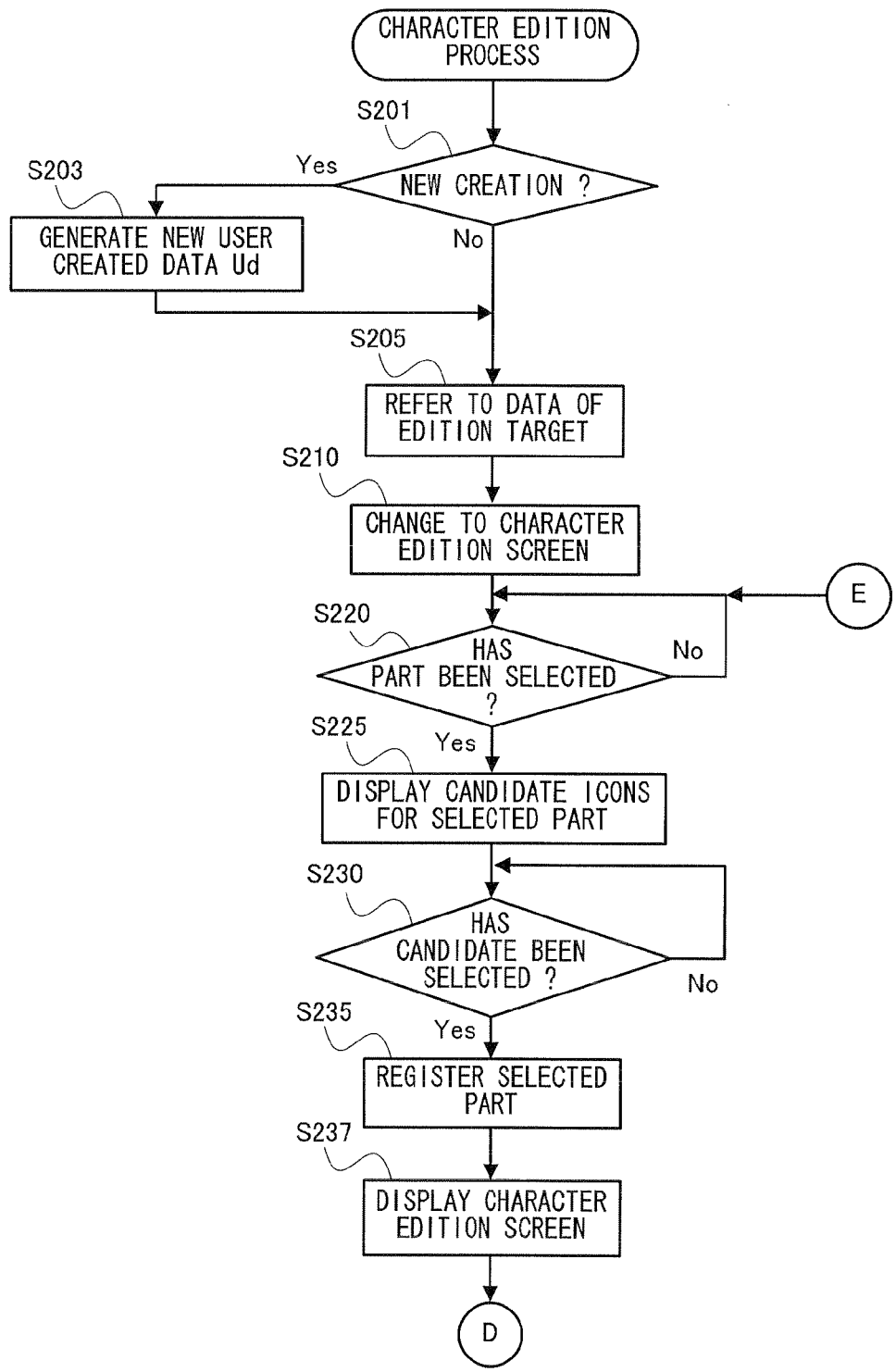
FIG. 8C is a flowchart showing in detail a character edition process performed at step 140 in FIG. 8A.
Figure 8D:
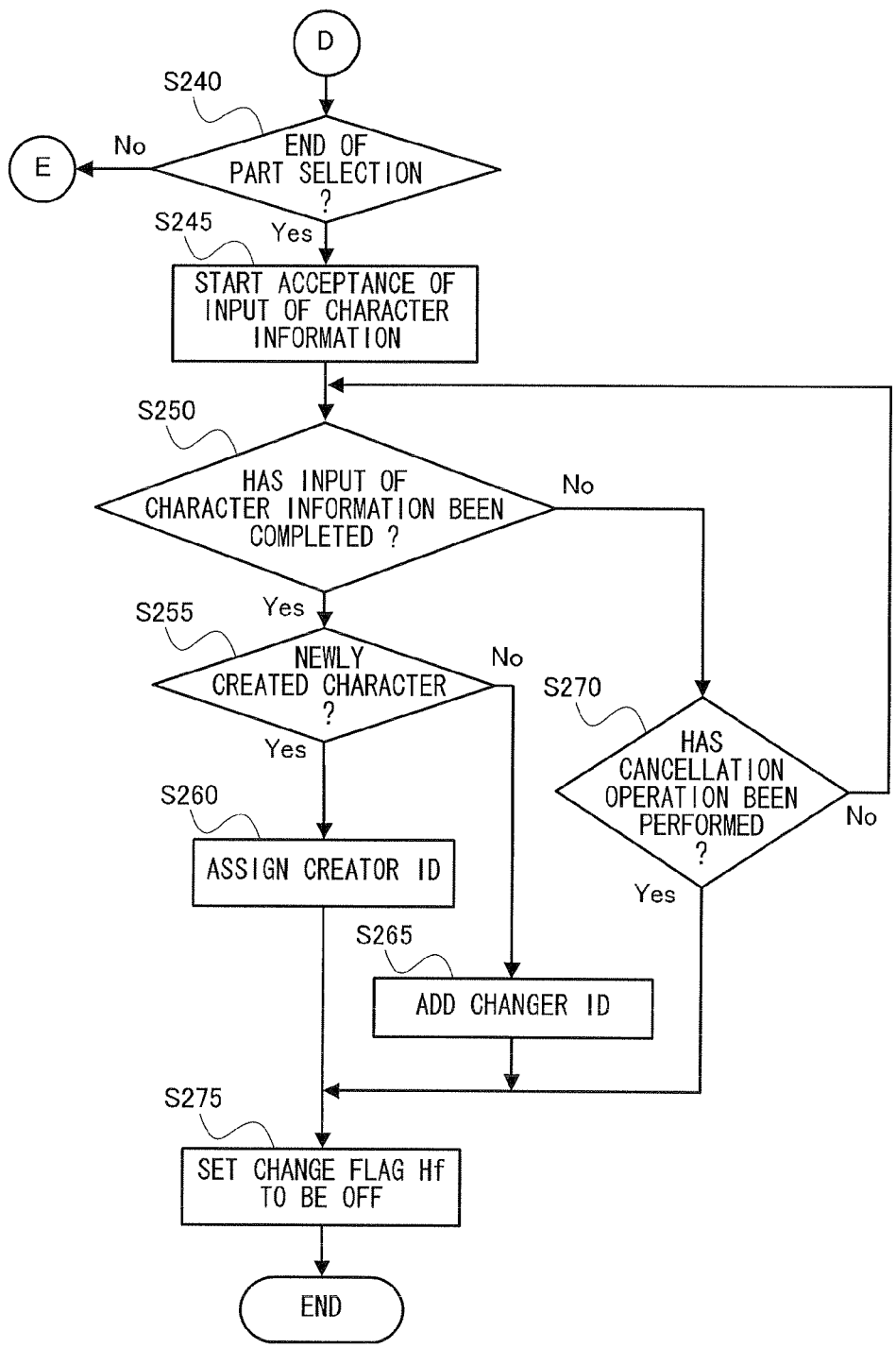
FIG. 8D is another flowchart showing in detail the character edition process performed at step 140 in FIG. 8A.
Figure 8E:
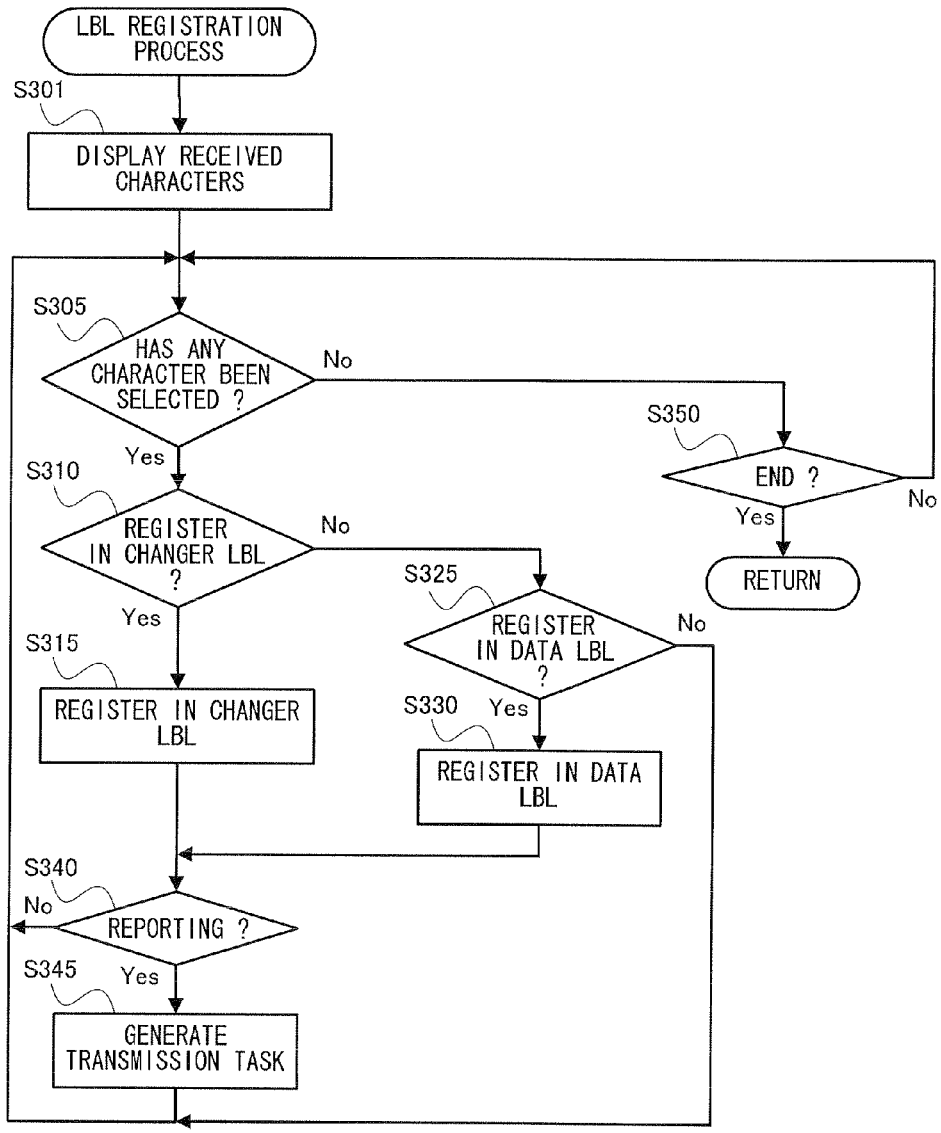
FIG. 8E is a flowchart showing in detail an LBL registration process performed at step 150 in FIG. 8A.
Figure 8F:
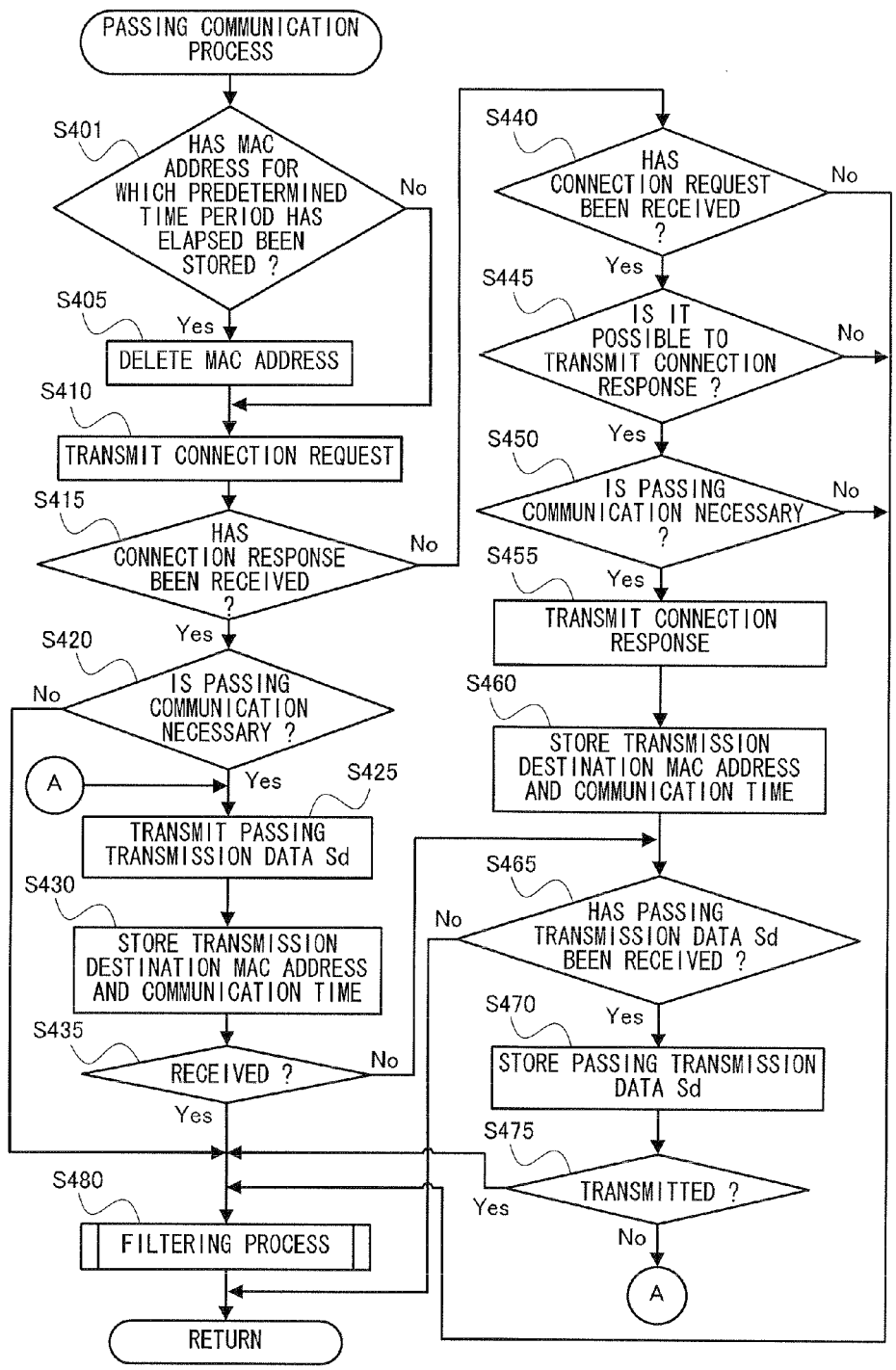
FIG. 8F is a flowchart showing an example of a passing communication process performed by the game apparatus 10 in FIG. 1 executing a passing communication process program.
Figure 8H:
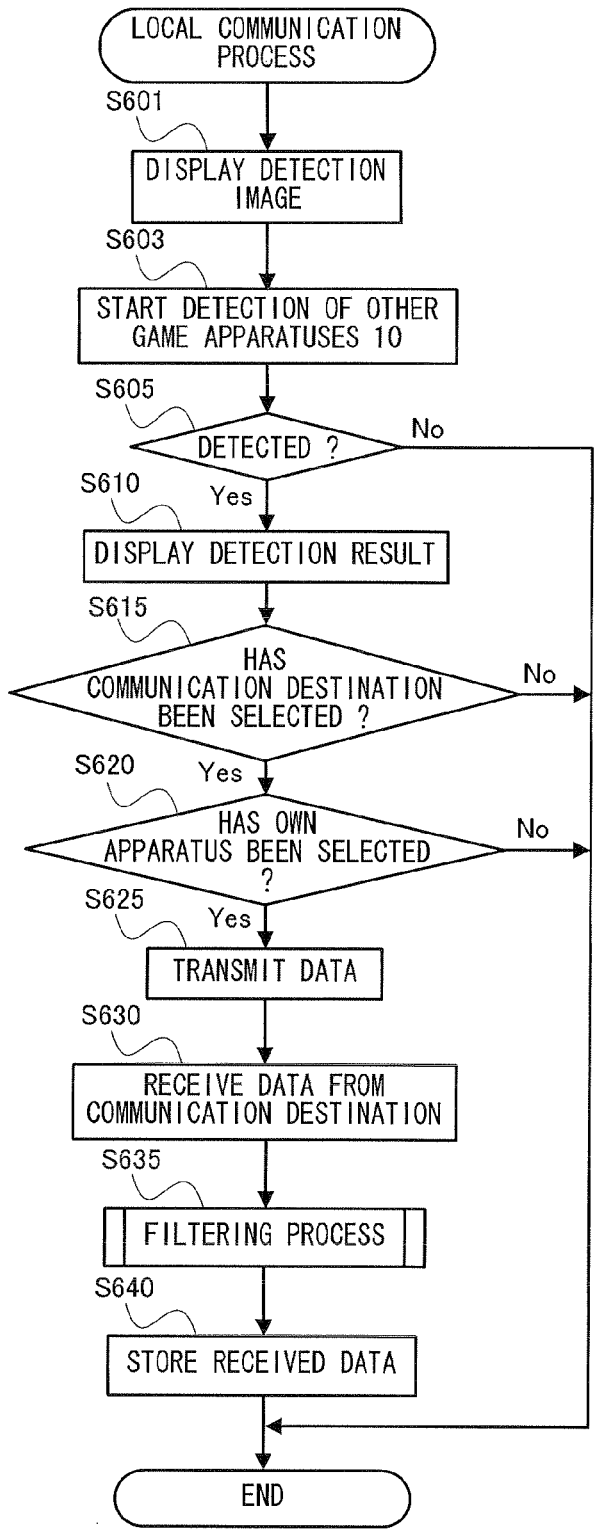
FIG. 8H is a flowchart showing an example of a local communication process performed by the game apparatus 10 in FIG. 1 executing a local communication process program.
Figure 8I:
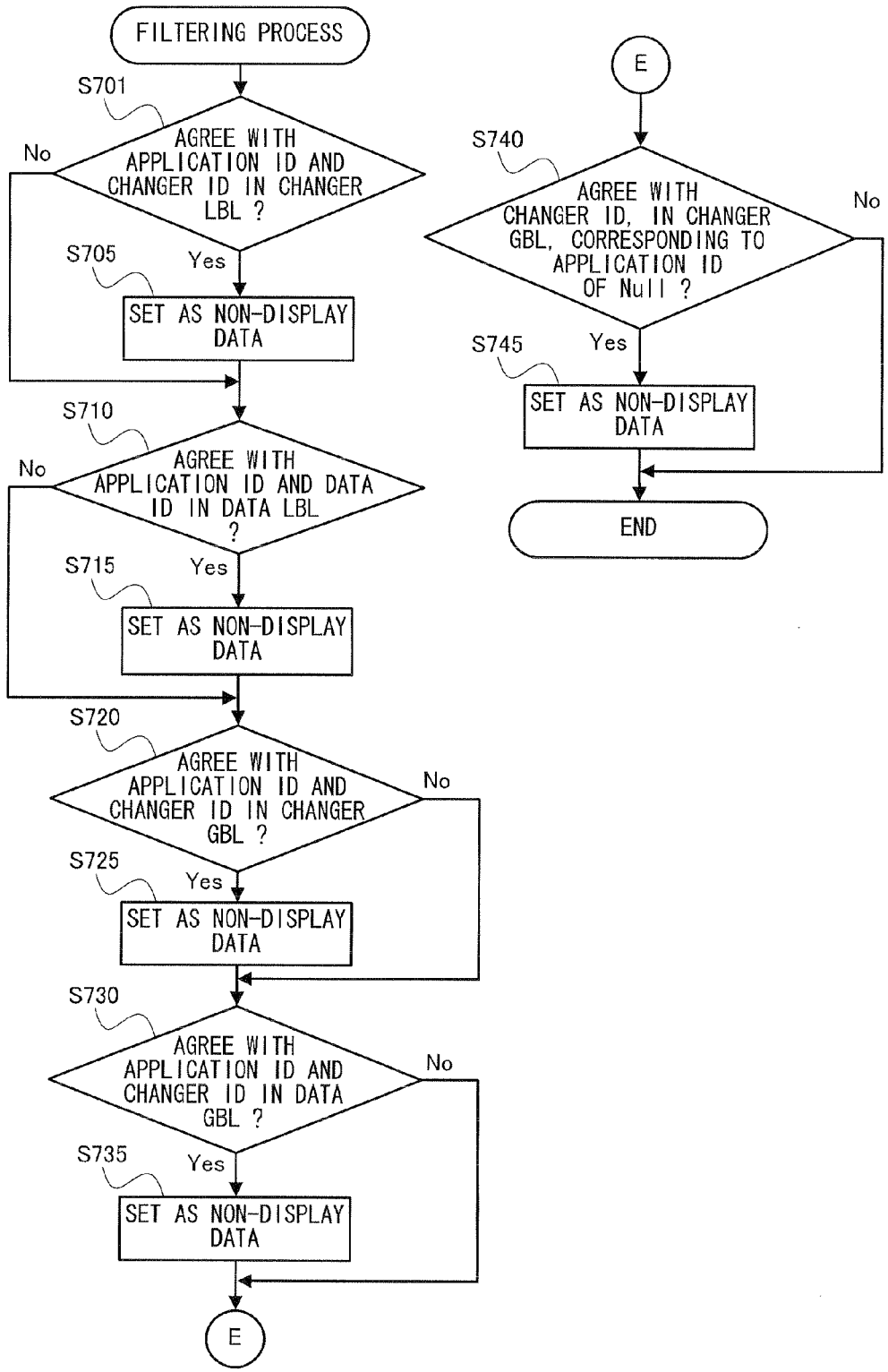
FIG. 8I is a flowchart showing an example of a filtering process performed by the game apparatus 10 in FIG. 1 executing a filtering process program.
Figure 8J:
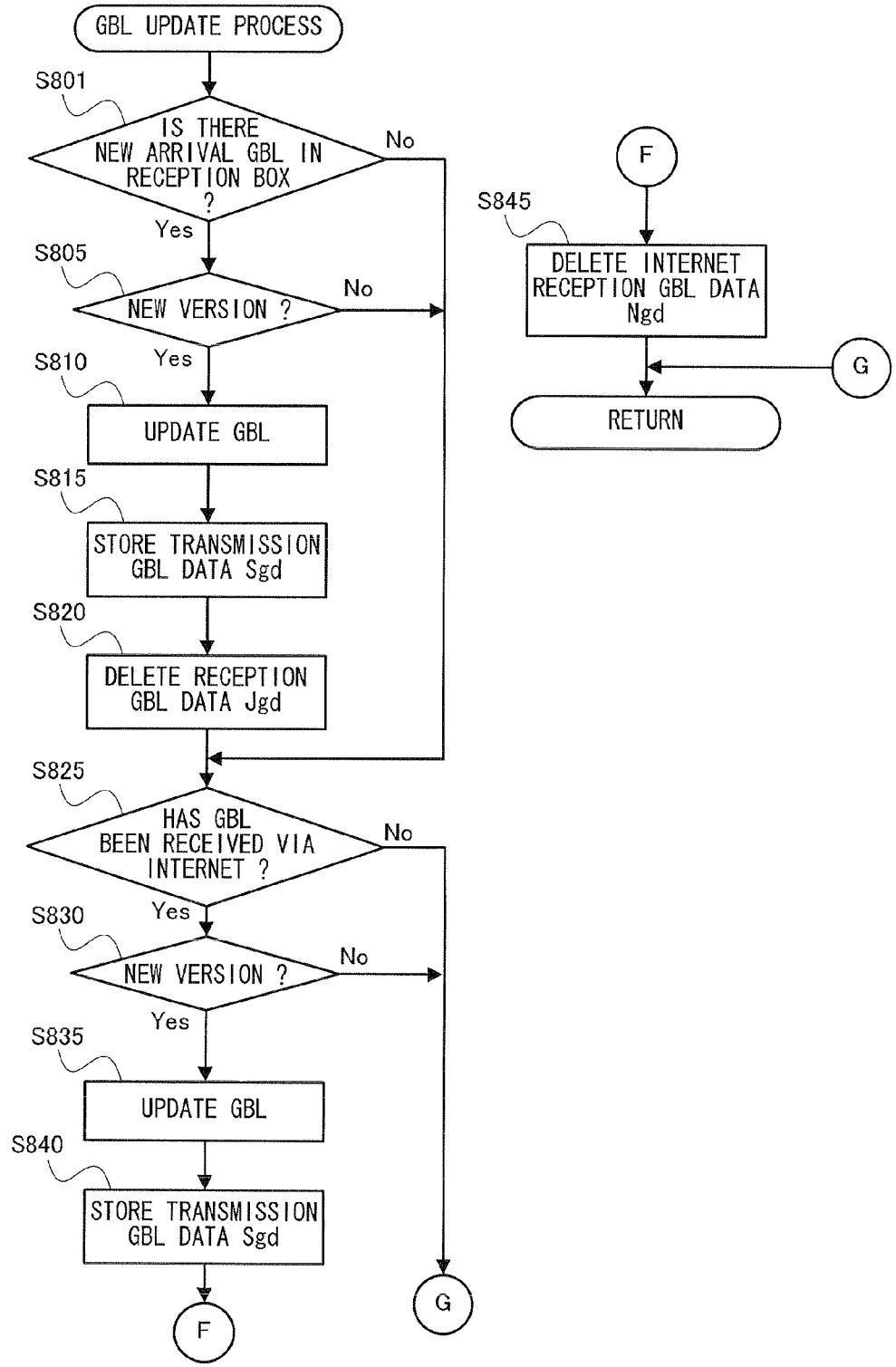
FIG. 8J is a flowchart showing an example of a GBL update process performed by the game apparatus 10 in FIG. 1 executing a GBL update process program.

Next, specific processes performed by various programs in the game apparatus 10 will be described with reference to FIGS. 8A to 8J. FIGS. 8A and 8B are flowcharts showing an example of the character handling process performed by the game apparatus 10 executing the character handling process program. FIGS. 8C and 8D are flowcharts showing in detail a character edition process performed at step 140 in FIG. 8A. FIG. 8E is a flowchart showing in detail the LBL registration process performed at step 150 in FIG. 8A. FIG. 8F is a flowchart showing an example of the passing communication process performed by the game apparatus 10 executing a passing communication process program. FIG. 8G is a flowchart showing an example of an Internet communication process performed by the game apparatus 10 executing an Internet communication process program. FIG. 8H is a flowchart showing in detail a local communication process performed at step 190 in FIG. 8B. FIG. 8I is a flowchart showing in detail a filtering process which is performed at step 115 in FIG. 8A, at step 480 in FIG. 8F, at step 570 in FIG. 8G, and at step 635 in FIG. 8H. FIG. 8J is a flowchart showing an example of a GBL update process performed by the game apparatus 10 executing a GBL update process program. Note that the programs for performing these processes are included in the various programs Pa stored in the internal data storage memory 35, and when the power of the game apparatus 10 is turned on, the programs are read out from the internal data storage memory 35 to the main memory 32 and executed by the CPU 311. Although the various programs Pa are previously stored in the internal data storage memory 35 in the present embodiment, one or all of the various programs Pa may be downloaded to the game apparatus 10 via the Internet or the like. Alternatively, the programs stored in the external data storage memory 46 or the external memory 45 may be read out and executed.

After the power of the game apparatus 10 is turned on, the passing communication process, the Internet communication process, and the GBL update process out of the processes shown in FIGS. 8A to 8J are constantly and repeatedly performed in parallel with any one of the other processes, even when the one of the other processes is being performed. In addition, the passing communication process, the Internet communication process, and the GBL update process are constantly and repeatedly performed in parallel, even when none of the other processes is being performed. In other words, the passing communication process, the Internet communication process, and the GBL update process are constantly and repeatedly performed in parallel, regardless of whether or not any of the other processes is being performed.

First, when the power (the power button 14F) of the game apparatus 10 is turned on, a boot program (not shown) is executed by the CPU 311, whereby a launcher program, which is a program for selectively executing a plurality of application programs and is stored in the internal data storage memory 35, is loaded into the main memory 32 and executed by the CPU 311. Then, the character handling process program is loaded into the main memory 32 by the user selecting the character handling application on the launcher program. Then, processing is started with step 101 in FIG. 8A by the CPU 311 executing the loaded character handling process program. Note that, in FIGS. 8A to 8J, step is abbreviated as "S".

The character handling process is a process for performing, for example, edition of a character, registration of a character in the LBL, and exchange of a character by using communication, in accordance with a user's selection. Specifically, the character handling process is a process in which: the user selects a process of newly creating a character as will be described later, a process of changing an existing character, a process of registering a character in the LBL, a process of transmitting a character in the passing communication, a process of receiving a character in the Internet communication, a process of transmitting a character in the Internet communication, a process of transmitting a character in local communication, and various other processes; and the game apparatus 10 is caused to perform the selected process.

In FIG. 8A, before accepting a user's selection of each of the above processes, the CPU 311 refers to the reception box data Jb stored in the main memory 32, and determines whether or not a new piece of the passing reception data Jd (new arrival data) is stored (step 101). When determining that the new piece of the passing reception data Jd is stored (Yes at step 101), the CPU 311 stores the new piece of the passing reception data Jd as a new piece of the user created data Ud in the storage area for the user created data Ud (step 105). When storing the new piece of the user created data Ud, the CPU 311 deletes the new piece of the passing reception data Jd stored in the reception box data Jb (step 110).

When determining that the new piece of the passing reception data Jd is not stored (No at step 101) or storing the new piece of the passing reception data Jd, the CPU 311 performs the filtering process (step 115). The filtering process will be described in detail later, but, giving its outline, the filtering process is a process of filtering the user created data Ud which is a filtering target, and identifying non-display data. In the filtering process at step 115, the user created data Ud stored in the main memory 32 is a filtering target. When setting the non-display data, the CPU 311 displays a character indicated by each piece of the user created data Ud which is not set as non-display data, as a display object on the upper LCD 22 (step 120). Here, all the characters which are not set as non-display data are displayed. However, for example, only a character received newly by current passing communication, out of the characters which are not set as non-display data, may be displayed, or a plurality of characters may be randomly selected from among the characters which are not set as non-display data, and may be displayed. Further, in addition to the display objects, the CPU 311 displays, on the lower LCD 12, an icon representing each of various processes. In the present embodiment, as described above, a screen including: the characters which are only the display objects; and each icon is displayed as a character handling screen. In the character handling screen, by the user performing a touch operation on a displayed icon, the corresponding process can be selected.

When displaying the character handling screen, the CPU 311 starts accepting a user's selection of each of the aforementioned processes. First, the CPU 311 determines whether or not the process of newly creating a character has been selected by the user (step 125). When determining that the process of newly creating a character has been selected (Yes at step 125), the CPU 311 starts the character edition process (step 140). At this time, the CPU 311 sets a newly-created character as an edition target.

On the other hand, when determining the process of newly creating a character has not been selected (No at step 125), the CPU 311 determines whether or not the process of changing an existing character has been selected by the user (step 130). When determining the process of changing an existing character has been selected (Yes at step 130), the CPU 311 sets a change flag Hf (not shown) to be ON (step 135). At this time, the CPU 311 causes the user to select a character as an edition target from among the characters displayed on the upper LCD 22, and then sets the change flag Hf to be ON. An example of a method for causing the user to select a character as an edition target is a method in which a list of information (e.g., name) corresponding to the characters displayed on the upper LCD 22 is displayed on the lower LCD 12, and the user is caused to make a selection. When the user is caused to select a character as an edition target, the aforementioned icons already displayed on the lower LCD 12 are deleted in the case where the list of the information corresponding to the characters is displayed on the lower LCD 12.

When setting the change flag Hf to be ON, the CPU 311 starts the character edition process (step 140). With reference to FIG. 8C, the following will describe the character edition process performed at step 140.

[Character Edition Process]

In FIG. 8C, when starting the character edition process, the CPU 311 determines whether or not new creation of a character has been selected by the user (step 201). Specifically, the CPU 311 refers to the main memory 32 and determines whether or not the change flag Hf is ON. When the change flag Hf is not ON, the CPU 311 determines that the new creation has been selected by the user. On the other hand, when the change flag Hf is ON, the CPU 311 determines that change of a character has been selected by the user.

When determining that the new creation of a character has been selected by the user (Yes at step 201), the CPU 311 generates a new piece of the user created data Ud in the main memory 32 (step 203). Note that each part of a character indicated by the new piece of the user created data Ud when generated is previously determined as an initial part.

When determining that the change of a character has been selected by the user (No at step 201) or newly creating a character, the CPU 311 refers to a data body of a piece of the user created data Ud indicating the character which is the edition target (step 205).

When referring to the data body of the edition target (step 205), the CPU 311 changes the display screen from the character handling screen to a character edition screen (step 210). Specifically, the CPU 311 displays only the character indicated by the referred data body, on the upper LCD 22. In addition, the CPU 311 displays, on the lower LCD 12, icons representing parts (e.g., mouth, eye, body) which are edition targets. Further, the CPU 311 also displays an end icon for ending the edition, on the lower LCD 12.

When displaying the character edition screen, the CPU 311 determines whether or not a part which is an edition target has been selected by the user (step 220). Specifically, the CPU 311 determines whether or not any one of the icons displayed on the lower LCD 12 has been touched. When determining that the part which is the edition target has been selected (Yes at step 220), the CPU 311 changes the display so as to display, on the lower LCD 12, icons representing candidates, respectively, for the selected part (step 225). By the CPU 311 performing the process at step 225, a part candidate selection screen is displayed on the lower LCD 12. Here, when the edition target is an eye part, the candidates are round eyes, slit eyes, long-slit eyes, and the like. In addition, an example of the part candidate selection screen may be a screen as shown in FIG. 5. FIG. 5 illustrates an example of a mouth part candidate selection screen. On the other hand, when determining that the part which is the edition target has not been selected (No at step 220), the CPU 311 repeats the process at step 220 and waits until a part which is an edition target is selected.

When displaying the icons representing the candidates, respectively, for the part which is selected as the edition target, the CPU 311 determines whether or not any one of the candidates has been selected by the user (step 230). Specifically, the CPU 311 determines whether or not any one of the icons displayed on the lower LCD 12 has been touched. When determining that no candidate has been selected (No at step 230), the CPU 311 repeats the process at step 230 and waits until a candidate is selected. On the other hand, when determining that any one of the candidates has been selected (Yes at step 230), the CPU 311 registers the selected candidate (step 235). Note that, when the selected part candidate is registered, the CPU 311 performs registration such that a portion in the data body of the edition target, which indicates the part which is the edition target, is updated so as to indicate the selected part candidate.

When registering the selected candidate, the CPU 311 displays the aforementioned character edition screen again (step 237). Specifically, the CPU 311 displays the registered part candidate such that the part which is selected as the edition target from among the parts of the character displayed on the upper LCD 22 is replaced by the registered part candidate. In addition, the CPU 311 deletes the icons which represent the candidates, respectively, for the part and are displayed on the lower LCD 12, and changes the display to the aforementioned character edition screen.

When changing the display to the character edition screen, the CPU 311 determines whether or not end of the part selection has been selected by the user (step 240). Specifically, the CPU 311 determines whether or not the end icon displayed on the lower LCD 12 has been touched. When determining that the end of the part selection has not been selected (No at step 240), the CPU 311 repeats the processing from step 220 to cause the user to select a part as an edition target again.

On the other hand, when determining that the end of the part selection has been selected (Yes at step 240), the CPU 311 changes the display to a screen for inputting character information, and starts a process of accepting an input of character information of the edition target from the user (step 245). Here, the character information is information such as the name, the gender, the age of the character, and comments introducing the character. When starting accepting an input of character information, the CPU 311 determines whether or not completion of the input of the character information has been selected by the user (step 250), while accepting the input of the character information. When determining that the completion of the input of the character information has not been selected (No at step 250), the CPU 311 determines whether or not cancellation of the input of the character information has been selected by the user (step 270). When determining that the cancellation of the input of the character information has not been selected (No at step 270), the CPU 311 returns the processing to step 250.

On the other hand, when determining that the completion of the input of the character information has been selected (Yes at step 250), the CPU 311 determines whether or not the character which is the edition target is a newly created character (step 255). Specifically, the CPU 311 refers to the change flag Hf stored in the main memory 32. When the change flag Hf is OFF, the CPU 311 determines that the character which is the edition target is a newly created character (Yes at step 255). On the other hand, when the change flag Hf is ON, the CPU 311 determines that the character which is the edition target is an existing character (No at step 255).

When determining that the character which is the edition target is a newly created character (Yes at step 255), the CPU 311 assigns a creator ID to the user ID of the corresponding piece of the user created data Ud (step 260). On the other hand, when determining that the character which is the edition target is not a newly created character (No at step 255), the CPU 311 determines that the character which is the edition target is a changed existing character and adds a changer ID to the user ID of the corresponding piece of the user created data Ud (step 265).

When assigning the creator ID to the corresponding piece of the user created data Ud (step 260) or adding the changer ID to the corresponding piece of the user created data Ud (step 265), the CPU 311 updates the change flag Hf stored in the main memory 32, such that the change flag Hf is set to be OFF (step 275), and ends the character edition process. In addition, when determining that the cancellation of the input of the character information has been selected by the user (Yes at step 270), the CPU 311 updates the change flag Hf such that the change flagt Hf is set to be OFF (step 275), and ends the character edition process. Note that, when ending the character edition process, the CPU 311 changes the display to the aforementioned character handling screen.

This is the description of the character edition process in the present embodiment. In the present embodiment, by the CPU 311 performing the aforementioned character edition process, the user can freely generate or edit a character to generate a piece of the user created data Ud.

Referring back to FIG. 8A, when determining that the change of a character has not been selected by the user (No at step 130), the CPU 311 determines whether or not registration of a character in the LBL has been selected (step 145). When determining that the registration of a character in the LBL has been selected by the user (Yes at step 145), the CPU 311 starts the LBL registration process (step 150). With reference to FIG. 8E, the following will describe in detail the LBL registration process performed at step 150.

[LBL Registration Process]

In FIG. 8E, the CPU 311 displays, on the lower LCD 12, only characters received from other game apparatuses 10, among the user created data Ud stored in the main memory 32 (step 301). Specifically, first, the CPU 311 deletes the character handling screen. Then, the CPU 311 displays only the characters received from the other game apparatuses 10, on the lower LCD 12, such that each of the characters received from the other game apparatus 10 is allowed to be selected by a touch operation performed by the user. When displaying only the characters received from the other game apparatuses 10, the CPU 311 displays only characters indicated by pieces of the user created data Ud in which both the creator ID and the changer ID are IDs of the other game apparatuses 10. In addition, when displaying the characters in the LBL registration process, the CPU 311 also displays, on the lower LCD 12, an icon for ending this process. In this manner, an LBL registration process screen is displayed on the lower LCD 12.

When displaying the characters received from the other game apparatuses 10, the CPU 311 determines whether or not a character to be registered in an LBL has been selected by the user (step 305). Specifically, the CPU 311 determines whether or not a touch operation has been performed on any one of the characters displayed on the lower LCD 12.

When determining that the character to be registered in the LBL has been selected by the user (Yes at step 305), the CPU 311 first determines whether or not the changer LBL has been selected by the user as an LBL in which the selected character is to be registered (step 310). When determining that the changer LBL has not been selected (No at step 310), the CPU 311 determines whether or not the data LBL has been selected by the user as the LBL in which the selected character is to be registered (step 325).

When determining that the data LBL has not been selected by the user as the LBL in which the selected character is to be registered (No at step 325), the CPU 311 determines that the LBL in which the selected character is to be registered has not been selected, and returns the processing to step 305.

On the other hand, when determining that the changer LBL has been selected as the LBL in which the selected character is to be registered (Yes at step 310), the CPU 311 registers the character in the changer LBL. Specifically, the CPU 311 performs registration by generating a piece of the changer identification LBL data which includes a final changer ID and an application ID which are included in a piece of the user created data Ud indicating the selected character, and adding the generated piece of the changer identification LBL data to the changer LBL data (step 315).

On the other hand, when determining that the data LBL has been selected by the user as the LBL in which the selected character is to be registered (Yes at step 325), the CPU 311 registers the character in the data LBL. Specifically, the CPU 311 performs registration by generating a piece of the data identification LBL data which includes a data ID and the application ID which are included in the piece of the user created data Ud indicating the selected character, and adding the generated piece of the data identification LBL data to the data LBL data (step 330).

When registering the character in the changer LBL (step 315) or registering the character in the data LBL (step 330), the CPU 311 determines whether or not reporting of the registered character to the server 5 has been selected by the user (step 340).

When determining that the reporting has been selected by the user (Yes at step 340), the CPU 311 generates a piece of the task data Td indicating a task of transmitting to the server 5 the piece of the user created data Ud indicating the character to be reported (step 345). As will be described later, when the task indicated by the piece of the task data Td generated at this time is executed, the piece of the user created data Ud indicating the character determined by the user as being morally inappropriate is transmitted and reported to the server 5.

On the other hand, when determining that the reporting has not been selected by the user (No at step 340), the CPU 311 returns the processing to step 305, and determines again whether or not a character to be registered in an LBL has been selected by the user. In addition, after generating the piece of the task data Td at step 345 as well, the CPU 311 returns the processing to the step 305, and determines again whether or not another character to be registered in an LBL has been selected by the user.

On the other hand, when determining that the character to be registered in an LBL has not been selected (NO at step 305), the CPU 311 determines whether or not end of the LBL registration process has been selected by the user (step 350). When determining that the end of the LBL registration process has been selected (Yes at step 350), the CPU 311 ends the LBL registration process. On the other hand, when determining that the end of the LBL registration process has not been selected, the CPU 311 returns the processing to step 305 and determines again whether or not a character to be registered in an LBL has been selected by the user. Note that, when ending the LBL registration process, the CPU 311 changes the display from the aforementioned LBL registration process screen to the character handling screen.

This is the description of the LBL registration process in the present embodiment. According to the aforementioned LBL registration process, the user can register a character which is felt by the user as being morally inappropriate, among the characters received from the other game apparatuses 10. Specifically, in the LBL registration process, the user can register the character in the changer LBL or the data LBL. Then, by registering the character in the changer LBL, the user can register the final changer of the character as a user that has created a morally inappropriate character, in the LBL. On the other hand, by registering the character in the data LBL, the user can register data indicating the character as data indicating a morally inappropriate character, in the LBL.

Further, in the aforementioned LBL registration process, the character registered by the user in the LBL can also be reported to the server 5. When the character reported to the server 5 is determined by a later-described server process to meet a predetermined condition, the character is registered in the GBL. In other words, since a character is allowed to be reported in the LBL registration process, the server 5 can determine whether or not to register the character in the GBL, on the basis of feeling (collective opinion) of the users of all the game apparatuses 10 included in the present system.

Moreover, a piece of the user created data Ud of the character registered in at least either of the LBL or the GBL is set as non-display data by the later-described filtering process. Thus, the user can prevent a character felt as being morally inappropriate from being displayed.

Referring back to FIG. 8A, when determining that the registration in the LBL has not been selected (No at step 145), the CPU 311 determines, in FIG. 8B, whether or not transmission of a character in the passing communication has been selected by the user (step 155).

When determining that the transmission of a character in the passing communication has been selected (Yes at step 155), the CPU 311 accepts a selection of a character to be transmitted, from the user (step 157). When accepting a selection of a character to be transmitted, from the user, the CPU 311 stores a piece of the user created data Ud of the selected character as a piece of the passing transmission data Sd in the main memory 32 (step 160). Here, the aforementioned passing communication process will be described with reference to FIG. 8F. Note that all transmission and reception of data in the passing communication process are performed by using the local communication module 37 which functions to wirelessly communicate with a game apparatus of the same type.

[Passing Communication Process]

In FIG. 8F, the CPU 311 refers to the main memory 32 and determines whether or not there is an MAC address (not shown) for which a predetermined time period has elapsed from a communication time (step 401). Here, the communication time is a time when a connection response or data included in the transmission box data Sb is transmitted as will be described later. The communication time is stored in the main memory 32 together with an MAC address of a transmission destination to which the connection response or the data included in the transmission box data Sb is transmitted. As will be described later, in the present embodiment, by using the communication time, communication with the same communication destination can be prevented from being performed twice in a short period of time.

When determining that there is the MAC address for which the predetermined time period has elapsed (Yes at step 401), the CPU 311 deletes the MAC address from the main memory 32 together with the communication time (step 405). On the other hand, when determining that there is no MAC address for which the predetermined time period has elapsed (No at step 401) or deleting the MAC address (step 405), the CPU 311 broadcast-transmits a connection request (step 410). Here, the connection request is a communication frame wirelessly transmitted for requesting another game apparatus 10 to perform the passing communication. The connection request includes: information indicating that the communication frame is the connection request; an MAC address of the game apparatus 10 which is a transmission source; and application IDs included in all pieces of the data (the passing transmission data Sd and the transmission GBL data Sgd) included in the transmission box data Sb.

When transmitting the connection request, the CPU 311 determines whether or not a connection response to the own connection request has been received, for a predetermined time period from the transmission of the connection request (step 415). Here, the connection response is a communication frame indicating a response from another game apparatus 10 which has received the connection request. The connection response includes four pieces of information. Specifically, the connection response includes: information indicating that the communication frame is the connection response; the MAC address of the transmission source of the connection request; an MAC address of the transmission source of the connection response (the other game apparatus 10); and application IDs included in all pieces of the data (the passing transmission data Sd and the transmission GBL data Sgd) included in the transmission box data Sb which is stored in the other game apparatus 10 which is the transmission source of the connection response.

When determining whether or not a connection response to the own connection request has been received, the CPU 311 uses an MAC address. Specifically, the CPU 311 determines whether or not an MAC address included in the connection response which is received before the predetermined time period has elapsed from the transmission of the connection request agrees with the MAC address of the game apparatus 10. When both of the MAC addresses agree with each other, the CPU 311 can determine that the connection response including the MAC address is a connection response to the own connection request.

When determining that a connection response to the own connection request has been received (Yes at step 415), the CPU 311 determines whether or not it is necessary to perform the passing communication with the game apparatus 10 which has transmitted the connection response (step 420). Specifically, the CPU 311 determines whether or not an application ID which agrees with any of the application IDs of the pieces of the data included in the transmission box data Sb is present among the application IDs included in the received connection response. When the application ID which agrees with any of the application IDs of the pieces of the data included in the transmission box data Sb is present among the application IDs included in the received connection response, the CPU 311 determines that it is necessary to perform the passing communication. On the other hand, when no application ID which agrees with any of the application IDs of the pieces of the data included in the transmission box data Sb is present among the application IDs included in the received connection response, the CPU 311 determines that it is not necessary to perform the passing communication.

When determining that it is necessary to perform the passing communication (Yes at step 420), the CPU 311 starts the passing communication. Specifically, the CPU 311 transmits all pieces of data including the agreeing application ID which is determined at step 420, among the data included in the transmission box data Sb, to the transmission source of the connection response which is determined at step 415 (step 425).

When transmitting all the pieces of data including the agreeing application ID which is determined at step 420, among the data included in the transmission box data Sb, the CPU 311 stores the transmission time as the aforementioned communication time in the main memory 32 together with the MAC address of the game apparatus 10 which is the transmission destination (the MAC address of the transmission source of the connection request which is included in the connection response) (step 430).

Next, the CPU 311 refers to the reception box data Jb and determines whether or not data included in the transmission box data Sb of the transmission destination has been received from the transmission destination of the data at step 425 (step 435). When determining that the data has been received (Yes at step 435), the CPU 311 performs the later-described filtering process with the passing reception data Jd included in the reception box data Jb being set as a filtering target (step 480).

On the other hand, when determining that a connection response has not been received after transmitting the connection request (No at step 415), the CPU 311 determines whether or not a connection request has been received from another game apparatus 10 (step 440). When determining that a connection request has been received from another game apparatus 10 (Yes at step 440), the CPU 311 determines whether or not it is possible to transmit a connection response to the transmission source of the received connection request (step 445). Specifically, the CPU 311 determines whether or not an MAC address of the transmission source included in the received connection request is stored in the main memory 32 together with a communication time. When the MAC address included in the connection request is not stored in the main memory 32, it means that communication with the same game apparatus 10 is not performed twice in a short period of time, and the CPU 311 can determine that it is possible to transmit a connection response. This is because the MAC address stored in the main memory 32 together with the communication time as described above is deleted when the predetermined time period elapses from the communication time.

When determining that it is possible to transmit a connection response (Yes at step 445), the CPU 311 determines whether or not it is necessary to perform the passing communication with the transmission source of the connection request which is determined at step 440 to have been received (step 450). Specifically, the CPU 311 determines whether or not an application ID which agrees with any of the application IDs of the pieces of the data included in the transmission box data Sb is present among the application IDs included in the received connection request. When the application ID which agrees with any of the application IDs of the pieces of the data included in the transmission box data Sb is present among the application IDs included in the received connection request, the CPU 311 determines that it is necessary to perform the passing communication. On the other hand, when no application ID which agrees with any of the application IDs of the data included in the transmission box data Sb is present among the application IDs included in the received connection request, the CPU 311 determines that it is not necessary to perform the passing communication.

When determining that it is necessary to perform the passing communication (Yes at step 450) the CPU 311 transmits a connection response to the transmission source of the connection request which is determined at step 440 to have been received (step 455). When transmitting the connection response, the CPU 311 stores the transmission time as a communication time in the main memory 32 together with the MAC address of the game apparatus 10 which is the transmission destination (the MAC address of the transmission source included in the connection request which is determined at step 440 to have been received) (step 460).

Next, the CPU 311 determines whether or not data has been received from the transmission destination of the connection response which is transmitted at step 455, for a predetermined time period (step 465). When determining that the data has been received (Yes at step 465), the CPU 311 stores the received data in the reception box data Jb (step 470). Specifically, when the passing transmission data Sd is included in the received data, the CPU 311 stores the received data as the passing reception data Jd in the reception box data Jb. Alternatively, when the transmission GBL data Sgd is included in the received data, the CPU 311 stores the received data as the reception GBL data Jgd in the reception box data Jb.

When storing the data, the CPU 311 determines whether or not data has been transmitted to the transmission source of the data (step 475). When determining that the data has been transmitted (Yes at step 475), the CPU 311 performs the later-described filtering process (step 480). Specifically, when the passing transmission data Sd is included in the received data, the CPU 311 performs the later-described filtering process with the passing transmission data Sd, namely, the user created data Ud, being set as a filtering target. Note that, when the CPU 311 proceeds from step 475 to the filtering process, the passing reception data Jd stored at step 470 is set as a filtering target.

On the other hand, when determining that the data has not been transmitted (No at step 475), the CPU 311 advances the processing to step 425 to transmit the data. Note that, in the description of step 425, the transmission destination of the data is the transmission source of the connection response which is determined at step 415. However, the transmission destination of data which is transmitted when the CPU 311 advances the processing from step 475 to step 425 is the transmission destination of the connection response which is transmitted at step 455.

In addition, when determining at step 435 that the data has not been transmitted, the CPU 311 advances the processing to step 465 to determine whether or not data has been received. In the description of step 465, it is determined whether or not the data has been received from the transmission destination of the connection response which is determined at step 455. However, the transmission source of data which is determined when the CPU 311 advances the processing from step 435 to step 465 is the transmission destination of the data transmitted at step 425.

On the other hand, when determining that the data has not been received (No at step 465), the CPU 311 repeats the passing communication process from the beginning.

This is the description of the passing communication process in the present embodiment. As described above, the passing communication process is constantly and repeatedly performed in each game apparatus 10 included in the present system. Thus, when the game apparatuses 10 are located within the communication ranges of the local communication modules 37 thereof, each game apparatus 10 can automatically perform the passing communication. When the user created data Ud handled by the same application is stored as the passing transmission data Sd, the game apparatuses 10 can exchange the data with each other by automatically transmitting and receiving the data. In the present embodiment, the character handling application is executed as the application handling the user created data Ud in each game apparatus 10 included in the present system. Thus, in the present system, a character which is selected by the user to be transmitted by the passing communication as described above can be automatically exchanged between each game apparatus 10. Data indicating the character exchanged in this manner is determined as a new piece of the passing reception data Jd received at step 101 in FIG. 8A, and is stored as a piece of the user created data Ud at step 105.

Further, in the present system, the transmission GBL data Sgd is transmitted and received between each game apparatus 10 by the passing communication. Thus, in the present system, the GBL data Gd stored in each game apparatus 10 can be automatically exchanged by the passing communication. Moreover, when the reception GBL data Jgd received by the passing communication is determined as a new version in the later-described GBL update process, the reception GBL data Jgd is stored as the GBL data Gd in the main memory 32 to update the stored GBL therewith. Thus, according to the present system, even when there is a game apparatus 10 which cannot connect to the Internet communication network 3, if there is another game apparatus 10 which can perform the passing communication with the game apparatus 10, the game apparatus 10 can update the stored GBL with a new GBL.

Further, when transmission, in the passing communication, of a character indicated by a piece of the user created data Ud, which is received by the passing communication process, the later-described Internet communication process, or the later-described local communication process, is selected by the user, the piece of the user created data Ud can be transmitted in the passing communication without change.

Referring back to FIG. 8B, when determining that the transmission of the character in the passing communication has not been selected by the user (No at step 155), the CPU 311 determines whether or not reception of a character via the Internet communication network 3 has been selected by the user (step 165). When determining that the reception of a character via the Internet communication network 3 has been selected (Yes at step 165), the CPU 311 generates a piece of the aforementioned task data Td for receiving a piece of the user created data Ud indicating the character (step 170).

On the other hand, when determining that the reception of a character via the Internet communication network 3 has not been selected (No at step 165), the CPU 311 determines whether or not transmission of a character via the Internet communication network 3 has been selected by the user (step 175). When determining that the transmission of a character via the Internet communication network 3 has been selected (Yes at step 175), the CPU 311 accepts a user's selection of a character to be transmitted, and accepts an input or selection of information indicating a transmission destination of the character (step 177). When accepting the user's selection of the character and the input or selection of the transmission destination, the CPU 311 generates a piece of the aforementioned task data Td for transmitting the character selected by the user (step 180).

Now, the Internet communication process for the CPU 311 to transmit or receive data by using the Internet communication network 3 will be described with reference to FIG. 8G. Note that all transmission and reception of data in the Internet communication process are performed by using the wireless communication module 36 for transmitting or receiving data to or from another device by using the Internet communication network 3, as described above.

[Internet Communication Process]

In FIG. 8G, the CPU 311 refers to the main memory 32 and determines whether or not there is a piece of the task data Td of which the next execution time has been passed by the current time (step 501). When determining that there is a piece of the task data Td of which the next execution time has been passed by the current time (Yes at step 501), the CPU 311 starts detection of the aforementioned AP 2 present within the communication range of the wireless communication module 36 (step 510). After performing the detection of the AP 2 for a predetermined time period, the CPU 311 determines whether or not any AP 2 has been detected (step 515). When determining that any AP 2 has been detected (Yes at step 515), the CPU 311 starts communication with the detected AP 2 (step 520).

On the other hand, when determining that there is no piece of the task data Td of which the next execution time has been passed by the current time (No at step 501) or determining that no AP 2 has been detected (No at step 515), the CPU 311 repeats the processing from step 501.

Next, when starting the communication with the AP 2, the CPU 311 selects, from among the task data Td determined at step 501, any piece of the task data Td indicating an unexecuted task which has not been executed although its execution time has been passed (step 525). When selecting the unexecuted tasks, the CPU 311 determines whether or not all the selected unexecuted tasks have been executed (step 530). When determining that not all the unexecuted tasks have been executed (No at step 530), the CPU 311 selects one unexecuted task (step 535). As a method of the CPU 311 selecting one task from among all the unexecuted tasks, for example, any method such as a method using a predetermined priority may be used.

When selecting one unexecuted task, the CPU 311 determines whether or not the selected unexecuted task is a reception task (step 540). Specifically, the CPU 311 refers to the reception/transmission identification flag included in a piece of the task data Td indicating the selected unexecuted task, and determines whether or not the flag indicates reception.

When determining that the selected unexecuted task is a reception task (Yes at step 540), the CPU 311 receives data in accordance with the piece of the task data Td indicating the task (step 545). Specifically, the CPU 311 accesses the communication destination URL included in the piece of the task data Td indicating the unexecuted task, and receives data. The received data is stored in a storage destination which is indicated by the storage destination information included in the piece of the task data Td. For example, when a task for receiving the distribution GBL data Gsd is executed, the received distribution GBL data Gsd is stored as the Internet reception GBL data Ngd in the storage destination in the main memory 32 to update the GBL data Gd therewith. In addition, for example, when a task for receiving a character is executed, a piece of the user created data Ud indicating the received character is stored in a storage destination in the main memory 32.

When executing the reception task, the CPU 311 updates the next execution time included in the piece of the task data Td indicating the executed task, as described above (step 550).

On the other hand, when determining that the selected unexecuted task is not a reception task (No at step 540), the CPU 311 determines that the unexecuted task is a transmission task, and transmits data in accordance with the piece of the task data Td indicating the task (step 555). Specifically, the CPU 311 accesses the communication destination URL included in the piece of the task data Td indicating the unexecuted transmission task, and transmits data. The transmitted data is data stored in a storage destination which is indicated by the storage destination information included in the piece of the task data Td. For example, when a task for transmitting a character is executed, a piece of the user created data Ud indicating a character selected by the user is transmitted to the URL of the server 5 which accepts transmission of the character. Alternatively, for example, when a task for reporting is executed, a piece of the user created data Ud indicating a character which is selected by the user to be reported is transmitted to the server 5.

When executing the transmission task, the CPU 311 deletes the piece of the task data Td indicating the executed task (step 560).

Next, the CPU 311 determines whether or not the executed task is a task for receiving the distribution GBL data Gsd or a task for transmitting optional data (step 565). Specifically, in order to perform the determination, the CPU 311 refers to: the reception/transmission identification flag included in the piece of the task data Td indicating the executed task; and the data stored in the storage destination which is indicated by the storage destination information included in the piece of the task data Td indicating the executed task. When determining that the executed task is not a task for receiving the distribution GBL data Gsd or a task for transmitting optional data (No at step 565), the CPU 311 determines that the executed task is reception of data other than the distribution GBL data Gsd. In other words, the CPU 311 determines that the executed task is reception of the user created data Ud.

When determining that the executed task is reception of the user created data Ud (No at step 565), the CPU 311 performs the later-described filtering process with the received data being set as a filtering target (step 570). On the other hand, when determining that the executed task is a task for receiving the distribution GBL data Gsd or a task for transmitting optional data (Yes at step 565), the CPU 311 determines that it is not necessary to perform the filtering process, and returns the processing to step 530 to determine whether or not there are any remaining unexecuted tasks.

On the other hand, when determining that all the selected unexecuted tasks have been executed (there is no remaining unexecuted task) (Yes at step 530), the CPU 311 repeats the Internet communication process from the beginning.

This is the description of the Internet communication process in the present embodiment. As described above, the Internet communication process is constantly and repeated performed in each game apparatus 10 included in the present system. In the Internet communication process, the task for transmitting the user created data Ud, the task for reporting a character, the task for receiving the user created data Ud, and the task for receiving the distribution GBL data Gsd are executed. Then, a piece of the task data Td indicating a task for transmission, out of these tasks, is not deleted until the task is executed. Thus, since the task for reporting a character is not deleted until the task is executed, a piece of the user created data Ud indicating a character selected by the user can be assuredly reported.

Further, the next execution time of a piece of the task data Td indicating a reception task out of the above tasks is updated each time the task is executed. Thus, the task for receiving the distribution GBL data Gsd is periodically executed, and hence the GBL administered by the server 5 can be periodically received.

Moreover, when transmission, via the Internet communication network 3, of a character indicated by a piece of the user created data Ud, which is received by the later-described local communication process, the aforementioned passing communication process, or the aforementioned Internet communication process, is selected by the user, the piece of the user created data Ud can be transmitted via the Internet communication network 3 without change.

Referring back to FIG. 8B, when determining that the transmission of a character via the Internet communication network 3 has not been selected (No at step 175), the CPU 311 determines whether or not transmission of a character by local communication has been selected by the user (step 185). When determining that the transmission of a character by the local communication has been selected (Yes at step 185), the CPU 311 accepts a user's selection of a character to be transmitted (step 187). When accepting the selection of the character to be transmitted, the CPU 311 executes the local communication process (step 190).

Note that all transmission and reception of data in the local communication process are performed by using the local communication module 37 which functions to wirelessly communicate with a game apparatus of the same type, as described above.

[Local Communication Process]

In FIG. 8H, the CPU 311 deletes the character handling screen and displays, on the lower LCD 12, an image indicating that it is during detection of other game apparatuses 10 within the communication range (step 601). When displaying the image indicating that it is during detection, the CPU 311 starts detection of other game apparatuses 10 within the communication range of the local communication module 37 (step 603). After performing the detection of other game apparatuses 10 for a predetermined time period, the CPU 311 deletes the image indicating that it is during detection, and determines whether or not any other game apparatuses 10 have been detected (step 605). When determining that any other game apparatuses 10 have been detected (Yes at step 605), the CPU 311 displays a list of the detected game apparatuses 10 as a detection result on the lower LCD 12 (step 610). When displaying the detection result, the CPU 311 determines whether or not a communication destination has been selected by the user from among the displayed detection result (step 615). Specifically, the CPU 311 determines whether or not a touch operation has been performed on any one of the items listed in the detection result.

When determining that a game apparatus 10 has been selected by the user as a communication destination (Yes at step 615), the CPU 311 determines whether or not the own game apparatus 10 has been selected as a communication destination by the game apparatus 10 which is the communication destination, on the basis of information transmitted from the communication destination (step 620). When determining that the own game apparatus 10 has been selected by the communication destination (Yes at step 620), the CPU 311 transmits, to the communication destination, a piece of the user created data Ud of the character selected at step 187 (step 625). Then, the CPU 311 receives the user created data Ud which is transmitted from the communication destination in response to transmission of the piece of the user created data Ud from the own game apparatus 10 (step 630). When receiving the user created data Ud from the communication destination, the CPU 311 performs the later-described filtering process with the received user created data Ud being set as a filtering target (step 635). After performing the filtering process, the CPU 311 stores the received user created data Ud in the main memory 32.

On the other hand, when no communication destination has been found (No at step 605), no communication destination has not been selected by the user (No at step 615), or the own game apparatus 10 has not been selected by the communication destination (No at step 620), the CPU 311 cannot receive data, and thus the CPU 311 does not perform the filtering process and ends the local communication process.

This is the description of the local communication process in the present embodiment. As is obvious from the above description, the local communication process is performed immediately in accordance with an operation performed by the user. Thus, the user can exchange the user created data Ud with another game apparatus 10 on their own will, without automatic transmission and reception of data by the passing communication.

Further, when transmission, by the local communication, of a character indicated by a piece of the user created data Ud, which is received by the passing communication process, the Internet communication process, or the local communication process as described above, is selected by the user, the piece of the user created data Ud can be transmitted without change.

Referring back to FIG. 8B, when determining that transmission of a piece of the user created data Ud by the local communication has not been selected by the user (No at step 185), the CPU 311 performs various other processes needed in the character handling process (step 195). Examples of the other processes needed in the character handling process include a process of controlling a motion of a character displayed on the upper LCD 22.

When performing any one of: the user created data generation process (step 140 in FIG. 8A); the LBL registration process (step 150); the process of storing the user created data Ud to be transmitted by the passing communication (step 160 in FIG. 8B); the process of generating a task when reception by the Internet communication process has been selected (step 170); the process of generating a task when transmission by the Internet communication process has been selected (step 180); the local communication process (step 190); and the aforementioned various processes (step 195), the CPU 311 determines whether or not a selection to end the character handling process has been made by the user (step 200). When determining that the selection to end the character handling process has not been made by the user (No at step 200), the CPU 311 returns the processing to step 115. As described above, at step 115, the filtering process is performed with all pieces of the user created data Ud stored in the main memory 32 being set as filtering targets. On the other hand, when the selection to end the character handling process has been made (Yes at step 200), the CPU 311 ends the character handling process and returns to the aforementioned launcher application.

This is the description of the character handling process in the present embodiment.

[Filtering Process]

Next, the filtering process in the present embodiment will be described with reference to FIG. 8I. In FIG. 8I, the CPU 311 determines whether or not a piece of the user created data Ud of which the application ID and the changer ID agree with the application ID and the changer ID of each piece of the changer identification LBL data constituting the changer LBL data, is present among the user created data Ud which is set as the filtering target (step 701).

When determining that the piece of the user created data Ud of which the application ID and the changer ID agree with the application ID and the changer ID of each piece of the changer identification LBL data constituting the changer LBL data, is present among the user created data Ud which is set as the filtering target (Yes at step 701), the CPU 311 sets the piece of the user created data Ud as non-display data (step 705).

Thus, the CPU 311 can determine that the changer which has changed last the piece of the user created data Ud which is set as the filtering target is a user that creates a morally inappropriate character. In addition, when determining that the changer which has changed last the piece of the user created data Ud which is set as the filtering target is a user that creates a morally inappropriate character, the CPU 311 can set the character as non-display data before displaying the character. Further, the changer LBL data is registered in accordance with a selection made by the user of the own game apparatus 10 in the LBL registration process as described above. Therefore, by setting non-display data on the basis of the changer LBL data, the CPU 311 can set data registered by the user of the own game apparatus 10, such that the data is not to be displayed.

On the other hand, when determining that no piece of the user created data Ud of which the application ID and the changer ID agree with the application ID and the changer ID of each piece of the changer identification LBL data constituting the changer LBL data, is present among the user created data Ud which is set as the filtering target (No at step 701) or setting the non-display data, the CPU 311 determines whether or not a piece of user created data Ud of which the application ID and the data ID agree with the application ID and the data ID of each piece of the data identification LBL data constituting the data LBL data, is present among the user created data Ud which is set as the filtering target (step 710).

When determining that the piece of the user created data Ud of which the application ID and the data ID agree with the application ID and the data ID of each piece of the data identification LBL data constituting the data LBL data, is present among the user created data Ud which is set as the filtering target (Yes at step 710), the CPU 311 sets the piece of the user created data Ud as non-display data (step 715).

Thus, the CPU 311 can determine that the character is a morally inappropriate character, on the basis of the data LBL. Then, on the basis of the character indicated by the piece of the user created data Ud, the CPU 311 can set the character such that the character is not to be displayed. In addition, the data LBL data is registered in accordance with a selection made by the user of the game apparatus 10 including this CPU 311 in the LBL registration process as described above. Therefore, by setting non-display data on the basis of the data LBL data, the CPU 311 can set data registered by the user of the own game apparatus 10, such that the data is not to be displayed.

On the other hand, when determining that no piece of user created data Ud of which the application ID and the data ID agree with the application ID and the data ID of each piece of the data identification LBL data constituting the data LBL data, is present among the user created data Ud which is set as the filtering target (No at step 710) or setting the non-display data, the CPU 311 determines whether or not a piece of the user created data Ud of which the application ID and the changer ID agree with the application ID and the changer ID of each piece of the changer identification GBL data constituting the changer GBL data, is present among the user created data Ud which is set as the filtering target (step 720).

When determining that the piece of the user created data Ud of which the application ID and the changer ID agree with the application ID and the changer ID of each piece of the changer identification GBL data constituting the changer GBL data, is present among the user created data Ud which is set as the filtering target (Yes at step 720), the CPU 311 sets the piece of the user created data Ud as non-display data (step 725).

Thus, the CPU 311 can determine that the changer which has changed last the character is a changer which creates a morally inappropriate character, on the basis of the changer GBL. Then, regardless of the appearance of the character, on the basis of the final changer, the CPU 311 can set the character such that the character is not to be displayed. In addition, the changer GBL is a GBL administered by the server 5. As will be described later, the server 5 administers the changer GBL on the basis of the number of times of reporting from each of the users of all the game apparatuses 10 included in the present system. When the user performs a determination as being morally inappropriate and selects reporting as described above, the server 5 receives a report. Therefore, by determining non-display data by using the changer GBL, the CPU 311 can set the non-display data on the basis of a determination based on a collective opinion of all the users of the game apparatuses 10 included in the present system.

On the other hand, when determining that no piece of the user created data Ud of which the application ID and the changer ID agree with the application ID and the changer ID of each piece of the changer identification GBL data constituting the changer GBL data, is present among the user created data Ud which is set as the filtering target (No at step 720) or setting the non-display data, the CPU 311 determines whether or not a piece of the user created data Ud of which the application ID and the data ID agree with the application ID and the data ID of each piece of the data identification GBL data constituting the data GBL data, is present among the user created data Ud which is set as the filtering target (step 730).

When determining that the piece of the user created data Ud of which the application ID and the data ID agree with the application ID and the data ID of each piece of the data identification GBL data constituting the data GBL data, is present among the user created data Ud which is set as the filtering target (Yes at step 730), the CPU 311 sets the piece of the user created data Ud as non-display data (step 735).

Thus, the CPU 311 can determine that the character is a morally inappropriate character, on the basis of the data GBL. Then, on the basis of the character indicated by the piece of the user created data Ud, the CPU 311 can set the character such that the character is not to be displayed. In addition, the data GBL is a GBL administered by the server 5. As will be described later, the server 5 administers the data GBL on the basis of the number of times of reporting from each of the users of all the game apparatuses 10 included in the present system. When the user performs a determination as being morally inappropriate and selects reporting as described above, the server 5 receives a report. Therefore, by determining non-display data by using the data GBL, the CPU 311 can set the non-display data on the basis of a determination based on a collective opinion of all the users of the game apparatuses 10 included in the present system.

On the other hand, when determining that no piece of the user created data Ud of which the application ID and the data ID agree with the application ID and the data ID of each piece of the data identification GBL data constituting the data GBL data, is present among the user created data Ud which is set as the filtering target (No at step 730) or setting the non-display data, the CPU 311 determines whether or not a piece of the user created data Ud of which the changer ID agrees with the changer ID of any piece of the changer identification GBL data of which the application ID is Null, is present among the user created data Ud which is set as the filtering target (step 740).

When determining that the piece of the user created data Ud of which the changer ID agrees with the changer ID of any piece of the changer identification GBL data of which the application ID is Null, is present (Yes at step 740), the CPU 311 sets the piece of the user created data Ud as non-display data (step 745). When determining that no piece of the user created data Ud of which the changer ID agrees with the changer ID of any piece of the changer identification GBL data of which the application ID is Null, is present (No at step 740) or setting the non-display data, the CPU 311 ends the filtering process.

This is the description of the filtering process in the present embodiment.

[GBL Update Process]

Next, the GBL update process in the present embodiment will be described with reference to FIG. 8J. In FIG. 8J, the CPU 311 determines whether or not a newly received piece of the reception GBL data Jgd (new arrival GBL) is stored in the reception box data Jb (step 801). When determining that the new piece of the reception GBL data Jgd is stored (Yes at step 801), the CPU 311 determines whether or not a GBL indicated by the piece of the reception GBL data Jgd is a new version GBL (step 805). Specifically, the CPU 311 compares the version of the GBL indicated by the piece of the reception GBL data Jgd to the version of the GBL indicated by the GBL data Gd which has already been stored in the main memory 32.

When determining the GBL indicated by the piece of the reception GBL data Jgd is a new version GBL (Yes at step 805), the CPU 311 updates the GBL data Gd stored in the main memory 32 with the GBL indicated by the piece of the reception GBL data Jgd (step 810). Then, the CPU 311 stores the updated GBL data Gd as the transmission GBL data Sgd in the transmission box data Sb (step 815). Thus, the latest GBL received by the passing communication can be further transmitted to another game apparatus 10 by the passing communication. Next, when storing the transmission GBL data Sgd, the CPU 311 deletes the piece of the reception GBL data Jgd stored in the reception box data Jb (step 820).

On the other hand, when no new piece of the reception GBL data Jgd is stored (No at step 801), the GBL indicated by the piece of the reception GBL data Jgd is not a new version (No at step 805), or the CPU 311 deletes the piece of the reception GBL data Jgd, the CPU 311 determines whether or not a GBL has been received by the Internet communication process (step 825). Specifically, the CPU 311 determines whether or not the Internet reception GBL data Ngd is stored in the main memory 32.

When determining that the GBL has been received by the Internet communication process (Yes at step 825), the CPU 311 determines whether or not the received GBL indicated by the Internet reception GBL data Ngd is a new version (step 830). Specifically, the CPU 311 compares the version of the GBL indicated by the Internet reception GBL data Ngd stored in the main memory 32 to the version of the GBL indicated by the GBL data Gd which has already been stored in the main memory 32.

When determining that the GBL indicated by the Internet reception GBL data Ngd is a new version (Yes at step 830), the CPU 311 updates the GBL data Gd stored in the main memory 32, such that the GBL data Gd indicates this GBL (step 835). Then, the CPU 311 stores the updated GBL data Gd as the transmission GBL data Sgd in the transmission box data Sb (step 840). Thus, the latest GBL received by the Internet communication process can be transmitted to another game apparatus 10 by the passing communication. When updating the GBL, the CPU 311 deletes the Internet reception GBL data Ngd (step 845).

On the other hand, when determining that no GBL has been received by the Internet communication process (No at step 825), determining that the GBL indicated by the Internet reception GBL data Ngd is not a new version (No at step 830), or deleting the Internet reception GBL data Ngd, the CPU 311 repeats the GBL update process from the beginning.

This is the description of the GBL update process in the present embodiment. As described above, regardless of whether or not the CPU 311 is performing another process, the CPU 311 repeatedly performs the GBL update process. Thus, when storing the reception GBL data Jgd in the passing communication process or storing the Internet reception GBL data Ngd in the Internet communication process, the CPU 311 can constantly identify whether or not the data indicates a new version GBL. When receiving data indicating a new version GBL, the CPU 311 can immediately update the GBL data Gd therewith, whereby the latest version GBL can be always stored. In addition, when the GBL indicated by the reception GBL data Jgd received by the passing communication, or the GBL indicated by the Internet reception GBL data Ngd received by the Internet communication, is a new version, the CPU 311 stores the reception GBL data Jgd or the updated GBL data Gd as the transmission GBL data Sgd. Therefore, the CPU 311 can immediately and automatically transmit the new version GBL to another game apparatus 10.

[Server Process]

Next, a specific process performed by the server 5 executing a program will be described with reference to FIG. 9. FIG. 9 is a flowchart showing an example of a server process performed by the server 5 executing a server process program. Note that the program for performing the process is stored in the HDD 54, and when the power of the server 5 is turned on, this program is read out from the HDD 54 via the communication bus 56 to the main memory 55 and executed by the CPU 51.

In FIG. 9, the CPU 51 determines whether or not a piece of the user created data Ud reported by a user has been received (step 901). When determining that the piece of the reported user created data Ud has been received (Yes at step 901), the CPU 51 determines whether or not a piece of the data count data including a data ID and an application ID which are included the piece of the received user created data Ud has already been stored in the main memory 55 (step 903). When determining that the piece of the data count data has not been stored (No at step 903), the CPU 51 creates a new piece of the data count data including the data ID and the application ID which are included in the received piece of the user created data Ud, and stores the piece of the data count data in the main memory 55 (step 904). An initial value of the number of times of reporting which is included in the piece of the data count data created at this time is one.

On the other hand, when determining that the piece of the data count data has been stored (Yes at step 903), the CPU 51 performs count by adding one to the number of times of reporting in the piece of the data count data (step 905).

Next, the CPU 51 determines whether or not a piece of the data count data of which the number of times of reporting is equal to or higher than a first threshold th1 is present among all the pieces of the data count data stored in the main memory 55 (step 910). Thus, the CPU 51 can determine whether or not a character indicated by the reported piece of the user created data Ud is a morally inappropriate character, on the basis of the number of times of reporting from each of the users of all the game apparatuses 10 included in the present system. Note that, the determination at step 910 may be performed on the piece of the data count data which is newly created or counted at this time.

When determining that the piece of the data count data of which the number of times of reporting is equal to or higher than the first threshold th1 (Yes at step 910), the CPU 51 adds the data identification GBL data to the distribution GBL data Gsd (step 915). At this time, what is added to the distribution GBL data Gsd is a piece of the data identification GBL data including the data ID and the application ID which are included in the piece of the data count data of which the number of times of reporting is equal to or higher than the first threshold th1. Thus, the CPU 51 can add, to the distribution GBL data Gsd, the data identification GBL data for identifying data indicating a morally inappropriate character, from among the user created data Ud.

Next, the CPU 51 determines whether or not a piece of the user count data including the user ID and the application ID which are included in the piece of the user created data Ud reported by the user has been stored in the main memory 55 (step 917). When determining that such a piece of the user count data has not been stored (No at step 917), the CPU 51 creates a new piece of the user count data including the changer ID and the application ID which are included in the received piece of the user created data Ud, and stores the new piece of the user count data in the main memory 55 (step 919). An initial value of the number of times of reporting which is included in the new piece of the user count data created at this time is one.

On the other hand, when determining that such a piece of the user count data has been stored (Yes at step 917), the CPU 51 performs count by adding one to the number of times of reporting in the piece of the user count data (step 920).

Next, the CPU 51 determines whether or not a piece of the user count data of which the number of times of reporting is equal to or higher than a second threshold th2 is present among all the pieces of the user count data stored in the main memory 55 (step 925). Thus, the CPU 51 can determine whether or not the final changer of the reported piece of the user created data Ud is a user that creates a morally inappropriate character, on the basis of the number of times of reporting from each of the users of all the game apparatuses 10 included in the present system. Note that the determination at step 925 may be performed on the piece of the user count data which is newly created or counted at this time.

When determining that the piece of the user count data of which the number of times of reporting is equal to or higher than the second threshold th2 is present (Yes at step 925), the CPU 51 adds the changer identification GBL data to the distribution GBL data Gsd (step 930). At this time, what is added to the distribution GBL data Gsd is a piece of the changer identification GBL data including the changer ID and the application ID which are included in the piece of the user count data of which the number of times of reporting is equal to or higher than the second threshold th2. Thus, the CPU 51 can add, to the distribution GBL data Gsd, the changer identification GBL data for identifying data indicating a final changer as a user that creates a morally inappropriate, from among the user created data Ud.

When adding the changer identification GBL data (step 930) or determining that no piece of the user count data of which the number of times of reporting is equal to or higher than the second threshold th2 is present (No at step 925), the CPU 51 repeats the server process from the beginning.

Note that, although not shown in the flowchart of FIG. 9, the CPU 51 performs a process of transmitting the distribution GBL data Gsd to each game apparatus 10 included in the present system. This process is performed in accordance with a task of receiving the distribution GBL data Gsd being executed by each game apparatus 10 included in the present system.

Next, the first threshold th1 and the second threshold th2 which are used in the server process as described above will be described. The second threshold th2 is previously determined so as to be higher than the first threshold th1. As is obvious from the above description, each time a piece of the user created data Ud is reported, the CPU 51 performs addition on: the number of times of reporting in a piece of the user count data corresponding to the piece of the user created data Ud; and the number of times of reporting in a piece of the data count data corresponding to the piece of the user created data Ud.

Then, the number of times of reporting indicated by the piece of the data count data including the data ID and the application ID is compared to the first threshold th1 which is the lowest, and the number of times of reporting indicated by the piece of the user count data including the changer ID and the application ID is compared to the second threshold th2 higher than the first threshold th1.

Here, in the present system, it is assumed that pieces of the user created data Ud including the same data ID and application ID, and pieces of the user created data Ud including the same changer ID and application ID, are repeatedly reported. In this case, in the present system, first, the number of times of reporting indicated by the corresponding piece of the data count data becomes equal to or higher than the first threshold th1. Then, the data identification GBL data is added to the distribution GBL data Gsd in first, such that the game apparatuses 10 can set non-display data on the basis of a character indicated by the user created data Ud.

Then, it is assumed that pieces of the user created data Ud including the same data ID and application ID, and pieces of the user created data Ud including the same changer ID and application ID, are further repeatedly reported. In this case, in the present system, after the number of times of reporting in the corresponding piece of the data count data becomes equal to or higher than the first threshold th1, the number of times of reporting in the corresponding piece of the user count data becomes equal to or higher than the second threshold th2. Thus, in the present system, after it becomes possible to set non-display data by the game apparatuses 10 on the basis of the character indicated by the user created data Ud, the changer identification GBL data is added to the distribution GBL data Gsd, such that non-display data can be set on the basis of the final changer ID indicated by the user created data Ud.

A character created by the user indicated by the changer ID of any piece of the changer identification GBL data is not displayed on another game apparatus 10, even when the user created data Ud handled in the character handling application which is indicated by the application ID included in the piece of the changer identification GBL data, is transmitted and received. Thus, if the final changer ID of a piece of the user created data Ud is added to the changer identification GBL data together with the application ID, the fun provided by the application indicated by this application ID is taken out of the user of the changer ID. The manufacturer of the application desires to avoid such a situation as much as possible, and thus, in the aforementioned server process, when the number of times of reporting becomes equal to or higher than the second threshold th2 higher than the first threshold th1, the final changer ID indicated by the piece of the user created data Ud is registered as the changer identification GBL data together with the application ID of the piece of the user created data Ud.

This is the description of the server process in the present embodiment. According to the aforementioned server process, the CPU 51 can constantly update the information indicated by the distribution GBL data Gsd with the latest information on the basis of reporting from each of the game apparatuses 10 included in the present system.

This is the description of the present system. According to the present system, any morally inappropriate character among characters indicated by pieces of the user created data Ud which are transmitted and received between each of the game apparatuses 10 included in the present system is prevented from being outputted and displayed to the user. For example, a morally inappropriate character is prevented from being displayed in the aforementioned character handling screen on the upper LCD 22. In addition, for example, a morally inappropriate character is prevented from being displayed as only one character displayed in the aforementioned character edition screen on the upper LCD 22.

In the above description, an example of the application handling the user created data Ud is the character handling application. Another example of the application in the present system is a music piece creation application by which the user can freely create a music piece. In this case, data indicating a music piece created by the user is the user created data Ud. In addition, the application ID included in the user created data Ud is an application ID indicating the music piece creation application. Further, the data body included in the user created data Ud is a data body indicating a content of the music piece. Alternatively, a still another example of the application in the present system is an application handling a piece of the user created data Ud which is created by using a sound inputted using the microphone 43.

In other words, in the present system, display objects such as characters, and the user created data Ud indicating any content created by using an optional application, such as music pieces and sounds, can be targeted. Thus, in the present system, from among: contents provided to the user by being displayed on the display device, such as display objects; and contents provided to the user by being outputted in the form of sound using the speaker 44, such as music pieces and sounds, contents inappropriate for the user can be identified as contents which should not be provided, by using at least either of the GBL or the LBL.

Other examples of the user created data Ud include messages hand-written by an input performed on the touch panel 13, and any character string data inputted by using a peripheral device such as the touch panel 13, the operation button 14, or a keyboard. In addition, by targeting a piece of the user created data Ud which stops an operation of an application program or causes an abnormal operation of the application program by aiming at a security hole of the application program, stop or an abnormal operation of the application program can be prevented.

Further, in the above description, the creator ID, the changer ID, the application ID, the data ID, and the like are assigned to the user created data Ud as information related to the time when a data body (content) is created (hereinafter, referred to as creation information), or are assigned to the user created data Ud including the content, as information related to this data body (content) (hereinafter, referred to as content information). Then, at least two IDs, other than the combination of the creator ID and the changer ID, out of the creator ID, the changer ID, the application ID, and the data ID which are included in the creation information or the content information, are added to the GBL data Gd and the LBL data Ld. In this case, in the game apparatus 10, as described above, when the above two IDs are included in the GBL data Gd or the LBL data Ld, a content included in a piece of the user created data Ud including the agreeing IDs are identified as a content which should not be provided to the user.

Further, in the above description, the GBL is exchanged in the passing communication by being transmitted or received as the transmission GBL data Sgd or the reception GBL data Jgd. However, in another embodiment, the LBL also may be exchanged in the passing communication, similarly to the GBL.

Further, in the above description, when the user reports, a piece of the user created data Ud to be reported is transmitted. However, in another embodiment, only any combination of IDs out of the creator ID, the changer ID, the application ID, and the data ID which are assigned to the piece of the user created data Ud may be transmitted. Then, the CPU 51 of the server 5 may count the number of times of reporting, by using the aforementioned data count data and the aforementioned user count data with the transmitted IDs, or by using count data for counting the number of times of reporting with a combination of IDs which is different from the ID combinations in the data count data and the user count data Further, in the above description, the game apparatus 10 periodically executes the task for receiving the distribution GBL data Gsd and receives the distribution GBL data Gsd. However, in another embodiment, the CPU 51 of the server 5 may periodically transmit the distribution GBL data Gsd to communicable game apparatuses 10.

Further, in the above description, when a character is not morally inappropriate as an example of the aforementioned content, the character is set so as not to be displayed. However, in another embodiment, a content which is morally inappropriate and should not be provided to the user may be prevented from being provided to the user, by being replaced by a predetermined content which can be provided. In addition, in another embodiment, a piece of the user created data Ud including an inappropriate content may be deleted.

Further, in the above description, in order to compare the version of the GBL, after the distribution GBL data Gsd is stored as the Internet reception GBL data Ngd in the main memory 32, the GBL data Gd is updated if the GBL indicated by the distribution GBL data Gsd is a new version. However, in another embodiment, the GBL data Gd may be updated directly with the distribution GBL data Gsd stored in the main memory 32. Thus, the distribution GBL data Gsd can be used as data indicating the latest version GBL, to update the GBL data Gd stored in the main memory 32.

Further, in the above description, the passing communication and the local communication are performed by using the local communication module 37. Here, when communication by the passing communication process and communication by the local communication process concurrently occur, a method, such as a method in which the these processes are performed in a time-sharing manner or data is transmitted and received in the processes thereof in a time-sharing manner, can be used to perform both of the communications.

Further, in the above description, the data ID included in the user created data Ud is an ID for uniquely identifying the data body for each application. However, in another embodiment, the data ID may be an ID for uniquely identifying the data body regardless of the application. In this case, each of the data identification LBL data and the data identification GBL data includes only this data ID. Thus, in the filtering process, only the data ID included in the user created data Ud which is the filtering target can be compared to the data identification LBL data and the data identification GBL data, thereby identifying non-display data.

Further, in the above description, the distribution GBL data Gsd, the user identification count data Ucd, and the data identification count data Dcd are stored in the main memory 55 of the server 5. However, in another embodiment, at least any one of the distribution GBL data Gsd, the user identification count data Ucd, and the data identification count data Dcd may be stored in the HDD 54 of the server 5.

Further, in the above description, the application ID included in the GBL data Gd and the application ID included in the piece of the task data Td for receiving the distribution GBL data Gsd are exceptional application IDs. However, in another embodiment, the application IDs included in the GBL data Gd and the piece of the task data Td for receiving the distribution GBL data Gsd may not be exceptional application IDs. Specifically, when an application handling the GBL data Gd is assumed, each of these application. IDs may be an application ID assigned to this application, or when the aforementioned server process program is regarded as an application program, each of these application IDs may be an application ID assigned to this application program.

Further, in the above description, data including the final changer ID and the application ID of a piece of the user created data Ud is added as a piece of the changer identification GBL data. However, in another embodiment, data including the creator ID and the application ID of a piece of the user created data Ud may be added and used, similarly to the changer identification GBL data. In this case, when both of the creator ID and the application ID which are included in a piece of the user created data Ud agree with both of the creator ID and the application ID which are included in any piece of the changer identification. GBL data, the game apparatus 10 may set the piece of the user created data Ud as non-display data. In addition, in this case, by the user reporting a piece of the user created data Ud, the user of the creator ID included in the piece of the user created data Ud is reported as a user that has created a morally inappropriate character.

Further, in the above description, the changer identification GBL data and the data identification GBL data are respectively added to the distribution GBL data Gsd on the basis of: the user count data including the changer ID and the application ID; and the data count data including the data ID and the application ID. However, in another embodiment, the number of reported pieces of the user created data Ud may be counted as the number of times of reporting for each final changer ID of the user created data Ud. Then, when the counted number of times of reporting becomes equal to or higher than a third threshold th3, a piece of the changer identification GBL data including this changer ID and an application ID indicating all applications may be added to the distribution GBL data Gsd. Thus, the changer identification GBL data for identifying a user that creates morally inappropriate pieces of the user created data Ud by using a plurality of applications, can be added to the distribution GBL data Gsd. Note that the application ID indicating all the applications may be any ID as long as it is an ID which is previously determined as an application ID indicating all applications which can be executed in the game apparatus 10. One example thereof is an application ID indicated by Null. In this case, when only the final changer ID of a received piece of the user created data Ud agrees with the changer ID included in the changer identification GBL data, the game apparatus 10 can set the piece of the user created data Ud as non-display data, regardless of the application ID. In other words, even when the user of the changer ID included in the changer identification GBL data uses any application for creating a piece of the user created data Ud, data indicated by the transmitted piece of the user created data Ud is not displayed in another game apparatus 10. Therefore, the user indicated by the changer ID of the changer identification GBL data added in this case cannot transmit any data to other game apparatuses 10 in the present system. Since a wide range of limitations is given as described above, the third threshold th3 is preferably higher than the first threshold th1 and the second threshold th2.

Further, in the above description, the user created data Ud includes a creator ID and one or more changer IDs. However, in another embodiment, user created data Ud which does not hold a creator ID as well as a plurality of changer IDs and includes only a final changer ID may be used. In this case, when a new piece of the user created data Ud is created, an ID of a creator is recorded as a final changer ID, and each time the piece of the user created data Ud is changed, the final changer ID is overwritten with an ID indicating a user that has changed the piece of the user created data Ud.

Further, in another embodiment, user created data Ud including one creator ID and one changer ID may be used. In this case, each time a piece of the user created data Ud is changed, the changer ID is overwritten with an ID indicating a user that has changed the piece of the user created data Ud. In addition, in this case, the changer ID included in the user created data Ud is an ID indicating a final changer, and thus such user created data Ud can be used in the aforementioned embodiment without change.

Further, in the above description, when registering a character indicated by a piece of the user created data Ud, in an LBL, the user can select the LBL in which the character is to be registered, from among the changer LBL and the data LBL. However, in another embodiment, when registration of a character in an LBL is selected by the user, the character may be registered in both of the changer LBL and the data LBL.

Further, in the above description, the final changer ID of the user created data Ud is included in the changer identification GBL data. However, in another embodiment, an ID to be included as a changer ID in the changer identification GBL data may be selected from among the creator ID and the changer ID included in the user created data Ud.

Further, in the above description, the first threshold th1 is lower than the second threshold th2. However, in another embodiment, the first threshold th1 is not necessarily lower than the second threshold th2. Note that the reason why the first threshold th1 is lower than the second threshold th2 as described above is that, when the final changer ID of the user created data Ud is added as the changer identification GBL data together with the application ID, a situation is avoided in which the fun provided by the application indicated by the application ID is taken out of the user of this changer ID. Thus, only when the above situation does not have to be avoided, the first threshold th1 and the second threshold th2 can be previously set such that the first threshold th1 is not lower than the second threshold th2.

Further, in another embodiment, the game apparatus 10 may operate in any of two power control modes which are a "normal power mode" and a "power saving mode". The "normal power mode" is a state where power is supplied to all the components of the game apparatus 10. For example, when the user plays a predetermined game by actually operating the game apparatus 10, or when the user actually operates various applications, the power control mode is the "normal power mode". The "power saving mode" is a state where power supply to only some of the components is continued and power supply to the other components is stopped. In addition, as one "power saving mode", there is a "sleep mode". The "sleep mode" is a state where power is supplied to only the wireless communication module 36 and the local communication module 37 and power supply to the other components such as the LCD is stopped. In the above description, after the game apparatus 10 is turned on, the passing communication process, the Internet communication process, and the GBL update process are repeatedly performed in parallel with each other. This may apply to the case where the game apparatus 10 operates in any of the two power control modes which are the "normal power mode" and the "power saving mode". In other words, even when operating in the "sleep mode", the game apparatus 10 may repeatedly perform the passing communication process, the Internet communication process, and the GBL update process in parallel with each other.

Further, in the above description, the application ID, the data ID, and the like are used to identify a piece of the user created data Ud including a content which should not be provided to the user. However, in another embodiment, a hash value calculated for each piece of the user created data Ud may be used to identify a piece of the user created data Ud including a content which should not be provided to the user. In addition, in another embodiment, the data body (content) itself included in the user created data Ud may be registered in the GBL or the LBL.

Further, in the above description, the game apparatus 10 can selectively execute a plurality of applications. However, it is understood that, if the game apparatus 10 can execute only one application, the application ID does not need to be used to identify a piece of the user created data Ud including a content which should not be provided to the user.

Further, in the above description, when updating the GBL data Gd, the CPU 311 overwrites the already stored GBL data Gd with GBL data Gd of a new GBL. However, in another embodiment, the already stored GBL data Gd may be updated by adding a part of new GBL data Gd (e.g., the difference from the already stored GBL data Gd) to the already stored GBL data Gd or by being overwritten with the entirety of the new GBL data Gd.

Further, in the above description, by performing the aforementioned server process, the CPU 51 of the server 5 automatically counts the number of times of reporting from the users and registers, in the GBL, data for identifying a piece of the user created data Ud including a content which should not be provided. However, in another embodiment, data for identifying a piece of the user created data Ud including a content which should not be provided may be registered, for example, manually by a user of the server 5. Specifically, for example, the server 5 may be configured such that, when the number of times of reporting of a piece of the user created data Ud becomes equal to or higher than a predetermined threshold, the server 5 notifies the user of the server 5 of the piece of the user created data Ud as data indicating a morally inappropriate content. Thus, when receiving a notification, the user of the server 5 can visually check the content of the notified data and determine whether or not to register the data in the GBL, and then can register the data as necessary.

Further, in the above description, when the distribution GBL data Gsd received from the server 5 indicates a new version GBL, the GBL data Gd stored in the main memory 32 is updated therewith. However, in another embodiment, when the updated date and time of the GBL indicated by the distribution GBL data Gsd is recent, the GBL data Gd stored in the main memory 32 may be updated therewith.

Further, in the above description, when the user reports a piece of the user created data Ud indicating a morally inappropriate content, the pierce of the user created data Ud is transmitted to the server 5. However, in another embodiment, when the user reports a piece of the user created data Ud, the combination of the user ID and the data ID which are included in the piece of the user created data Ud to be reported may be transmitted to the server 5 for reporting. Then, when the number of times of transmission of the combination of the user ID and the data ID becomes equal to or higher than the aforementioned first threshold th1, the server 5 may update the data GBL data by adding the data ID in the combination as a piece of the data identification GBL data of the distribution GBL data Gsd thereto. In addition, in this case, when the number of times of transmission of the combination of the user ID and the data ID becomes equal to or higher than the aforementioned second threshold th2, the server 5 may update the data GBL data by adding the user ID in the combination as a piece of the changer identification GBL data of the distribution GBL data Gsd thereto.

Further, in the above description, when the user reports a piece of the user created data Ud indicating a morally inappropriate content, the piece of the user created data Ud is transmitted to the server 5. However, in another embodiment, when the user reports a piece of the user created data Ud, the combination of the user ID and the application ID which are included in the piece of the user created data Ud to be reported may be transmitted to the server 5 for reporting. Then, when the number of times of transmission of the combination of the user ID and the application ID becomes equal to or higher than the aforementioned second threshold th2, the server 5 may update the changer GBL data by adding the user ID and the application ID in the combination as a piece of the changer identification GBL data of the distribution GBL data Gsd thereto. In addition, in this case, when the number of times of transmission of the combination of the user ID and the application ID becomes equal to or higher than the aforementioned third threshold th3, the server 5 may update the changer GBL data by adding a combination of: the user ID in the combination; and the aforementioned application ID indicating all applications, as a piece of the changer identification GBL data of the distribution GBL data Gsd thereto.

Further, in the above description, the passing communication is performed by using the local communication module 37. However, in another embodiment, the passing communication may be performed with an AP 2 by using the wireless communication module 36. Thus, the passing communication can be performed via the Internet communication network 3. In addition, a communication method such as infrared communication may be used.

Further, in the above description, data registered in the GBL data Gd or the LBL data Ld is information (user ID, data ID, etc.) for identifying the content indicated by the user created data Ud. However, in another embodiment, information for identifying a virus program which is created for aiming at information processing apparatuses such as the game apparatus 10 may be registered in the GBL data Gd or the LBL data Ld. In this case, data for identifying the virus program can be transmitted by the passing communication and the like, and thus spread of the virus program can be prevented, similarly to the morally inappropriate content as described above.

Further, in the above description, it is determined whether or not to output a content to the user, on the basis of the information for identifying the user created data UD. However, in another embodiment, it may be determined whether or not to output a content to the user, on the basis of the address of a source of the user created data Ud. In addition, when the content indicated by the user created data Ud is an e-mail, it may be determined whether or not to display the e-mail to the user, on the basis of the address of the source of the e-mail. In this case, such an address of the source is registered in the GBL data Gd or the LBL data Ld, and transmitted by the passing communication and the like.

Further, in the above description, the lower LCD 12 and the upper LCD 22 physically separated from each other are arranged one above the other (the case of two screens above and below) as an example of an LCD display section having two screens. However, the configuration of the display section having two screens may be another configuration. For example, the lower LCD 12 and the upper LCD 22 may be arranged on a main surface of the lower housing 11 laterally side by side. Alternatively, a vertically long LCD having the same width as that of the lower LCD 12 and a vertical length which is twice as large as that of the lower LCD 12 (namely, an LCD which is physically one unit and has a display size with a vertical length equal to a sum of vertical lengths of two screens) may be provided in the main surface of the lower housing 11, and two images may be displayed one above the other (displayed so as to be adjacent to each other without a boundary portion between above and below). Still alternatively, a horizontally long LCD having the same vertical length as that of the lower LCD 12 and a width which is twice as large as that of the lower LCD 12 may be provided in the main surface of the lower housing 11, and two game images may be displayed laterally side by side (displayed so as to be adjacent to each other without a boundary portion between left and right). In other words, a physically one screen may be divided into two and used to display two images. In either form of an image, if the touch panel 13 is provided on a screen on which the display image displayed on the lower LCD 12 is displayed, the present invention can be achieved similarly. Alternatively, in the case where the physically one screen is divided into two and used to display the two images, the touch panel 13 may be provided on the entirety of the screen.

Further, in the above description, the touch panel 13 is integrally provided in the game apparatus 10. However, it is understood that the present invention can be achieved even when the game apparatus and the touch panel are provided independently.

Further, in the above description, the touch panel 13 is used as an input means of the game apparatus 10 for implementing an coordinate input. However, another pointing device may be used. Here, the pointing device is an input device for designating an input position or a coordinate on a screen, and, for example, a mouse, a trackpad, a trackball, or the like is used as the input device. When position information in a screen coordinate system which is calculated from an output value outputted from the input device is used, the present invention can be achieved similarly.

Further, in the case of a stationary game apparatus whose game controller is held by a user while a game is played, a pointing device in another form is also considered. For example, a camera fixed to a housing of the game controller can be used as the pointing device. In this case, in accordance with a change in a position at which the housing of the game controller is pointed, an image taken by the camera is changed. Thus, by analyzing the taken image, a coordinate of the position at which the housing is pointed with respect to a display screen can be calculated. It is understood that the present invention can be achieved even when the pointing device such as the touch panel 13 is not provided in the game apparatus 10.

Further, the above embodiment have been described by using the hand-held game apparatus 10 and the stationary game apparatus. However, the present technology may be achieved by executing the information processing program of the present technology in an information processing apparatus such as a general personal computer.

Further, the shape of the aforementioned game apparatus 10 and the shapes, numbers, and installed positions of the operation button 14 and the touch panel 13 provided therein are merely one example, and it is understood that the present technology can be achieved with other shapes, numbers and installed positions. In addition, the execution order of each step, the screen image, or the like, which are used in the aforementioned information processing, are merely one example, and it is understood that the present technology can be achieved with other execution order and screen image.

In the above embodiment, the case has been described where the present technology is applied to the hand-held game apparatus 10, but the present technology is not limited thereto. For example, the present technology is also applicable to a hand-held information terminal such as a stationary game apparatus, a mobile phone, a personal handy-phone system (PHS), and a PDA. In addition, the present technology is also applicable to a stationary game console and a personal computer.

While the present embodiments have been described in detail, the foregoing description is in all aspects illustrative and not restrictive. It is to be understood that numerous other modifications and variations can be devised without departing from the scope of the technology. It is also to be understood that the scope of the present embodiments is indicated by the appended claims rather than by the foregoing description. It is also to be understood that the detailed description herein enables one skilled in the art to make changes coming within the meaning and equivalency range of the present embodiments. It should be also understood that the terms as used herein have definitions typically used in the art unless otherwise mentioned. Thus, unless otherwise defined, all scientific and technical terms have the same meanings as those generally used by those skilled in the art to which the present embodiments pertain. If there is contradiction, the present specification (including the definitions) precedes.

The computer-readable storage medium having stored the information processing program therein, the information processing apparatus, the information processing system, and the information processing method, according to the present invention, can prevent a content, which should not be provided to the user, from being provided, and are useful as a computer-readable storage medium having stored an information processing program therein, an information processing apparatus, an information processing system, and an information processing method, which transmit and receive data.

What is claimed is:

1. An information processing system comprising at least a plurality of information processing apparatuses each of which is capable of transmitting and receiving data including a content, each information processing apparatus comprising a computer processor configured to perform at least:
receiving, from another information processing apparatus among the said plurality of information processing apparatuses, as identification information, information for identifying a piece of data of which output is limited;
constantly and repeatedly updating the identification information in a storage each time the identification information is received;
transmitting the identification information updated in the storage, to another information processing apparatus;
transmitting and receiving the data to and from another information processing apparatus; and
among the received data, not outputting the piece of the data that is identified on the basis of the identification information updated in the storage, and outputting a piece of the data that is not identified on the basis of the identification information stored in the identification information storage, wherein
the information processing system further comprises
a server apparatus which transmits identification information for identifying a piece of data of which output is limited to each information processing apparatus, said transmitted identification information being based on identification information for identifying a piece of data of which output is limited which is received from each information processing apparatus, wherein each information processing apparatus further comprises:
a server information receiver for receiving the identification information transmitted from the server apparatus; and the computer processor of each information processing apparatus further performs
updating the identification information stored in the identification information storage, with the received identification information, wherein
each information processing apparatus receives the identification information from the server apparatus, and updates the identification information, and wherein
the data includes a user identifier indicating the user that has created the data, and when the number of times of transmission, to the server apparatus, of the user identifier included in the data created using a specific one of the applications exceeds a first threshold, each information processing apparatus limits output of the data from the specific application, and when the number of transmission of the user identifier to the server apparatus exceeds a second threshold, each information processing apparatus limits output of the data from all the applications regardless of which one of the applications was used for creating the data.

2. The information processing system according to claim 1, wherein
each information processing apparatus further comprises a wireless communication module for repeatedly searching for another information processing apparatus present within a communicable range to automatically and wirelessly connect to the other information processing apparatus, and automatically communicating with the other information processing apparatus, the computer processor of each information processing apparatus automatically receives the identification information by using the wireless communication module, the identification information storage stores the identification information received by using the wireless communication module, and the computer processor of each information processing apparatus transmits the identification information stored in the identification information storage, to another information processing apparatus by using the wireless communication module.

3. The information processing system according to claim 1, wherein
each information processing apparatus further comprises a wireless communication module for wirelessly connecting to another information processing apparatus present within a communicable range by using near-field radio, and communicating with the other information processing apparatus, the computer processor of each information processing apparatus receives the identification information by using the wireless communication module, the identification information storage stores the identification information received by the wireless communication module, and the computer processor of each information processing apparatus transmits the identification information stored in the identification information storage, to another information processing apparatus by using the wireless communication module.

4. The information processing system according to claim 1, wherein
the computer processor of each information processing apparatus further performs:
accepting, from a user, a selection of a piece of the data which is to be set so as not to be outputted, from among the received data; each information processing apparatus further comprising
a transmitter for transmitting at least a part of:
the piece of the accepted data; or
information related to the piece of the data, as report data to the server apparatus, and the server apparatus comprises a computer processor configured to perform:
updating the identification information which is to be transmitted to each information processing apparatus, on the basis of the report data transmitted from the transmitter of each information processing apparatus; and the server apparatus further comprises
a server side identification information storage for storing the updated identification information.

5. The information processing system according to claim 1, wherein
the server apparatus comprises a server information transmitter for transmitting the identification information stored in the server side identification information storage, and the server information receiver periodically receives the identification information from the server information transmitter.

6. The information processing system according to claim 1, wherein
the computer processor of each information processing apparatus further performs:
accepting, from a user, a selection of a piece of the data which is to be set so as not to be outputted, from among the data received; and
transmitting at least a part of:
the piece of the accepted data;
or information related to the piece of the data, as report data to the server apparatus, and the computer processor of the server apparatus further performs:
notifying that the piece of the data identified by using the report data is inappropriate data, on the basis of the report data transmitted from the transmitter of each information processing apparatus;
updating the identification information which is to be transmitted to each information processing apparatus, by an operation performed by a user of the server apparatus which is notified; and
storing the updated identification information.

7. The information processing system according to claim 6, wherein the computer processor of the server apparatus
notifies that a piece of the data, which is identified by using a piece of the report data of which the number of times of transmission from the transmission unit of each information processing apparatus is equal to or higher than a predetermined threshold, is inappropriate data.

8. The information processing system according to claim 1, wherein,
when the identification information received by the server information receiver is newer than the identification information already stored in the information processing apparatus, the computer processor of each information processing apparatus further performs updating the identification information by adding, to the already stored identification information, a difference between the received identification information and the already stored identification information, or by overwriting the already stored identification information with an entirety of the received identification information.

9. The information processing system according to claim 1, wherein
the updating updates the identification information stored in the information processing apparatus, at a time when the identification information is received by the server information receiver.

10. The information processing system according to claim 1, wherein
each information processing apparatus further comprises a wireless communication module for repeatedly searching for another information processing apparatus present within a communicable range to automatically and wirelessly connect to the other information processing apparatus by using near-field radio, and automatically communicating with the other information processing apparatus, and the computer processor of each information processing apparatus automatically transmits and receives the data by using the wireless communication module.

11. The information processing system according to claim 1, wherein
each information processing apparatus further comprises a data storage for storing the data which has been previously received, among the data stored in the data storage, the computer processor of each information processing apparatus does not output the piece of the data which is identified by the identification information stored in the identification information storage.

12. The information processing system according to claim 3, wherein
each information processing apparatus is portable.

13. An information processing method used in an information processing apparatus which is capable of transmitting and receiving data including a content, the information processing method comprising:
receiving, from another information processing apparatus, as identification information, information for identifying a piece of the data of which output is limited;
constantly and repeatedly updating the identification information in a storage each time the identification information is received;
transmitting the identification information updated in the storage, to another information processing apparatus;
transmitting and receiving the data to and from another information processing apparatus;
among the received data, not outputting the piece of the data that is identified on the basis of the identification information updated in the storage, and outputting a piece of the data that is not identified on the basis of the stored identification information, the information processing method further comprising:
a server apparatus transmitting identification information for identifying a piece of data of which output is limited to each information processing apparatus, said transmitted identification information being based on identification information for identifying a piece of data of which output is limited which is received from each information processing apparatus, and each information processing apparatus further:
receiving the identification information transmitted from the server apparatus; and each information processing apparatus further performing
updating the identification information stored in the identification information storage, with the received identification information, wherein
each information processing apparatus receives the identification information from the server apparatus, and updates the identification information, and wherein
the data includes a user identifier indicating the user that has created the data, and
when the number of times of transmission, to the server apparatus, of the user identifier included in the data created using a specific one of the applications exceeds a first threshold, each information processing apparatus limits output of the data from the specific application, and when the number of transmission of the user identifier to the server apparatus exceeds a second threshold, each information processing apparatus limits output of the data from all the applications regardless of which one of the applications was used for creating the data.

14. A non-transitory computer-readable storage medium having stored therein an information processing program which is executed by a computer of an information processing apparatus which is capable of transmitting and receiving data including a content, the information processing program causing the computer to perform at least:
receiving, from another information processing apparatus, as identification information, information for identifying a piece of the data of which output is limited;
constantly and repeatedly updating the identification information in a storage each time the identification information is received;

transmitting the identification information updated in the storage, to another information processing apparatus;

transmitting and receiving the data to and from another information processing apparatus;

receiving the identification information transmitted from a server apparatus;

the server apparatus transmitting identification information for identifying a piece of data of which output is limited to each information processing apparatus, said transmitted identification information being based on identification information for identifying a piece of data of which output is limited which is received from each information processing apparatus;

updating the identification information stored in the identification information storage, with the received identification information, and among the data received by the data transmission/reception, not outputting the piece of the data that is identified on the basis of the identification information updated in the storage, and outputting a piece of the data that is not identified on the basis of the identification information stored in the identification information storage, wherein each information processing apparatus receives the identification information from the server apparatus, and updates the identification information, and wherein the data includes a user identifier indicating the user that has created the data, and when the number of times of transmission, to the server apparatus, of the user identifier included in the data created using a specific one of the applications exceeds a first threshold, each information processing apparatus limits output of the data from the specific application, and when the number of transmission of the user identifier to the server apparatus exceeds a second threshold, each information processing apparatus limits output of the data from all the applications regardless of which one of the applications was used for creating the data.

15. An information processing apparatus which is capable of transmitting and receiving data including a content, the information processing apparatus comprising a computer processor configured to perform at least:

receiving, from another information processing apparatus, as identification information, information for identifying a piece of the data of which output is limited;

constantly and repeatedly updating the identification information in a storage each time the identification information is received;

transmitting the identification information updated in the storage, to another information processing apparatus;

transmitting and receiving the data to and from another information processing apparatus; and among the received data, not outputting the piece of the data that is identified on the basis of the identification information updated in the storage, and outputting a piece of the data that is not identified on the basis of the identification information stored in the identification information storage, wherein a server apparatus transmits identification information for identifying a piece of data of which output is limited to each information processing apparatus, said transmitted identification information being based on identification information for identifying a piece of data of which output is limited which is received from each information processing apparatus, wherein each information processing apparatus further comprises:

a server information receiver for receiving the identification information transmitted from the server apparatus; and the computer processor of each information processing apparatus further performs updating the identification information stored in the identification information storage, with the received identification information, wherein each information processing apparatus receives the identification information from the server apparatus, and updates the identification information, and wherein the data includes a user identifier indicating the user that has created the data, and when the number of times of transmission, to the server apparatus, of the user identifier included in the data created using a specific one of the applications exceeds a first threshold, each information processing apparatus limits output of the data from the specific application, and when the number of transmission of the user identifier to the server apparatus exceeds a second threshold, each information processing apparatus limits output of the data from all the applications regardless of which one of the applications was used for creating the data.

16. An information processing system comprising at least a plurality of information processing apparatuses each of which is capable of transmitting and receiving data, each information processing apparatus comprising a computer processor configured to perform at least:

transmitting and receiving, from another information processing apparatus among the said plurality of information processing apparatuses, and constantly and repeatedly updating in a storage, identification information for identifying data which is not to be outputted, to and from another information processing apparatus, wherein data is not outputted based on a content of said data, wherein the information processing system further comprises a server apparatus which transmits identification information for identifying a piece of data of which output is limited to each information processing apparatus, said transmitted identification information being based on identification information for identifying a piece of data of which output is limited which is received from each information processing apparatus, wherein each information processing apparatus further comprises:

a server information receiver for receiving the identification information transmitted from the server apparatus; and the computer processor of each information processing apparatus further performs updating the identification information stored in the identification information storage, with the received identification information, wherein each information processing apparatus receives the identification information from the server apparatus, and updates the identification information, and wherein the data includes a user identifier indicating the user that has created the data, and when the number of times of transmission, to the server apparatus, of the user identifier included in the data created using a specific one of the applications exceeds a first threshold, each information processing apparatus limits output of the data from the specific application, and when the number of transmission of the user identifier to the server apparatus exceeds a second threshold, each information processing apparatus limits output of the data from all the applications regardless of which one of the applications was used for creating the data.

* * * * *